United States Patent
Kang et al.

(10) Patent No.: US 9,516,332 B2
(45) Date of Patent: Dec. 6, 2016

(54) DISPARITY VECTOR DERIVATION IN THREE-DIMENSIONAL VIDEO CODING

(71) Applicant: QUALCOMM Incorporated, San Diego, CA (US)

(72) Inventors: Jewon Kang, San Diego, CA (US); Ying Chen, San Diego, CA (US); Li Zhang, San Diego, CA (US); Marta Karczewicz, San Diego, CA (US)

(73) Assignee: QUALCOMM Incorporated, San Diego, CA (US)

( * ) Notice: Subject to any disclaimer, the term of this patent is extended or adjusted under 35 U.S.C. 154(b) by 390 days.

(21) Appl. No.: 14/133,994

(22) Filed: Dec. 19, 2013

(65) Prior Publication Data

US 2014/0176674 A1    Jun. 26, 2014

Related U.S. Application Data

(60) Provisional application No. 61/740,939, filed on Dec. 21, 2012, provisional application No. 61/750,256, filed on Jan. 8, 2013.

(51) Int. Cl.
| | | |
|---|---|---|
| *H04N 19/436* | (2014.01) | |
| *H04N 19/513* | (2014.01) | |
| *H04N 19/52* | (2014.01) | |
| *H04N 19/597* | (2014.01) | |

(52) U.S. Cl.
CPC .......... *H04N 19/436* (2014.11); *H04N 19/513* (2014.11); *H04N 19/52* (2014.11); *H04N 19/597* (2014.11)

(58) Field of Classification Search
None
See application file for complete search history.

(56) References Cited

U.S. PATENT DOCUMENTS

| | | | | |
|---|---|---|---|---|
| 2011/0044550 A1* | 2/2011 | Tian | ...................... | H04N 19/597 382/238 |
| 2012/0224634 A1* | 9/2012 | Yamori | ................ | H04N 19/597 375/240.16 |
| 2013/0003848 A1* | 1/2013 | Sugio | ................... | H04N 19/597 375/240.16 |
| 2013/0229485 A1* | 9/2013 | Rusanovskyy | ..... | H04N 13/0048 348/43 |

FOREIGN PATENT DOCUMENTS

| | | | | |
|---|---|---|---|---|
| CN | WO 2013/053309 | * | 4/2013 | ............. H04N 13/02 |
| WO | 2008007913 A1 | | 1/2008 | |

OTHER PUBLICATIONS

Wiegand et al., "WD1: Working Draft 1 of High-Efficiency Video Coding", JCTVC-C403, 3rd Meeting: Guangzhou, CN, Oct. 7-15, 2010, 137 pp.
Wiegand et al., "WD2: Working Draft 2 of High-Efficiency Video Coding," JCTVC-D503, 4th Meeting: Daegu, KR, Jan. 20-28, 2011, 153 pp.
Wiegand et al., "WD3: Working Draft 3 of High-Efficiency Video Coding," Document JCTVC-E603, 5th Meeting: Geneva, CH, Mar. 16-23, 2011, 193 pp.

(Continued)

*Primary Examiner* — Reza Aghevli
(74) *Attorney, Agent, or Firm* — Shumaker & Sieffert, P.A.

(57) ABSTRACT

A video coder searches a set of neighbor blocks to generate a plurality of disparity vector candidates. Each of the neighbor blocks is a spatial or temporal neighbor of a current block. The video coder determines, based at least in part on the plurality of disparity vector candidates, a final disparity vector for the current block.

29 Claims, 11 Drawing Sheets

(56) References Cited

OTHER PUBLICATIONS

Bross et al., "WD4: Working Draft 4 of High-Efficiency Video Coding," 6th Meeting: JCTVC-F803_d2, Torino, IT, Jul. 14-22, 2011, 226 pp.

Bross et al., "WD5: Working Draft 5 of High-Efficiency Video Coding," 7th Meeting: Geneva, Switzerland, Nov. 21-30, 2011, JCTVC-G1103_d2, 214 pp.

Bross et al., "High efficiency video coding (HEVC) text specification draft 6," 8th Meeting: San Jose, CA, USA, Feb. 1-10, 2012, JCTVC-H1003, 259 pp.

Bross et al., "High efficiency video coding (HEVC) text specification draft 7," 9th Meeting: Geneva, CH, Apr. 27-May 7, 2012, JCTVC-I1003_d2, 290 pp.

Bross et al., "High efficiency video coding (HEVC) text specification draft 8," 10th Meeting: Stockholm, SE, Jul. 11-20, 2012, JCTVC-J1003_d7, 261 pp.

Bross et al., "High efficiency video coding (HEVC) text specification draft 9," 11th Meeting: Shanghai, CN, Oct. 10-19, 2012, JCTVC-K1003_v7, 290 pp.

Bross et al., "High efficiency video coding (HEVC) text specification draft 10 (for FDIS & Last Call)," 12th Meeting: Geneva, CH, Jan. 14-23, 2013, JCTVC-L1003_v34, 310 pp.

ITU-T H.264, Series H: Audiovisual and Multimedia Systems, Infrastructure of audiovisual services—Coding of moving video, Advanced video coding for generic audiovisual services, The International Telecommunication Union. Jun. 2011, 674 pp.

ITU-T H.265, Series H: Audiovisual and Multimedia Systems, Infrastructure of audiovisual services—Coding of moving video, Advanced video coding for generic audiovisual services, The International Telecommunication Union. Apr. 2013, 317 pp.

ITU-T H.265, Series H: Audiovisual and Multimedia Systems, Infrastructure of audiovisual services—Coding of moving video, Advanced video coding for generic audiovisual services, The International Telecommunication Union. Oct. 2014, 540 pp.

Chang, et al., "3D-CE5.h related: Depth-oriented Neighboring Block Disparity Vector (DoNBDV) with virtual depth", JCT-3V Meeting; MPEG Meeting; Oct. 13-19, 2012; Shanghai; (The Joint Collaborative Team on 3D Video Coding Extension Development of ISO/IEC JTC1/SC29/WG11 and ITU-T SG.16); URL: http://phenix.int-evry.fr/jct2, No. JCT3V-B0090, 5 pp.

Kang, et al., "CE2.h related: CU-based Disparity Vector Derivation in 3D-HEVC", JCT-3V Meeting; Apr. 20-26, 2013; Incheon; (The Joint Collaborative Team on 3D Video Coding Extension Development of ISO/IEC JTC1/SC29/WG11 and ITU-T SG.16 ); URL: http://phenix.int-evry.fr/jct2/ No. JCT3V-D0181, 4 pp.

Kang, et al., "3D-CE5.h related: Improvements for disparity vector derivation," JCT3V-B0047, Oct. 13-19, 2012, 4 pp.

Koo, et al., "3D-CE5.h Related: Support of parallel merge in disparity vector derivation", JCT-3V Meeting; MPEG Meeting; Oct. 13-19, 2012; Shanghai; (The Joint Collaborative Team on 3D Video Coding Extension Development of ISO/IEC JTC1/SC29/WG11 and ITU-T SG.16 ); URL: http://phenix.int-evry.fr/jct2/ No. JCT3V-B0136, XP030130317, 4 pp.

Lin, et al., "CE5.h related: removal of dependency between multiple PUs in a CU for disparity vector derivation", 102. MPEG Meeting; Oct. 15-19, 2012; Shanghai; (Motion Picture Expert Group or ISO/IEC JTC1/SC29/WG11) No. m26849, XP030055179, 4 pp.

Zhang, et al., "3D-CE5.h related: Disparity vector derivation for multiview video and 3DV", MPEG Meeting; Apr. 30-May 4, 2012; Geneva; (Motion Picture Expert Group or ISO/IEC JTC1/SC29/WG11), No. m24937, XP030053280, 6 pp.

Tech, et al. "3D-HEVC Test Model 1," Document JCT3V-A1005_d0, Jul. 16-20, 2012, 83 pp.

Tech, et al. "3D-HEVC Test Model 2," Document JCT3V-B1005_d0, Oct. 13-19, 2012, 126 pp. [uploaded in parts].

Tech, et al., "MV-HEVC Working Draft 1," Document JCT3v-A1004_d0, Jul. 16-20, 2012, 20 pp.

Zhang, et al., "CE5.h: Disparity vector generation results," Jul. 16-20, 2012, Document JCT2-A0097, 5 pp.

Sung, et al., "3D-CE5.h: Simplification of disparity vector derivation for HEVC-based 3D Video Coding," Document: JCT2-A0126, Jul. 16-20, 2012, 4 pp.

International Search Report and Written Opinion from International Application No. PCT/US2013-076945, dated Mar. 3, 2014, 14 pp.

Second Written Opinion from International Application No. PCT/US2013-076945, dated Mar. 3, 2014, 14 pp.

International Preliminary Report on Patentability from International Application No. PCT/US2013-076945, dated Mar. 26, 2015, 10 pp.

Sullivan et al., "Editors' Draft Revision to ITU-T Rec. H.264|ISO/IEC 14496-10 Advanced Video Coding—In Preparation for ITU-T SG16 AAP Consent (in integrated form)," Joint Video Team (JVT) of ISO/IEC MPEG & ITU-T VCEG (ISO/IEC JTC1/SC29/WG11 and ITU-T SG16 Q.6), 30th Meeting: Geneva, CH, Document: JVT-AA007, Jan. 29-Feb. 3, 2009, pp. 1-683 [uploaded in parts].

Tech, et al., "MV-HEVC Working Draft 2," Document: JCT3V-B1004_d0, Joint Collaborative Team on 3D Video coding Extension Development, of ITU-T SG 16 WP 3 and ISO/IEC JTC 1/SC 29/WG 11, 2nd Meeting: Shanghai, CN, Oct. 13-19, 2012, 22 pp.

* cited by examiner

DISPARITY VECTOR DERIVATION IN THREE-DIMENSIONAL VIDEO CODING

This application claims the benefit of U.S. Provisional Patent Application No. 61/740,939, filed Dec. 21, 2012, and U.S. Provisional Patent Application No. 61/750,256, filed Jan. 8, 2013, the entire content of each of which is incorporated herein by reference.

TECHNICAL FIELD

This disclosure relates to video encoding and decoding.

BACKGROUND

Digital video capabilities can be incorporated into a wide range of devices, including digital televisions, digital direct broadcast systems, wireless broadcast systems, personal digital assistants (PDAs), laptop or desktop computers, tablet computers, e-book readers, digital cameras, digital recording devices, digital media players, video gaming devices, video game consoles, cellular or satellite radio telephones, so-called "smart phones," video teleconferencing devices, video streaming devices, and the like. Digital video devices implement video compression techniques, such as those described in the standards defined by MPEG-2, MPEG-4, ITU-T H.263, ITU-T H.264/MPEG-4, Part 10, Advanced Video Coding (AVC), the High Efficiency Video Coding (HEVC) standard presently under development, and extensions of such standards. The video devices may transmit, receive, encode, decode, and/or store digital video information more efficiently by implementing such video compression techniques.

Video compression techniques perform spatial (intra-picture) prediction and/or temporal (inter-picture) prediction to reduce or remove redundancy inherent in video sequences. For block-based video coding, a video slice (i.e., a video frame or a portion of a video frame) may be partitioned into blocks. Blocks in an intra-coded (I) slice of a picture are encoded using spatial prediction with respect to reference samples in neighboring blocks in the same picture. Blocks in an inter-coded (P or B) slice of a picture may use spatial prediction with respect to reference samples in neighboring blocks in the same picture or temporal prediction with respect to reference samples in other reference pictures. Pictures may be referred to as frames, and reference pictures may be referred to as reference frames.

Spatial or temporal prediction results in a predictive block for a block to be coded. Residual data represents pixel differences between the original block to be coded and the predictive block. An inter-coded block is encoded according to a motion vector that points to a block of reference samples forming the predictive block, and the residual data indicates the difference between the coded block and the predictive block. An intra-coded block is encoded according to an intra-coding mode and the residual data. For further compression, the residual data may be transformed from the pixel domain to a transform domain, resulting in residual coefficients, which then may be quantized. The quantized coefficients, initially arranged in a two-dimensional array, may be scanned in order to produce a one-dimensional vector of coefficients, and entropy coding may be applied to achieve even more compression.

A multiview coding bitstream may be generated by encoding views, e.g., from multiple perspectives. Some three-dimensional (3D) video standards have been developed that make use of multiview coding aspects. For example, different views may transmit left and right eye views to support 3D video. Alternatively, some 3D video coding processes may apply so-called multiview plus depth coding. In multiview plus depth coding, a 3D video bitstream may contain not only texture view components, but also depth view components. For example, each view may comprise one texture view component and one depth view component.

SUMMARY

In general, this disclosure relates to multi-view and three-dimensional (3D) video coding. In accordance with some techniques of this disclosure, a video coder searches a set of neighbor blocks to generate a plurality of disparity vector candidates. Each of the neighbor blocks may be spatial or temporal neighbor of a current block. The video coder may determine, based at least in part on the plurality of disparity vector candidates, a final disparity vector for the current block. The video coder may use the final disparity vector for the current block for inter-view motion prediction or inter-view residual prediction.

In one example, this disclosure describes a method of decoding video data, the method comprising: searching a set of neighbor blocks of the video data to generate a plurality of disparity vector candidates, wherein each of the neighbor blocks is a neighbor of a current block of the video data; determining, based at least in part on the plurality of disparity vector candidates, a final disparity vector for the current block; and reconstructing a sample block for the current block in part by performing, based on the final disparity vector for the current block, inter-view motion prediction or inter-view residual prediction for the current block.

In another example, this disclosure describes a method of encoding video data, the method comprising: searching a set of neighbor blocks of the video data to generate a plurality of disparity vector candidates, wherein each of the neighbor blocks is a neighbor of a current block of the video data; determining, based at least in part on the plurality of disparity vector candidates, a final disparity vector for the current block; and generating a bitstream that includes a coded representation of the video data in part by performing, based on the final disparity vector for the current block, inter-view motion prediction or inter-view residual prediction for the current block.

In another example, this disclosure describes a video coding device that comprises a memory and one or more processors configured to: search a set of neighbor blocks of video data to generate a plurality of disparity vector candidates, wherein each of the neighbor blocks is a neighbor of a current block of the video data; and determine, based at least in part on the plurality of disparity vector candidates, a final disparity vector for the current block.

In another example, this disclosure describes a video coding device comprising: means for searching a set of neighbor blocks of video data to generate a plurality of disparity vector candidates, wherein each of the neighbor blocks is a neighbor of a current block of the video data; and means for determining, based at least in part on the plurality of disparity vector candidates, a final disparity vector for the current block.

In another example, this disclosure describes a non-transitory computer-readable data storage medium having instructions stored thereon that when executed cause a video coding device to: search a set of neighbor blocks of video data to generate a plurality of disparity vector candidates, wherein each of the neighbor blocks is a neighbor of a current block of the video data; and determine, based at least in part on the plurality of disparity vector candidates, a final disparity vector for the current block.

The details of one or more examples of the disclosure are set forth in the accompanying drawings and the description below. Other features, objects, and advantages will be apparent from the description, drawings, and claims.

DETAILED DESCRIPTION

Figure 1:
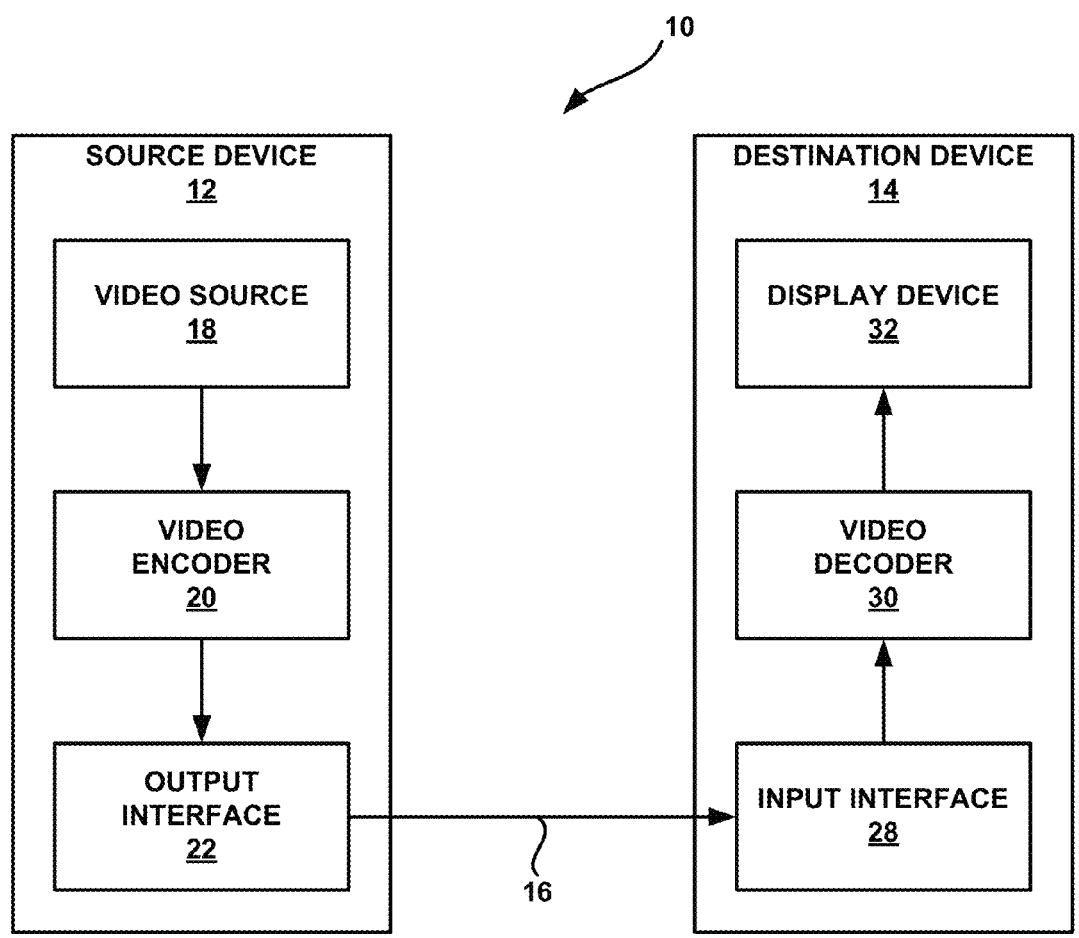
FIG. 1 is a block diagram illustrating an example video coding system that may utilize the techniques described in this disclosure.

High-Efficiency Video Coding (HEVC) is a newly-developed video coding standard. MV-HEVC is an extension of HEVC for multi-view coding. 3D-HEVC is an extension of HEVC for 3-dimensional (3D) video coding. MV-HEVC and 3D-HEVC provide for multiple views of the same scene from different viewpoints. In MV-HEVC and 3D-HEVC, inter-view prediction based on the reconstructed view components from different views is enabled.

The pictures of each view that represent the same time instance of video may include similar video content. However, the video content may be displaced spatially relative to one another. In particular, the video content of the views may represent different perspectives. For example, a video block in a picture in a first view may include video content that is similar to a video block in a picture in a second view. In this example, the location of the video block in the picture in the first view and the location of the video block in the picture in the second view may be different. For example, there may be some displacement between the locations of the video blocks in the different views.

Because there may be redundancy between different pictures associated with the same time instance, MV-HEVC and 3D-HEVC supports inter-view prediction. When a block in a current picture is coded using inter-view prediction, the block has a motion vector that indicates a location in an inter-view reference picture. An inter-view reference picture may be a reference picture that is associated with the same time instance as a current picture, but is associated with a different view than the current picture. If a motion vector of a block indicates a location in an inter-view reference picture, the motion vector may be referred to as a disparity motion vector. A video coder may use a disparity motion vector of a current block to determine a predictive block for the current block. If the video coder is a video encoder, the video coder may use the predictive block for the current block to generate residual data for the current block. If the video coder is a video decoder, the video coder may use the predictive block for the current block and residual data for the current block to reconstruct a sample block for the current block.

Furthermore, a block in a particular picture may have motion information or residual data that is similar to the motion information or residual data of a corresponding block in an inter-view reference picture. Accordingly, the motion information or residual data of a current block in a current picture may be predicted based on motion information or residual data of a corresponding block in an inter-view reference picture. The video coder may determine a disparity vector for the current block to determine a location of the corresponding block within the inter-view reference picture. Thus, the disparity vector for the current block may be a measure of the spatial displacement between the current block and the corresponding block in the inter-view reference picture. The motion information or residual data of the current block may be predicted based on the motion information or residual data of the corresponding block in the inter-view reference picture regardless of whether the current block has a disparity motion vector. Thus, if the motion information or residual data of a current block is predicted based on the motion information or residual data of a corresponding block in an inter-view reference picture, the current block is said to have a disparity vector. The disparity vector may be referred as to an implicit disparity vector (IDV) when the disparity vector is used for disparity vector derivation process of blocks coded later. The IDV for the current block may be equal to the disparity vector for one of the previous blocks.

The video coder may use a neighboring block-based disparity vector (NBDV) derivation process to derive a disparity vector for a current block. In the NBDV derivation process, the video coder may check blocks that neighbor the current block. The neighboring blocks may include spatial neighboring blocks and temporal neighboring blocks. The spatial neighboring blocks are in the same picture as the current block (i.e., the current picture). The temporal neighboring blocks are in one or more pictures other than the current picture. When the video coder checks a neighboring block, the video coder may determine whether the neighboring block has a disparity motion vector. When the video coder determines that one of the neighboring blocks has a disparity motion vector, the video coder may stop checking neighboring blocks and may convert the disparity motion vector of the neighboring block into the disparity vector for the current block. Furthermore, if none of the neighboring blocks has a disparity motion vector, the video coder may determine whether any of the spatial neighboring blocks has an IDV. When the video coder determines that one of the spatial neighboring blocks has an IDV, the video coder may stop checking neighboring blocks and may convert the IDV of the neighboring block into the disparity vector for the current block.

Unlike the NBDV derivation process described above, the video coder may, in accordance with at least some of the techniques of this disclosure, perform an NBDV derivation process in which the video coder searches a set of neighboring blocks to generate a plurality of disparity vector candidates. The disparity vector candidates may indicate disparity motion vectors and/or IDVs of the neighboring blocks. The video coder may then determine, based at least in part on the plurality of disparity vector candidates, a final disparity vector for the current block. Thus, the NBDV derivation process does not necessarily stop checking neighboring blocks after identifying a disparity motion vector or an IDV. Because the video coder may determine the disparity vector for the current block based on multiple disparity vector candidates, the disparity vector for the current block may typically be more accurate than a disparity vector determined based only on the first disparity motion vector or first IDV identified. Increasing the accuracy of disparity vectors may improve coding performance in inter-view motion prediction and inter-view residual prediction, potentially resulting in smaller bitstreams.

FIG. 1 is a block diagram illustrating an example video coding system 10 that may utilize the techniques of this disclosure. As used herein, the term "video coder" refers generically to both video encoders and video decoders. In this disclosure, the terms "video coding" or "coding" may refer generically to video encoding or video decoding.

As shown in FIG. 1, video coding system 10 includes a source device 12 and a destination device 14. Source device 12 generates encoded video data. Accordingly, source device 12 may be referred to as a video encoding device or a video encoding apparatus. Destination device 14 may decode the encoded video data generated by source device 12. Accordingly, destination device 14 may be referred to as a video decoding device or a video decoding apparatus. Source device 12 and destination device 14 may be examples of video coding devices or video coding apparatuses.

Source device 12 and destination device 14 may comprise a wide range of devices, including desktop computers, mobile computing devices, notebook (e.g., laptop) computers, tablet computers, set-top boxes, telephone handsets such as so-called "smart" phones, televisions, cameras, display devices, digital media players, video gaming consoles, in-car computers, or the like.

Destination device 14 may receive encoded video data from source device 12 via a channel 16. Channel 16 may comprise one or more media or devices capable of moving the encoded video data from source device 12 to destination device 14. In one example, channel 16 may comprise one or more communication media that enable source device 12 to transmit encoded video data directly to destination device 14 in real-time. In this example, source device 12 may modulate the encoded video data according to a communication standard, such as a wireless communication protocol, and may transmit the modulated video data to destination device 14. The one or more communication media may include wireless and/or wired communication media, such as a radio frequency (RF) spectrum or one or more physical transmission lines. The one or more communication media may form part of a packet-based network, such as a local area network, a wide-area network, or a global network (e.g., the Internet). The one or more communication media may include routers, switches, base stations, or other equipment that facilitate communication from source device 12 to destination device 14.

In another example, channel 16 may include a storage medium that stores encoded video data generated by source device 12. In this example, destination device 14 may access the storage medium, e.g., via disk access or card access. The storage medium may include a variety of locally-accessed data storage media such as Blu-ray discs, DVDs, CD-ROMs, flash memory, or other suitable digital storage media for storing encoded video data.

In a further example, channel 16 may include a file server or another intermediate storage device that stores encoded video data generated by source device 12. In this example, destination device 14 may access encoded video data stored at the file server or other intermediate storage device via streaming or download. The file server may be a type of server capable of storing encoded video data and transmitting the encoded video data to destination device 14. Example file servers include web servers (e.g., for a website), file transfer protocol (FTP) servers, network attached storage (NAS) devices, and local disk drives.

Destination device 14 may access the encoded video data through a standard data connection, such as an Internet connection. Example types of data connections may include wireless channels (e.g., Wi-Fi connections), wired connections (e.g., digital subscriber line (DSL), cable modem, etc.), or combinations of both that are suitable for accessing encoded video data stored on a file server. The transmission of encoded video data from the file server may be a streaming transmission, a download transmission, or a combination of both.

The techniques of this disclosure are not limited to wireless applications or settings. The techniques may be applied to video coding in support of a variety of multimedia applications, such as over-the-air television broadcasts, cable television transmissions, satellite television transmissions, streaming video transmissions, e.g., via the Internet, encoding of video data for storage on a data storage medium, decoding of video data stored on a data storage medium, or other applications. In some examples, video coding system 10 may be configured to support one-way or two-way video transmission to support applications such as video streaming, video playback, video broadcasting, and/or video telephony.

FIG. 1 is merely an example and the techniques of this disclosure may apply to video coding settings (e.g., video encoding or video decoding) that do not necessarily include any data communication between the encoding and decoding devices. In other examples, data is retrieved from a local memory, streamed over a network, or the like. A video encoding device may encode and store data to memory, and/or a video decoding device may retrieve and decode data from memory. In many examples, the encoding and decoding is performed by devices that do not communicate with one another, but simply encode data to memory and/or retrieve and decode data from memory.

In the example of FIG. 1, source device 12 includes a video source 18, a video encoder 20, and an output interface 22. In some examples, output interface 22 may include a modulator/demodulator (modem) and/or a transmitter. Video source 18 may include a video capture device, e.g., a video camera, a video archive containing previously-captured video data, a video feed interface to receive video data from a video content provider, and/or a computer graphics system for generating video data, or a combination of such sources of video data.

Video encoder 20 may encode video data from video source 18. In some examples, source device 12 directly transmits the encoded video data to destination device 14 via output interface 22. In other examples, the encoded video data may also be stored onto a storage medium or a file server for later access by destination device 14 for decoding and/or playback.

In the example of FIG. 1, destination device 14 includes an input interface 28, a video decoder 30, and a display device 32. In some examples, input interface 28 includes a receiver and/or a modem. Input interface 28 may receive encoded video data over channel 16. Video decoder 30 may decode encoded video data. Display device 32 may display the decoded video data. Display device 32 may be integrated with or may be external to destination device 14. Display device 32 may comprise a variety of display devices, such as a liquid crystal display (LCD), a plasma display, an organic light emitting diode (OLED) display, or another type of display device.

Video encoder 20 and video decoder 30 each may be implemented as any of a variety of suitable circuitry, such as one or more microprocessors, digital signal processors (DSPs), application-specific integrated circuits (ASICs), field-programmable gate arrays (FPGAs), discrete logic, hardware, or any combinations thereof. If the techniques are implemented partially in software, a device may store instructions for the software in a suitable, non-transitory computer-readable storage medium and may execute the instructions in hardware using one or more processors to perform the techniques of this disclosure. Any of the foregoing (including hardware, software, a combination of hardware and software, etc.) may be considered to be one or more processors. Each of video encoder 20 and video decoder 30 may be included in one or more encoders or decoders, either of which may be integrated as part of a combined encoder/decoder (CODEC) in a respective device.

This disclosure may generally refer to video encoder 20 "signaling" certain information to another device, such as video decoder 30. The term "signaling" may generally refer to the communication of syntax elements and/or other data used to decode the compressed video data. Such communication may occur in real- or near-real-time. Alternately, such communication may occur over a span of time, such as might occur when storing syntax elements to a computer-readable storage medium in an encoded bitstream at the time of encoding, which then may be retrieved by a decoding device at any time after being stored to this medium.

In some examples, video encoder 20 and video decoder 30 operate according to a video compression standard, such as ISO/IEC MPEG-4 Visual and ITU-T H.264 (also known as ISO/IEC MPEG-4 AVC), including its Scalable Video Coding (SVC) extension, Multiview Video Coding (MVC) extension, and MVC-based 3DV extension. Furthermore, there is an ongoing effort to generate a three-dimensional video (3DV) coding extension to H.264/AVC, namely AVC-based 3DV. A joint draft of the MVC extension of H.264 is described in "Advanced video coding for generic audiovisual services," ITU-T Recommendation H.264, March 2010. In other examples, video encoder 20 and video decoder 30 may operate according to ITU-T H.261, ISO/IEC MPEG-1 Visual, ITU-T H.262 or ISO/IEC MPEG-2 Visual, and ITU-T H.263, ISO/IEC-4 Visual.

In other examples, video encoder 20 and video decoder 30 may operate according to the High Efficiency Video Coding (HEVC) standard developed by the Joint Collaboration Team on Video Coding (JCT-VC) of ITU-T Video Coding Experts Group (VCEG) and ISO/IEC Motion Picture Experts Group (MPEG). A draft of the HEVC standard, referred to as "HEVC Working Draft 8" or the "HEVC base specification" is described in Bross et al., "High Efficiency Video Coding (HEVC) text specification draft 8," Joint Collaborative Team on Video Coding (JCT-VC) of ITU-T SG16 WP3 and ISO/IEC JTC1/SC29/WG11, 10$^{th}$ Meeting, Stockholm, Sweden, July 2012. Furthermore, there are ongoing efforts to produce scalable video coding, multi-view coding, and 3DV extensions for HEVC. The scalable video coding extension of HEVC may be referred to as SHEVC. Video encoder 20 and video decoder 30 may operate according to such extensions to the HEVC standard.

In general, the motion compensation loop of HEVC is the same as that in H.264/AVC. For example, the reconstruction of a current frame $\hat{I}$ may equal de-quantized coefficients r plus temporal prediction P:

$$\hat{I} = r + P.$$

In the formula above, P indicates uni-directional prediction for P frames or bi-directional prediction for B frames.

However, the unit of motion compensation in HEVC is different from that in previous video coding standards. For example, the concept of a macroblock in previous video coding standards does not exist in HEVC. Rather, macroblocks are replaced by a highly flexible hierarchical structure based on a generic quadtree scheme. Within this scheme, three types of blocks, i.e., coding units (CUs), prediction units (PUs), and transform units (TUs), are defined. A CU is a basic unit of region splitting. The concept of a CU is analogous to the concept of macroblock, but a CU is not restricted to a maximum size and a CU allows recursive splitting into four equally-sized CUs to improve the content adaptivity. A PU is a basic unit of inter/intra prediction and a PU may contain multiple arbitrarily-shaped partitions in a single PU to effectively code irregular image patterns. A TU is a basic unit of transform. TUs of a CU can be defined independently from PUs of the CU. However, a size of a TU is limited to the CU to which the TU belongs. This separation of the block structure into three different concepts may allow each to be optimized according to its role, which may result in improved coding efficiency.

In HEVC and other video coding specifications, a video sequence typically includes a series of pictures. Pictures may also be referred to as "frames." A picture may include three sample arrays, denoted $S_L$, $S_{Cb}$, and $S_{Cr}$. $S_L$ is a two-dimensional array (i.e., a block) of luma samples. $S_{Cb}$ is a two-dimensional array of Cb chrominance samples. $S_{Cr}$ is a two-dimensional array of Cr chrominance samples. Chrominance samples may also be referred to herein as "chroma" samples. In other instances, a picture may be monochrome and may only include an array of luma samples.

To generate an encoded representation of a picture, video encoder 20 may generate a set of coding tree units (CTUs). Each of the CTUs may comprise a coding tree block of luma samples, two corresponding coding tree blocks of chroma samples, and syntax structures used to code the samples of the coding tree blocks. In monochrome pictures or pictures having three separate color planes, a CTU may comprise a single coding tree block and syntax structures used to code the samples of the coding tree block. A coding tree block may be an N×N block of samples. A CTU may also be referred to as a "tree block" or a "largest coding unit" (LCU). The CTUs of HEVC may be broadly analogous to the macroblocks of other standards, such as H.264/AVC. However, a CTU is not necessarily limited to a particular size and may include one or more CUs.

A slice may include an integer number of CTUs ordered consecutively in a raster scan order. A coded slice may comprise a slice header and slice data. The slice header of a slice may be a syntax structure that includes syntax elements that provide information about the slice. The slice data may include coded CTUs of the slice.

This disclosure may use the term "video unit" or "video block" or "block" to refer to one or more sample blocks and syntax structures used to code samples of the one or more blocks of samples. Example types of video units may include CTUs, CUs, PUs, transform units (TUs), macroblocks, macroblock partitions, and so on. In some contexts, discussion of PUs may be interchanged with discussion of macroblocks or macroblock partitions.

To generate a coded CTU, video encoder 20 may recursively perform quad-tree partitioning on the coding tree blocks of a CTU to divide the coding tree blocks into coding blocks, hence the name "coding tree units." A coding block is an N×N block of samples. A CU may comprise a coding block of luma samples and two corresponding coding blocks of chroma samples of a picture that has a luma sample array, a Cb sample array, and a Cr sample array, and syntax structures used to code the samples of the coding blocks. In monochrome pictures or pictures having three separate color planes, a CU may comprise a single coding block and syntax structures used to code the samples of the coding block.

Video encoder 20 may partition a coding block of a CU into one or more prediction blocks. A prediction block is a rectangular (i.e., square or non-square) block of samples on which the same prediction is applied. A PU of a CU may comprise a prediction block of luma samples, two corresponding prediction blocks of chroma samples, and syntax structures used to predict the prediction blocks. In monochrome pictures or pictures having three separate color planes, a PU may comprise a single prediction block and syntax structures used to predict the prediction block. Video encoder 20 may generate predictive luma, Cb, and Cr blocks for luma, Cb, and Cr prediction blocks of each PU of the CU. Hence, in this disclosure, a CU may be said to be partitioned into one or more PUs. For ease of explanation, this disclosure may refer to the size of a prediction block of a PU as simply the size of the PU.

Video encoder 20 may use intra prediction or inter prediction to generate the predictive blocks for a PU. If video encoder 20 uses intra prediction to generate the predictive blocks of a PU, video encoder 20 may generate the predictive blocks of the PU based on samples of the picture that includes the PU. In this disclosure, the phrase "based on" may indicate "based at least in part on."

If video encoder 20 uses inter prediction to generate the predictive blocks of a PU, video encoder 20 may generate the predictive blocks of the PU based on decoded samples of one or more pictures other than the picture that includes the PU. When inter prediction is used to generate the predictive blocks of a block (e.g., a PU), this disclosure may refer to the block as "inter-coded" or "inter predicted." Inter prediction may be uni-directional (i.e., uni-prediction) or bi-directional (i.e., bi-prediction). To perform uni-prediction or bi-prediction, video encoder 20 may generate a first reference picture list (RefPicList0) and a second reference picture list (RefPicList1) for a current picture. Each of the reference picture lists may include one or more reference pictures. After a reference picture list is constructed (namely RefPicList0 and RefPicList1 if available), a reference index to a reference picture list can be used to identify any reference picture included in the reference picture list.

When using uni-prediction, video encoder 20 may search the reference pictures in either or both RefPicList0 and RefPicList1 to determine a reference location within a reference picture. Furthermore, when using uni-prediction, video encoder 20 may generate, based at least in part on samples corresponding to the reference location, the predictive blocks for the PU. Moreover, when using uni-prediction, video encoder 20 may generate a single motion vector that indicates a spatial displacement between a prediction block of the PU and the reference location. The motion vector may include a horizontal component specifying a horizontal displacement between the prediction block of the PU and the reference location and may include a vertical component specifying a vertical displacement between the prediction block of the PU and the reference location.

When using bi-prediction to encode a PU, video encoder 20 may determine a first reference location in a reference picture in RefPicList0 and a second reference location in a reference picture in RefPicList1. Video encoder 20 may generate, based at least in part on samples corresponding to the first and second reference locations, the predictive blocks for the PU. Moreover, when using bi-prediction to encode the PU, video encoder 20 may generate a first motion vector indicating a spatial displacement between a prediction block of the PU and the first reference location and a second motion vector indicating a spatial displacement between the prediction block of the PU and the second reference location.

If video encoder 20 uses inter prediction to generate the predictive blocks of a PU, video encoder 20 may generate the predictive blocks of the PU based on samples of one or more pictures other than the picture that includes the PU. For instance, video encoder 20 may perform uni-directional inter prediction (i.e., uni-prediction) or bi-directional inter prediction (i.e., bi-prediction) on a PU.

In instances where video encoder 20 performs uni-prediction on a PU, video encoder 20 may determine, based on a motion vector of the PU, a reference location in a reference picture. Video encoder 20 may then determine a predictive block for the PU. Each sample in the predictive block for the PU may be associated with the reference location. In some examples, a sample in a predictive block for a PU may be associated with a reference location when the sample is within a block of samples having the same size as the PU and whose top-left corner is the reference location. Each sample in the predictive block may be an actual or interpolated sample of the reference picture.

In instances where video encoder 20 performs bi-prediction on a PU, the PU has two motion vectors. Video encoder 20 may determine, based on the motion vectors of the PU, two reference locations in two reference pictures. Video encoder 20 may then determine, in the manner described above, reference blocks associated with the two reference locations. Video encoder 20 may then determine a predictive block for the PU. Each sample in the predictive block may be a weighted average of corresponding samples in the reference blocks. The weighting of the samples may be based on temporal distances of the reference pictures from the picture containing the PU.

Video encoder 20 may partition a CU into one or more PUs according to various partitioning modes. For instance, if intra prediction is used to generate predictive blocks for the PUs of a CU, the CU may be partitioned according to a PART_2N×2N mode or a PART_N×N mode. In the PART_2N×2N mode, the CU only has one PU. In the PART_N×N mode, the CU has four equally-sized PUs having rectangular prediction blocks. If the inter prediction is used to generate predictive blocks for the PUs of a CU, the CU may be partitioned according to the PART_2N×2N mode, the PART_N×N mode, a PART_2N×N mode, a PART_N×2N mode, a PART_2N×nU mode, a PART_2N×uD mode, a PART_nL×2N mode, or a PART_nR×2N mode. In the PART_2N×N mode and the PART_N×2N mode, the CU is partitioned into two equally-sized PUs having rectangular prediction blocks. In each of the PART_2N×nU mode, the PART_2N×uD mode, the PART_nL×2N mode, and the PART_nR×2N mode, the CU is partitioned into two unequally-sized PUs having rectangular prediction blocks.

After video encoder 20 generates predictive luma, Cb, and Cr blocks for one or more PUs of a CU, video encoder 20 may generate a luma residual block for the CU. Each sample in the CU's luma residual block indicates a difference between a luma sample in one of the CU's predictive luma blocks and a corresponding sample in the CU's original luma coding block. In addition, video encoder 20 may generate a Cb residual block for the CU. Each sample in the CU's Cb residual block may indicate a difference between a Cb sample in one of the CU's predictive Cb blocks and a corresponding sample in the CU's original Cb coding block. Video encoder 20 may also generate a Cr residual block for the CU. Each sample in the CU's Cr residual block may indicate a difference between a Cr sample in one of the CU's predictive Cr blocks and a corresponding sample in the CU's original Cr coding block.

Furthermore, video encoder 20 may use quad-tree partitioning to decompose the luma, Cb, and Cr residual blocks of a CU into one or more luma, Cb, and Cr transform blocks. A transform block is a rectangular (e.g., square or non-square) block of samples on which the same transform is applied. A TU of a CU may comprise a transform block of luma samples, two corresponding transform blocks of chroma samples, and syntax structures used to transform the transform block samples. Thus, each TU of a CU may be associated with a luma transform block, a Cb transform block, and a Cr transform block. The luma transform block associated with the TU may be a sub-block of the CU's luma residual block. The Cb transform block may be a sub-block of the CU's Cb residual block. The Cr transform block may be a sub-block of the CU's Cr residual block. In monochrome pictures or pictures having three separate color planes, a TU may comprise a single transform block and syntax structures used to transform the samples of the transform block.

Video encoder 20 may apply one or more transforms to a luma transform block of a TU to generate a luma coefficient block for the TU. A coefficient block may be a two-dimensional array of transform coefficients. A transform coefficient may be a scalar quantity. Video encoder 20 may apply one or more transforms to a Cb transform block of a TU to generate a Cb coefficient block for the TU. Video encoder 20 may apply one or more transforms to a Cr transform block of a TU to generate a Cr coefficient block for the TU.

After generating a coefficient block (e.g., a luma coefficient block, a Cb coefficient block, or a Cr coefficient block), video encoder 20 may quantize the coefficient block. Quantization generally refers to a process in which transform coefficients are quantized to possibly reduce the amount of data used to represent the transform coefficients, providing further compression. After video encoder 20 quantizes a coefficient block, video encoder 20 may entropy encode syntax elements indicating the quantized transform coefficients. For example, video encoder 20 may perform Context-Adaptive Binary Arithmetic Coding (CABAC) on the syntax elements indicating the quantized transform coefficients.

Video encoder 20 may output a bitstream that includes a sequence of bits that forms a representation of coded pictures and associated data. The bitstream may comprise a sequence of network abstraction layer (NAL) units. A NAL unit is a syntax structure containing an indication of the type of data in the NAL unit and bytes containing that data in the form of a raw byte sequence payload (RBSP) interspersed as necessary with emulation prevention bits. Each of the NAL units includes a NAL unit header and encapsulates a RBSP. The NAL unit header may include a syntax element that indicates a NAL unit type code. The NAL unit type code specified by the NAL unit header of a NAL unit indicates the type of the NAL unit. A RBSP may be a syntax structure containing an integer number of bytes that is encapsulated within a NAL unit. In some instances, an RBSP includes zero bits.

Different types of NAL units may encapsulate different types of RBSPs. For example, different types of NAL unit may encapsulate different RBSPs for video parameter sets (VPSs), sequence parameter sets (SPSs), picture parameter sets (PPSs), coded slices, SEI, and so on. NAL units that encapsulate RBSPs for video coding data (as opposed to RBSPs for parameter sets and SEI messages) may be referred to as video coding layer (VCL) NAL units.

In HEVC, SPSs may contain information that applies to all slices of a coded video sequence (CVS). In HEVC, a CVS may start from an instantaneous decoding refresh (IDR) picture, or a broken link access (BLA) picture, or a clean random access (CRA) picture that is the first picture in the bitstream, including all subsequent pictures that are not an IDR or BLA picture. That is, in HEVC, a CVS may comprise a sequence of access units that may consist, in decoding order, of a CRA access unit that is the first access unit in the bitstream, an IDR access unit or a BLA access unit, followed by zero or more non-IDR and non-BLA access units including all subsequent access units up to but not including any subsequent IDR or BLA access unit.

A VPS is a syntax structure comprising syntax elements that apply to zero or more entire CVSs. An SPS may include a syntax element that identifies a VPS that is active when the SPS is active. Thus, the syntax elements of a VPS may be more generally applicable than the syntax elements of an SPS. A PPS is a syntax structure comprising syntax elements that apply to zero or more coded pictures. A PPS may include a syntax element that identifies an SPS that is active when the PPS is active. A slice header of a slice may include a syntax element that indicates a PPS that is active when the slice is being coded.

Video decoder 30 may receive a bitstream generated by video encoder 20. In addition, video decoder 30 may parse the bitstream to obtain syntax elements from the bitstream. Video decoder 30 may reconstruct the pictures of the video data based at least in part on the syntax elements obtained from the bitstream. The process to reconstruct the video data may be generally reciprocal to the process performed by video encoder 20. For instance, video decoder 30 may use motion vectors of PUs to determine predictive blocks for the PUs of a current CU. In addition, video decoder 30 may inverse quantize coefficient blocks associated with TUs of the current CU. Video decoder 30 may perform inverse transforms on the coefficient blocks to reconstruct transform blocks associated with the TUs of the current CU. Video decoder 30 may reconstruct the coding blocks of the current CU by adding the samples of the predictive blocks for PUs of the current CU to corresponding samples of the transform blocks of the TUs of the current CU. By reconstructing the coding blocks for each CU of a picture, video decoder 30 may reconstruct the picture.

Each coded picture has a reference picture set that includes all the pictures that may be used for reference by either the coded picture or the picture following (future) the coded picture. A video coder may distinguish which pictures can only be used as a reference of a future picture. Reference picture lists are constructed based on the pictures in the reference picture set ("RPS") that can be used for the current picture (namely "RPS for current") and not the pictures that can only be used as references of future pictures. A picture in the future RPS may not be in any of the two reference picture lists, RefPicList0 or RefPicList1.

In some examples, when video encoder 20 begins encoding a current picture, video encoder 20 may generate five subsets of reference pictures (i.e., reference picture subsets) for the current picture. In some examples, these five reference picture subsets are: RefPicSetStCurrBefore, RefPicSetStCurrAfter, RefPicSetStFoll, RefPicSetLtCurr, and RefPicSetLtFoll. This disclosure may refer to the reference pictures in RefPicSetStCurrBefore, RefPicSetStCurrAfter, RefPicSetStFoll as "short-term reference pictures," "short-term pictures," or "STRPs." Thus, a "short-term reference picture" may be a picture that is marked (e.g., by virtue of being in RefPicSetStCurrBefore, RefPicSetStCurrAfter, or RefPicSetStFoll) as being used for short-term reference. This disclosure may refer to the reference pictures in RefPicSetLtCurr and RefPicSetLtFoll as "long-term reference pictures," "long-term pictures," or "LTRPs." The video encoder may re-generate the five reference picture subsets for each picture.

Furthermore, when a current slice of the current picture is a P slice (i.e., a slice in which intra prediction and uni-directional inter prediction are enabled), video encoder 20 may use the reference pictures from the RefPicStCurrAfter, RefPicStCurrBefore, and RefPicStLtCurr reference picture subsets of the current picture to generate a single reference picture list (RefPicList0) for the current slice. When the current slice is a B slice (i.e., a slice in which intra prediction, uni-directional inter prediction, and bi-directional inter prediction are enabled), video encoder 20 may use the reference pictures from the RefPicStCurrAfter, RefPicStCurrBefore, and RefPicStLtCurr reference picture subsets of the current picture to generate two reference picture lists (RefPicList0 and RefPicList1) for the current slice. Video encoder 20 may include, in a slice header for a first slice of the current picture, syntax elements that video decoder 30 may use to determine the reference picture subsets of the current picture. When video decoder 30 decodes a current slice of the current picture, video decoder 30 may determine the reference picture subsets of the current picture and may regenerate RefPicList0 and/or RefPicList1.

As indicated above, when a video coder (e.g., video encoder 20 or video decoder 30) begins coding a current slice of a picture, the video coder may initialize a first reference picture list (i.e., RefPicList0). Furthermore, if the current slice is a B slice, the video coder may initialize a second reference picture list (i.e., RefPicList1). In some examples, reference picture list initialization is an explicit mechanism that puts reference pictures in a reference picture memory (i.e., a decoded picture buffer) into a list based on the order of picture order count (POC) values of the reference pictures. A POC value is a variable that is associated with each picture that indicates the position of the associated picture in output order relative to the output order positions of the other pictures in the same coded video sequence.

To generate RefPicList0, a video coder (e.g., a video encoder or a video decoder) may generate an initial, default version of RefPicList0. In the initial version of RefPicList0, reference pictures in RefPicSetStCurrBefore are listed first, followed by reference pictures in RefPicSetStCurrAfter, followed by reference pictures in RefPicSetLtCurr. Similarly, to generate RefPicList1, the video coder may generate an initial version of RefPicList1. In the initial version of RefPicList1, reference pictures in RefPicSetStCurrAfter are listed first, followed by reference pictures in RefPictSetStCurrBefore, followed by reference pictures in RefPicSetLtCurr.

After a video coder has initialized a reference picture list (e.g., RefPicList0 or RefPicList1), the video coder may modify the order of the reference pictures in the reference picture list. In other words, the video coder may perform a reference picture list modification (RPLM) process. The video coder may modify the order of the reference pictures in any order, including the case where one particular reference picture may appear at more than one position in the reference picture list. In other words, the reference picture list reordering mechanism can modify the position of a picture that was put in the list during the reference picture list initialization to any new position, or put any reference picture in the reference picture memory in any position, even if the picture does not belong in the initialized list. However, if a position of a picture exceeds the number of active reference pictures of the list, the picture is not considered as an entry of the final reference picture list. A slice header may include one or more syntax elements that indicate the number of active reference pictures in the reference picture lists.

In some examples, the video coder constructs a combined list (e.g., RefPicListC) for a B slice after the video coder has constructed the final reference picture lists (i.e., RefPicList0 and RefPicList1). The video coder may further modify the combined list further if one or more reference picture list modification syntax elements are present for the combined list.

In some examples, video encoder 20 may signal the motion information of a PU using merge mode or advanced motion vector prediction (AMVP) mode. For instance, in HEVC, there are two modes for the prediction of motion parameters, one being the merge/skip mode and the other being AMVP. Motion prediction may comprise the determination of motion information of a video unit (e.g., a PU) based on motion information of one or more other video units. The motion information of a PU may include motion vector(s) of the PU, reference index(es) of the PU, and one or more prediction direction indicators.

When video encoder 20 signals the motion information of a current PU using merge mode, video encoder 20 generates a merge candidate list. In other words, video encoder 20 may perform a motion vector predictor list construction process. The merge candidate list includes a set of merge candidates that indicate the motion information of PUs that spatially or temporally neighbor the current PU. That is, in the merge mode, a candidate list of motion parameters (e.g., reference indexes, motion vectors, etc.) is constructed where candidates can be from spatial and temporal neighboring blocks.

Furthermore, in merge mode, video encoder 20 may select a merge candidate from the merge candidate list and may use the motion information indicated by the selected merge candidate as the motion information of the current PU. Video encoder 20 may signal the position in the merge candidate list of the selected merge candidate. For instance, video encoder 20 may signal the selected motion vector parameters by transmitting an index (i.e., a merging candidate index) that indicates a position within the candidate list of the selected merge candidate. Video decoder 30 may obtain, from the bitstream, the index into the candidate list (i.e., the merging candidate index). In addition, video decoder 30 may generate the same merge candidate list and may determine, based on the merging candidate index, the selected merge candidate. Video decoder 30 may then use the motion information of the selected merge candidate to generate predictive blocks for the current PU. That is, video decoder 30 may determine, based at least in part on the candidate list index, a selected candidate in the candidate list, wherein the selected candidate specifies the motion vector for the current PU. In this way, at the decoder side, once the index is decoded, all motion parameters of the corresponding block where the index points may be inherited by the current PU.

Skip mode is similar to merge mode. In skip mode, video encoder 20 and video decoder 30 generate and use a merge candidate list in the same way that video encoder 20 and video decoder 30 use the merge candidate list in merge mode. However, when video encoder 20 signals the motion information of a current PU using skip mode, video encoder 20 does not signal any residual data for the current PU. Accordingly, video decoder 30 may determine, without use of residual data, a prediction block for the PU based on a reference block indicated by the motion information of a selected candidate in the merge candidate list.

AMVP mode is similar to merge mode in that video encoder 20 may generate a candidate list and may select a candidate from the candidate list. However, when video encoder 20 signals the RefPicListX (where X is 0 or 1) motion information of a current PU using AMVP mode, video encoder 20 may signal a RefPicListX motion vector difference (MVD) for the current PU and a RefPicListX reference index for the current PU in addition to signaling a RefPicListX motion vector predictor (MVP) flag for the current PU. The RefPicListX MVP flag for the current PU may indicate the position of a selected AMVP candidate in the AMVP candidate list. The RefPicListX MVD for the current PU may indicate a difference between a RefPicListX motion vector of the current PU and a motion vector of the selected AMVP candidate. In this way, video encoder 20 may signal the RefPicListX motion information of the current PU by signaling a RefPicListX MVP flag, a RefPicListX reference index value, and a RefPicListX MVD. In other words, the data in the bitstream representing the motion vector for the current PU may include data representing a reference index, an index to a candidate list, and an MVD. Thus, the chosen motion vectors may be signaled by transmitting an index into the candidate list. In addition, the reference index values and motion vector differences may also be signaled.

Furthermore, when the motion information of a current PU is signaled using AMVP mode, video decoder 30 may obtain, from the bitstream, a MVD for a current PU and a MVP flag. Video decoder 30 may generate the same AMVP candidate list and may determine, based on the MVP flag, the selected AMVP candidate. In other words, in AMVP, a candidate list of motion vector predictors for each motion hypothesis is derived based on the coded reference index. As before, this list may include motion vectors of neighboring blocks that are associated with the same reference index as well as a temporal motion vector predictor which is derived based on the motion parameters of the neighboring block of the co-located block in a temporal reference picture. Video decoder 30 may recover a motion vector of the current PU by adding the MVD to the motion vector indicated by the selected AMVP candidate. That is, video decoder 30 may determine, based on a motion vector indicated by the selected AMVP candidate and the MVD, the motion vector of the current PU. Video decoder 30 may then use the recovered motion vector or motion vectors of the current PU to generate predictive blocks for the current PU.

When a video coder generates an AMVP candidate list for a current PU, the video coder may derive one or more AMVP candidates based on the motion information of PUs (i.e., spatially-neighboring PUs) that cover locations that spatially neighbor the current PU and one or more AMVP candidates based on motion information of PUs that temporally neighbor the current PU. In this disclosure, a PU (or other type of video unit) may be said to "cover" a location if a prediction block associated with the PU (or other type of sample block associated with the video unit) includes the location. The candidate list may include motion vectors of neighboring blocks that are associated with the same reference index as well as a temporal motion vector predictor which is derived based on the motion parameters (i.e., motion information) of the neighboring block of the co-located block in a temporal reference picture.

Figure 2:
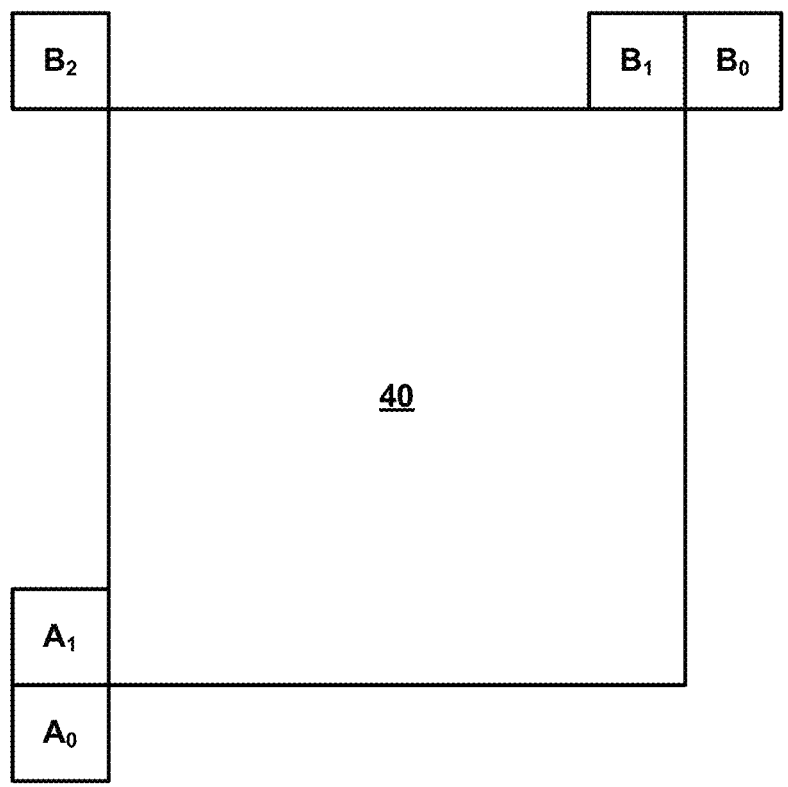
FIG. 2 is a conceptual diagram illustrating example spatially-neighboring prediction units (PUs) relative to a current PU.

FIG. 2 is a conceptual diagram illustrating example spatially-neighboring PUs relative to a current PU 40. In the example of FIG. 2, the spatially-neighboring PUs may be PUs that cover the locations indicated as $A_0, A_1, B_0, B_1$, and $B_2$. In other words, an example relationship between current PU 40 and its spatial neighboring PUs is depicted in FIG. 2.

With regard to the spatial neighbor PUs, the following symbols may be defined:
  A luma location (xP, yP) is used to specify the top-left luma sample of the current PU relative to the top-left sample of the current picture;
  Variables nPSW and nPSH denote the width and the height of the PU for luma;
  The top-left luma sample of the current PU N relative to the top-left sample of the current picture is (xN, yN).
(xN, yN) (with N being replaced by $A_0, A_1, B_0, B_1$ or $B_2$) is defined as (xP−1, yP+nPSH), (xP−1, yP+nPSH−1), (xP+nPSW, yP−1), (xP+nPSW−1, yP−1) or (xP−1, yP−1), respectively.

A candidate in a merge candidate list or an AMVP candidate list that is based on the motion information of a PU that temporally neighbors a current PU (i.e., a PU that is associated with a different time instance than the current PU) may be referred to as a TMVP. A TMVP may be used to improve the coding efficiency of HEVC and, different from other coding tools, a TMVP may need to access a motion vector of a frame in a decoded picture buffer or, more specifically, in a reference picture list.

To determine a TMVP, a video coder may firstly identify a reference picture that includes a PU that is co-located with the current PU. In other words, the video coder may identify a so-called "co-located picture." If the current slice of the current picture is a B slice (i.e., a slice that is allowed to include bi-directionally inter predicted PUs), video encoder 20 may signal, in a slice header, a syntax element (e.g., collocated_from_l0_flag) that indicates whether the co-located picture is from RefPicList0 or RefPicList1. In other words, when the use of TMVPs is enabled for a current slice, and the current slice is a B slice (e.g., a slice that is allowed to include bi-directionally inter predicted PUs), video encoder 20 may signal a syntax element (e.g., collocated_from_l0_flag) in a slice header to indicate whether the co-located picture is in RefPicList0 or RefPicList1.

A syntax element (e.g., collocated_ref_idx) in a slice header may indicate a co-located picture in the identified reference picture list. Thus, after video decoder 30 identifies the reference picture list that includes the co-located picture, video decoder 30 may use collocated_ref_idx, which may be signaled in a slice header, to identify the co-located picture in the identified reference picture list.

The video coder may identify a co-located PU by checking the co-located picture. The TMVP may indicate either the motion information of a right-bottom PU of the CU containing the co-located PU, or the motion information of the right-bottom PU within the center PUs of the CU containing this PU. Thus, either the motion of the right-bottom PU of the CU containing this PU, or the motion of the right-bottom PU within the center PUs of the CU containing this PU is used. The right-bottom PU of the CU containing the co-located PU may be a PU that covers a location co-located with a location immediately below and right of a bottom-right sample of a prediction block of the PU. In other words, the TMVP may indicate the motion information of a PU that is in the reference picture and that covers a location that is co-located with a bottom right corner of the current PU, or the TMVP may indicate the motion information of a PU that is in the reference picture and that covers a location that is co-located with a center of the current PU.

When the video coder generates a motion vector candidate (e.g., a candidate in a merge list of an AMVP candidate list) that specifies a motion vector of a TMVP in a temporal reference picture, the video coder may scale the motion vector of the TMVP based on the temporal location (reflected by POC value) of the temporal reference picture. In other words, the video coder may scale a motion vector of the motion vector candidate based on a POC distance between the current picture and the reference picture. For instance, when a video coder scales a motion vector based on a POC distance between a first picture and a second picture, the video coder may increase the magnitude of the motion vector by greater amounts when a difference between the POC values of the first picture and the second picture is greater than when a difference between the POC values of the first picture and the second picture is less.

The target reference index of all possible reference picture lists for the temporal merging candidate derived from a TMVP may be always set to 0. However, for AMVP, the target reference index of all possible reference pictures may be set equal to the decoded reference index. In HEVC, a SPS may include a flag (e.g., sps_temporal_mvp_enable_flag) and the slice header may include a flag (e.g., pic_temporal_mvp_enable_flag) when sps_temporal_mvp_enable_flag is equal to 1. When both pic_temporal_mvp_enable_flag and a temporal_id are equal to 0 for a particular picture, no motion vector from pictures before that particular picture in decoding order are used as a TMVP in decoding of the particular picture or a picture after the particular picture in decoding order.

In HEVC and other video coding specifications, random access refers to a decoding of a bitstream starting from a coded picture that is not the first coded picture in the bitstream. The insertion of random access pictures or random access points into a bitstream at regular intervals may enable random access. Example types of random access pictures include IDR pictures, CRA pictures, and BLA pictures. Hence, IDR pictures, CRA pictures and BLA pictures are collectively referred to as random access point (RAP) pictures.

The random access concept of HEVC is extended to the multi-view and 3DV extensions of HEVC (i.e., MV-HEVC and 3D-HEVC). JCT3V-A1004 includes definitions of the random access point access units as well as the random access view component. In MV-HEVC and 3D-HEVC, whether a view component is a random access point or not may depend on the NAL unit type of the view component. If the type of the view component belongs to those defined in the HEVC base specification for random access point pictures, the current view component is a random access point view component (or for simplicity, random access point picture of the current view).

Random access functionality may only apply to temporal prediction in a way that certain predictions in the temporal dimension (thus prediction within a view) is either disabled or constrained similarly as in the HEVC base specification. However, inter-view prediction for a random access point view component is still possible, and typical, to improve the coding efficiency, similar to the use of anchor pictures in H.264/MVC. If a random access point (RAP) view component is a P or B picture, the RAP view component may use inter-view prediction.

In multi-view coding, there may be multiple views of the same scene from different viewpoints. The term "access unit" is used to refer to the set of pictures that correspond to the same time instance. Thus, video data may be conceptualized as a series of access units occurring over time. A "view component" may be a coded representation of a view in a single access unit. In this disclosure, a "view" may refer to a sequence of view components associated with the same view identifier.

Multi-view coding supports inter-view prediction. Inter-view prediction is similar to the inter prediction used in H.264/AVC, HEVC, or other video coding specifications and may use the same syntax elements. However, when a video coder performs inter-view prediction on a current video unit (such as a macroblock, PU, or other type of video unit), video encoder 20 may use, as a reference picture, a picture that is in the same access unit as the current video unit, but in a different view. In other words, in multi-view coding, inter-view prediction is performed among pictures captured in the different views of the same access unit (i.e., within the same time instance) to remove correlation between views. In contrast, conventional inter prediction only uses pictures in different access units as reference pictures.

In multi-view coding, a bitstream may have a plurality of layers. The layers may correspond to different views. A view may be referred to as a "base view" if a video decoder (e.g., video decoder 30) can decode pictures associated with the view without reference to pictures in any other view. A view may be referred to as a non-base view if decoding of the view is dependent on decoding of pictures associated with one or more other views.

For instance, NAL units may include headers (i.e., NAL unit headers) and payloads (e.g., RBSPs). The NAL unit headers may include nuh_reserved_zero_6 bits syntax elements. NAL units that have nuh_reserved_zero_6 bit syntax elements that specify different values belong to different "layers" of a bitstream. Thus, in multi-view coding, 3DV, or SVC, the nuh_reserved_zero_6 bits syntax element of a NAL unit specifies a layer identifier (i.e., a layer ID) of the NAL unit. In some examples, the nuh_reserved_zero_6 bits syntax element of a NAL unit is equal to 0 if the NAL unit relates to a base layer in multi-view coding, 3DV coding, or SVC. Data in a base layer of a bitstream may be decoded without reference to data in any other layer of the bitstream. If the NAL unit does not relate to a base layer in multi-view coding, 3DV, or SVC, the nuh_reserved_zero_6 bits syntax element may have a non-zero value. As indicated above, in multi-view coding and 3DV coding, different layers of a bitstream may correspond to different views. In SVC, layers other than the base layer may be referred to as "enhancement layers" and may provide information that enhances the visual quality of video data decoded from the bitstream.

Furthermore, some pictures within a layer may be decoded without reference to other pictures within the same layer. Thus, NAL units encapsulating data of certain pictures of a layer may be removed from the bitstream without affecting the decodability of other pictures in the layer. Removing NAL units encapsulating data of such pictures may reduce the frame rate of the bitstream. A subset of pictures within a layer that may be decoded without reference to other pictures within the layer may be referred to herein as a "sub-layer" or a "temporal sub-layer."

NAL units may also include temporal_id syntax elements. The temporal_id syntax element of a NAL unit specifies a temporal identifier of the NAL unit. The temporal identifier of a NAL unit identifies a sub-layer with which the NAL unit is associated. Thus, each sub-layer of a bitstream may be associated with a different temporal identifier. If the temporal identifier of a first NAL unit is less than the temporal identifier of a second NAL unit, the data encapsulated by the first NAL unit may be decoded without reference to the data encapsulated by the second NAL unit.

When coding a picture in one of the non-base views, a video coder (such as video encoder 20 or video decoder 30) may add a picture into a reference picture list if the picture is in a different view than the picture that the video coder is currently coding but is in a same time instance (i.e., access unit) as the picture that the video coder is currently coding Like other inter prediction reference pictures, the video coder may insert an inter-view prediction reference picture at any position of a reference picture list. In other words, a picture coded with inter-view prediction may be added into a reference picture list for the inter-view prediction of the other non-base views.

Figure 3:
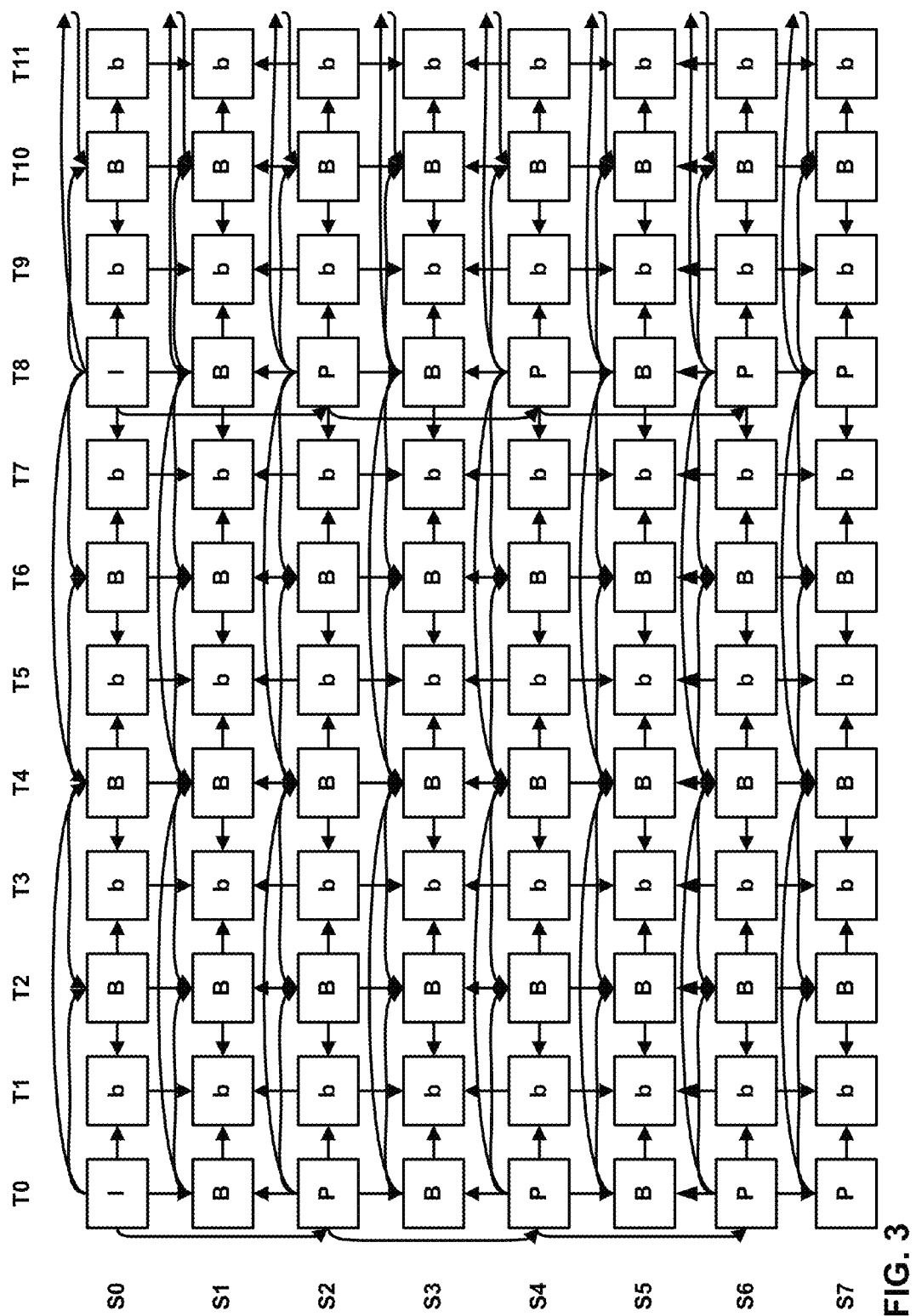
FIG. 3 is a conceptual diagram illustrating an example prediction structure for multi-view coding.

FIG. 3 is a conceptual diagram illustrating an example prediction structure for multi-view coding. The multi-view prediction structure of FIG. 3 includes temporal and inter-view prediction. In the example of FIG. 3, each square corresponds to a view component. In the example of FIG. 3, access units are labeled T0 . . . T11 and views are labeled S0 . . . S7. Squares labeled "I" are intra predicted view components. Squares labeled "P" are uni-directionally inter predicted view components. Squares labeled "B" and "b" are bi-directionally inter predicted view components. Squares labeled "b" may use squares labeled "B" as reference pictures. An arrow that points from a first square to a second square indicates that the first square is available in inter prediction as a reference picture for the second square. As indicated by the vertical arrows in FIG. 3, view components in different views of the same access unit may be available as reference pictures. The use of one view component of an access unit as a reference picture for another view component of the same access unit may be referred to as inter-view prediction.

In the MVC extension of H.264/AVC, inter-view prediction is supported by disparity motion compensation, which uses the syntax of the H.264/AVC motion compensation, but allows a picture in a different view to be used as a reference picture. Coding of two views may also be supported by the MVC extension of H.264/AVC. One of the advantages of the MVC extension of H.264/AVC is that an MVC encoder may take more than two views as a 3D video input and an MVC decoder may decode such a multi-view representation. Consequently, any renderer with a MVC decoder may expect 3D video contents with more than two views.

In the context of multi-view video coding, there are two kinds of motion vectors. One kind of motion vector is a normal motion vector that points to a temporal reference picture. The type of inter prediction corresponding to a normal, temporal motion vector may be referred to as motion-compensated prediction (MCP). When an inter-view prediction reference picture is used for motion compensation, the corresponding motion vector may be referred to as a "disparity motion vector." In other words, a disparity motion vector points to a picture in a different view (i.e., a disparity reference picture or an inter-view reference picture). The type of inter prediction corresponding to a disparity motion vector may be referred to as "disparity-compensated prediction" or "DCP."

As mentioned above, a multi-view extension of HEVC (i.e., MV-HEVC) and a 3DV extension of HEVC are under development. Gerhard Tech et al., "3D-HEVC Test Model Description draft 1," JCT3V-A1005, Joint Collaborative Team on 3D Video Coding Extension Development of ITU-T SG 16 WP 3 and ISO/IEC JTC 1/SC 29/WG 11, 1st Meeting: Stockholm, SE, 16-20 Jul. 2012 (hereinafter, "3D-HEVC Test Model 1"), provides a reference software description, as well as the working draft, of 3D-HEVC. Gerhard Tech et al., "MV-HEVC Working Draft 1," JCT3V-A1004, Joint Collaborative Team on 3D Video Coding Extension Development of ITU-T SG 16 WP 3 and ISO/IEC JTC 1/SC 29/WG 11, 1st Meeting: Stockholm, SE, 16-20 Jul. 2012 (hereinafter, "JCT3V-A1004"), provides a working draft for MV-HEVC.

MV-HEVC and 3D-HEVC may improve coding efficiency using inter-view motion prediction and inter-view residual prediction. In inter-view motion prediction, a video coder may determine (i.e., predict) the motion information of a current PU based on the motion information of a PU in a different view than the current PU. In other words, a corresponding block of the current PU is identified by a disparity vector, and the motion vectors of the corresponding block may be used as an additional candidate of the AMVP or merge list of the current PU. In addition, the disparity vector may be converted to a disparity motion vector and added into the AMVP or merge list. In inter-view residual prediction, a video coder may determine residual blocks of a current CU based on residual data in a different view than the current CU. That is, in inter-view residual prediction, if the corresponding blocks of the current CU contain non-zero residual pixels, the residue of the blocks are used to predict the residue of the current CU.

To enable inter-view motion prediction and inter-view residual prediction, a video coder may determine disparity vectors for blocks (e.g., PUs, CUs, etc.). In general, a disparity vector is used as an estimator of the displacement between two views. A video coder may use a disparity vector for a block either to locate a reference block in another view for inter-view motion or residual prediction, or the video coder may convert the disparity vector to a disparity motion vector for inter-view motion prediction.

In some examples, the video coder may use the method of Neighboring Blocks Based Disparity Vector (NBDV) to derive a disparity vector for a block. 3D-HEVC first adopted the NBDV derivation process proposed in L. Zhang et al., "3D-CE5.h: Disparity vector generation results," Joint Collaborative Team on 3D Video Coding Extension Development of ITU-T SG 16 WP 3 and ISO/IEC JTC 1/SC 29/WG 11, 1$^{st}$ Meeting: Stockholm, SE, 16-20 Jul. 2012, document JCT3V-A0097 (hereinafter, "JCT3V-A0097"). The NBDV derivation process has since been further adapted. For instance, implicit disparity vectors (IDVs) were included with a simplified NBDV in Sung et al., "3D-CE5.h: Simplification of disparity vector derivation for HEVC-based 3D video coding," Joint Collaborative Team on 3D Video Coding Extension Development of ITU-T SG 16 WP 3 and ISO/IEC JTC 1/SC 29/WG 11, 1st Meeting: Stockholm, SE, 16-20 Jul.

2012, document JCT3V-A0126 (hereinafter, "JCT3V-A0126"). Furthermore, in Kang et al., "3D-CE5.h related: Improvements for disparity vector derivation," Joint Collaborative Team on 3D Video Coding Extension Development of ITU-T SG 16 WP 3 and ISO/IEC JTC 1/SC 29/WG 11, 2nd Meeting: Shanghai, CN, 13-19 Oct. 2012, document JCT3V-B0047 (hereinafter, "JCT3V-B0047"), the NBDV derivation process is further simplified by removing the IDVs stored in the decoded picture buffer, but also provides an improvement in terms of coding gain with the RAP picture selection.

The NBDV derivation process uses disparity motion vectors from spatial and temporal neighboring blocks to derive the disparity vector for the current block. Because neighboring blocks (e.g., blocks that spatially or temporally neighbor the current block) are likely to share almost the same motion and disparity information in video coding, the current block can use the motion vector information in the neighboring blocks as predictors of the disparity vector for the current block. In other words, because neighboring blocks share almost the same motion/disparity information in video coding, the current block can use the motion vector information in neighboring blocks as a good predictor to improve a coding gain. Following this idea, the NBDV derivation process uses the neighboring disparity information for estimating the disparity vector in different views.

When a video coder performs the NBDV derivation process to determine a disparity vector for a current block, the video coder may utilize two sets of neighboring blocks. One set is from spatially-neighboring blocks and the other set is from temporally-neighboring blocks. In other words, several spatial and temporal neighboring blocks are firstly defined. The video coder then checks each of the neighboring blocks in a pre-defined order determined by the priority of the correlation between the current block and the neighboring block. Once the video coder finds a disparity motion vector in the candidates (i.e., the neighboring blocks), the video coder converts the disparity motion vector into the disparity vector for the current block.

In some versions of the NBDV derivation process, the video coder uses five spatial neighboring blocks for disparity vector derivation. For instance, the video coder may check the following spatially-neighboring blocks: the below-left spatially-neighboring block, the left spatially-neighboring block, the above-right spatially-neighboring block, the above spatially-neighboring block, and the above-left spatially-neighboring block of the current block. In some versions of the NBDV derivation process, the five spatially-neighboring blocks used for disparity vector derivation blocks may cover the locations $A_0, A_1, B_0, B_1,$ and $B_2$, respectively, as indicated in FIG. 2. In some examples, the spatially-neighboring blocks used in the NBDV derivation process are the same as those used in the merge modes in HEVC. Therefore, in some such examples, no additional memory access is required.

In some examples, the video coder may check the spatial neighboring blocks one by one. Furthermore, in some examples, the checking order of the five spatial neighboring blocks is defined as $A_1, B_1, B_0, A_0,$ and $B_2$.

Furthermore, as mentioned above, a video coder may check temporally-neighboring blocks as part of the process of determining a disparity vector for a current block (e.g., a current PU). When the video coder checks temporal neighboring blocks (e.g., temporal neighboring PUs), the video coder may first perform a construction process of a candidate picture list. When the video coder performs the construction process of the candidate picture list, the video coder may treat all reference pictures associated with the current view (i.e., the view associated with the current block) as candidate pictures. Furthermore, when the video coder performs the construction process of the candidate picture list, the video coder may first insert a so-called "co-located picture" into the candidate picture list, followed by the rest of the candidate pictures in ascending order of reference index. That is, the video coder may insert the remaining candidate pictures into the candidate picture list in accordance with the order that the remaining candidate pictures occur in reference picture lists (e.g., RefPicList0 and RefPicList1) of the current picture. One or more syntax elements in a slice header of a slice containing the current block may indicate the co-located picture. When the reference pictures with the same reference index in both reference picture lists (e.g., RefPicList0 and RefPicList1) are available for use in the NDBV derivation process, the reference picture in the same reference picture list as the co-located picture precedes, in the candidate picture list, the other reference picture.

After generating the candidate picture list, the video coder may determine candidate regions within the candidate pictures in the candidate picture list. The video coder may use the candidate regions to determine temporally-neighboring blocks. As indicated above, the video coder may derive a disparity vector for the current block based on a disparity motion vector or an IDV of a temporally-neighboring block. In some examples, for each candidate picture in the candidate picture list, the video coder may determine three candidate regions. The three candidate regions may be defined as follows:

CPU: A co-located region of the current PU or current CU.
    CLCU: A largest coding unit (LCU) covering the co-located region of the current PU.
    BR: A bottom-right 4×4 block of the CPU.

Because smaller blocks in a 16×16 block share the same motion information as a result of motion compression, the video coder may check only one sample block for a disparity vector. When a candidate region covers more than one 16×16 block, the video coder may check all 16×16 blocks in the candidate region according to a raster scan order. For instance, a motion vector for a temporally co-located block is stored in a 16×16 block of a reference picture, and, typically, the video coder accesses a 4×4 block to find a motion vector. Thus, if the video coder places the candidate block in a 16×16 block, all the 4×4 blocks contain a common motion vector, and the video coder does not need to check all the 4×4 blocks to find a different motion vector. On the other hand, if the candidate region is larger than 16×16, the 4×4 blocks outside the 16×16 block may contain a different motion vector.

When the video coder checks a candidate region (or a 16×16 block within a candidate region), the video coder may determine whether a PU that covers the candidate region specifies a disparity motion vector. If the PU that covers the candidate region specifies a disparity motion vector, the video coder may determine the disparity vector for the current video unit based on the disparity motion vector of the PU.

In some examples, the video coder may perform a priority-based disparity vector determination as part of performing an NBDV derivation process. For example, the video coder may derive the disparity vector such that once the video coder identifies a neighboring block that contains a disparity motion vector, the video coder converts the disparity motion vector to the disparity vector for the current block. The video coder may then use the disparity vector for inter-view motion prediction and/or inter-view residual prediction. In some examples, the checking order of neighboring blocks is defined based on the correlation between the neighboring blocks and the current block. For instance, the video coder may firstly check spatial neighboring blocks one by one.

Once the video coder has identified a disparity motion vector, the video coder returns the disparity motion vector as the disparity vector. In some examples, the checking order of the five spatial neighboring blocks is defined as $A_1$, $B_1$, $B_0$, $A_0$ and $B_2$.

Furthermore, for each candidate picture in the candidate picture list, the video coder may check three candidate regions in this candidate picture in order. The checking order of the three regions is defined as: CPU, CLCU and BR for the first non-base view or BR, CPU, CLU for the second non-base view. In this example, decoding of pictures associated with the first non-base view may depend on decoding of pictures associated with a base view, but not pictures associated with other views. Furthermore, in this example, decoding of pictures associated with the second non-base view may depend on decoding of pictures associated with the base view and, in some instances, the first non-base view, but not pictures associated with other views, if present. For simplicity, the disparity motion vectors in the spatial neighboring blocks may be denoted as spatial disparity vectors (SDVs) and the disparity motion vectors in the temporal neighboring blocks may be denoted as temporal disparity vectors (TDVs).

When the video coder checks the motion vector(s) of a block (i.e., a spatially-neighboring block, a candidate region of a candidate picture, or a 16×16 block of a candidate region of a candidate picture), the video coder may determine whether the motion vector(s) of the block are disparity motion vectors. A disparity motion vector of a block of a picture is a motion vector pointing to a location within a disparity reference picture of the picture. A disparity reference picture (also referred to herein as an inter-view reference picture) of a given picture may be a picture that is associated with the same access unit as the given picture, but is associated with a different view than the given picture. When the video coder identifies a disparity motion vector, the video coder may terminate the checking process. The video coder may convert the returned disparity motion vector to a disparity vector and may use the disparity vector for inter-view motion prediction and inter-view residual prediction. For example, the video coder may set a horizontal component of the disparity vector for the current block equal to a horizontal component of the disparity motion vector and may set the vertical component of the disparity vector to 0.

When the video coder checks a spatially-neighboring block (e.g., a spatially-neighboring PU), the video coder may first check whether the spatially-neighboring block has a disparity motion vector. If none of the spatially-neighboring blocks has a disparity motion vector, the video coder may determine whether any of the spatially-neighboring blocks has an IDV. Furthermore, when the video coder identifies a disparity motion vector or an IDV, the video coder may return the identified disparity motion vector or IDV.

When the video coder determines whether any of the spatially-neighboring PUs has an IDV, the video coder may check the spatially-neighboring PUs in the order of $A_0$, $A_1$, $B_0$, $B_1$, and $B_2$. Thus, the video coder may check the spatially-neighboring PUs in the order of $A_1$, $B_1$, $B_0$, $A_0$ and $B_2$ for disparity motion vectors and check the spatially-neighboring PUs in the order of $A_0$, $A_1$ $B_0$, $B_1$, and $B_2$ for IDVs. If one of the spatially-neighboring PUs has an IDV and the IDV is coded as merge/skip mode, the video coder may terminate the checking process and may use the IDV as the final disparity vector for the current block.

If the video coder is unable to derive a disparity vector for the current block (i.e., if no disparity vector is found) by performing the NBDV derivation process, the video coder may use a zero disparity vector as the disparity vector for the current block. The zero disparity vector is a disparity vector having both horizontal and vertical components equal to 0. Thus, even when the NBDV derivation process returns an unavailable result, other coding processes of the video coder that require a disparity vector may use a zero disparity vector for the current block. In some examples, if the video coder is unable to derive a disparity vector for the current block by performing the NBDV derivation process, the video coder may disable inter-view residual prediction for the current block. However, regardless of whether the video coder is able to derive a disparity vector for the current block by performing the NBDV derivation process, the video coder may use inter-view motion prediction for the current PU. That is, if no disparity vector is found after checking all the pre-defined neighboring blocks, a zero disparity vector may be used for inter-view motion prediction while inter-view residual prediction may be disabled for the corresponding CU.

When the video coder checks a spatially-neighboring PU, the video coder may first check whether the neighboring PU has a disparity motion vector. If none of the spatially-neighboring PUs has a disparity motion vector, the video coder may determine whether any of the spatially-neighboring PUs has an IDV. An IDV may be a disparity vector for a spatially- or temporally-neighboring PU that is coded using inter-view motion prediction or inter-view residual prediction. For example, when a video coder codes a block with inter-view motion prediction, the video coder may need to derive a disparity vector for selecting a corresponding block in a different view. In this example, the term "IDV" may refer to the disparity vector derived in the inter-view motion prediction. Even though the corresponding block may be coded with temporal motion prediction, the video coder does not discard the derived disparity vector for the purpose of coding one or more following blocks. In this way, an IDV may be stored to the block for the purpose of disparity vector derivation.

In some examples where the video coder checks IDVs as part of the NBDV derivation process, the video coder may perform the following steps. If any of the following steps find a disparity vector, the video coder may terminate the derivation process.

Step 1: Check the five spatial neighboring blocks in the order of $A_1$, $B_1$, $B_0$, $A_0$ and $B_2$ to find a disparity motion vector. Once a disparity motion vector is found, the video coder converts the disparity motion vector to a disparity vector. If the spatial neighboring blocks contain IDVs, the video coder marks their IDV flags as "IDV used" and stores the associated values of the IDV flags.

Step 2: When temporal motion vector prediction is enabled, the following applies:
a) If the current coding mode is AMVP, the reference picture with the target reference index in the target reference picture list is used as the co-located picture. Two blocks in the co-located picture are defined (i.e., the bottom right block of the co-located PU (BR) and the center block of the co-located PU (CB)). In this example, the video coder checks the blocks of the co-located picture in the following order:
1) Check BR to determine whether BR contains a disparity motion vector. If yes, the video coder converts the disparity motion vector to a disparity vector. Otherwise, if BR is coded as the skip mode and BR contains an IDV (i.e., the flag of IDV is equal to 1), the video coder marks BR as "IDV used" and stores the associated IDV. The video coder may then perform Step 3 below.
2) Check CB to determine whether CB contains a disparity motion vector. If yes, the video coder converts the disparity motion vector to a disparity vector. Otherwise, if BR is coded as the skip mode and BR contains an IDV (i.e., the flag of IDV is equal to 1), the video coder marks BR as "IDV used" and the video coder stores the associated IDV. The video coder may then perform Step 3.

b) If the current coding mode is skip/merge, the video coder uses two co-located reference pictures in each reference picture list, if applicable. The reference indexes that indicate the co-located reference pictures may be equal to the reference index of the left neighboring PU or 0. For each of the co-located pictures in the reference picture lists 0 and 1, the video coder may perform the steps in Step 2, a) 1) and a) 2) in order.

Step 3: If one of the five spatial neighboring blocks is coded as a skip mode and the spatial neighboring block contains an IDV (i.e., the spatial neighboring block has a flag marked as "IDV used"), the video coder returns the IDV as a disparity vector. In this example, the checking order of spatial neighboring blocks for IDVs is $A_0$, $A_1$, $B_0$, $B_1$, and $B_2$.

Step 4: If temporal motion vector prediction is enabled and there is one block in the co-located picture (i.e., BR or CB) that is marked as "IDV used," the video coder converts the IDV associated with the block to a disparity vector.

The memory bandwidth and complexity requirements associated with accessing an IDV in a decoded picture buffer (DPB) may be large. Accordingly, a video coder may perform a low-complexity NBDV derivation process. The video coder considers fewer block candidates when the video coder performs the low complexity NBDV derivation process. For example, the video coder may store, in the DPB, extra information for IDVs. In this example, the extra information for IDVs may include IDV flags and vectors for all the previously-coded pictures. Furthermore, in a low complexity NBDV derivation process, removing the IDV candidates in the DPB can reduce the memory bandwidth. In other words, the video coder does not store IDV-related information in the DPB.

Figure 4:
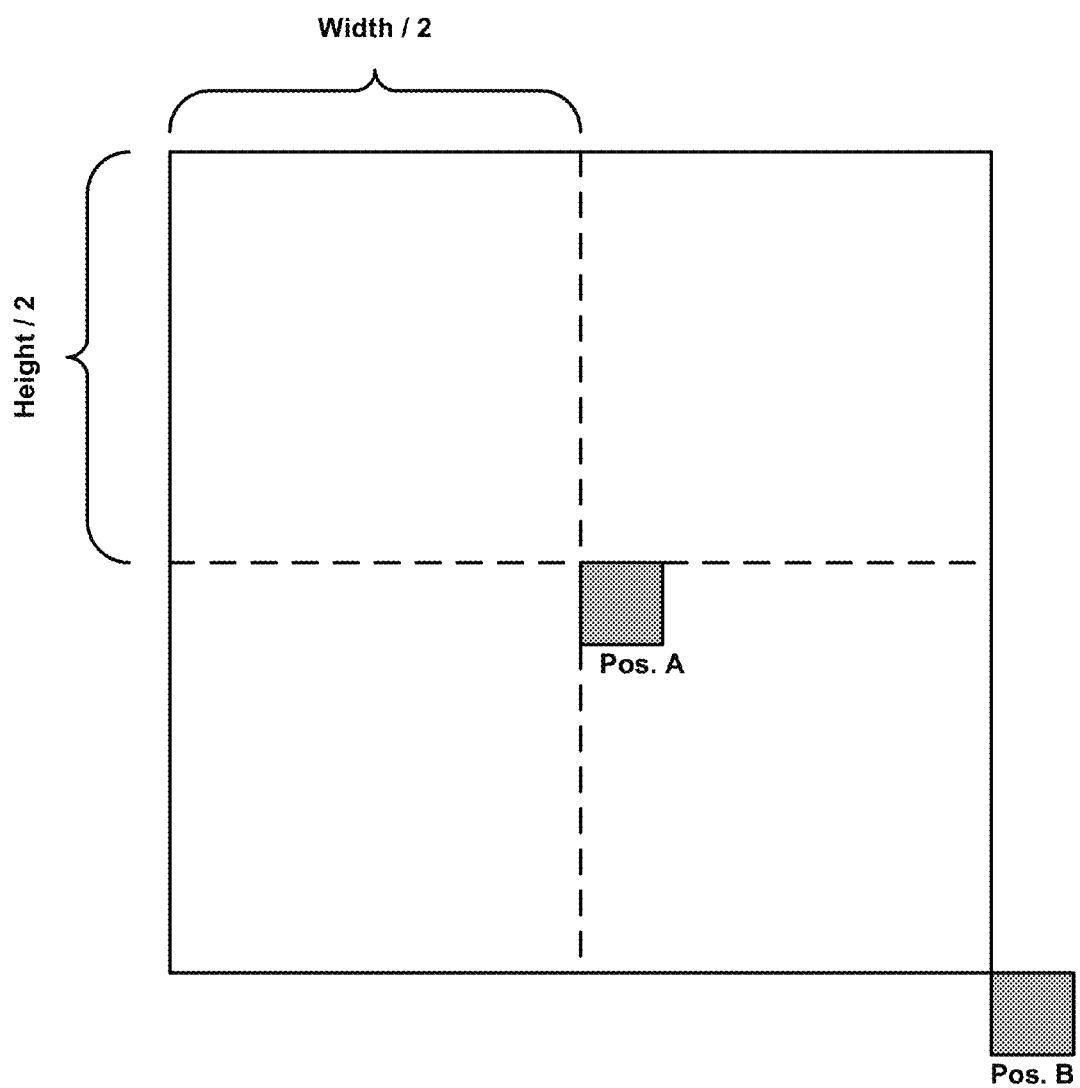
FIG. 4 is a conceptual diagram illustrating temporal neighbors in a corresponding PU of a temporal candidate picture.

In some low-complexity NBDV derivation processes, the video coder checks fewer candidate regions of candidate pictures than in the NBDV derivation process described above. For example, FIG. 4 is a conceptual diagram illustrating temporal neighbors in a corresponding PU of a temporal candidate picture. In the example of FIG. 4, the video coder may check candidate regions covering the positions indicated by "Pos. A" and "Pos. B." Furthermore, in some low-complexity NBDV derivation processes, the video coder may check candidate regions of only a co-located picture and a random access picture. Thus, in some examples, a co-located picture and a random access picture are considered for temporal block checks (i.e., bottom-below and center blocks as shown in FIG. 4).

Furthermore, in some low-complexity NBDV derivation processes, the video coder may perform the candidate picture derivation in a slice or picture level once. In other words, the video coder may generate the candidate picture list for use in the NBDV derivation process once per picture or slice. Consequently, in such low-complexity NBDV derivation processes, the video coder no longer invokes the candidate picture derivation process at the PU or CU level.

The processes for deriving a disparity vector in 3D-HEVC Test Model 1 may have the several problems. For example, in 3D-HEVC Test Model 1, the disparity vector derivation method prunes all the following derivation process once a disparity motion vector or IDV is found. In other words, when the video coder performs the NBDV derivation process, the video coder stops checking neighboring blocks when the video coder identifies a disparity motion vector or when the video coder identifies an IDV. This early termination process may provide an inaccurate disparity vector candidate because only the disparity vector is found earlier than the other candidates. In the current NBDV scheme, there is no way to reject or modify the inaccurate disparity vector candidate. The use of an inaccurate disparity vector can degrade coding performance in inter-view residual prediction and inter-view motion prediction in 3D-HEVC or other video coding standards or specifications.

In general, this disclosure describes techniques for deriving a disparity vector for a current block (e.g., a PU, CU, etc.) by considering more than one available disparity motion vector or IDV from among the spatial and/or temporal neighboring blocks of the current block.

In accordance with one example technique of this disclosure, a video coder (e.g., video encoder 20 or video decoder 30) may perform a two-step process to derive a disparity vector for a current block. In the first step, the video coder searches neighboring blocks to generate multiple disparity vector candidates. In some examples, each disparity vector candidate is a separate disparity motion vector. In other examples, each disparity vector candidate is a separate disparity motion vector or IDV. Thus, in the first step, the video coder does not stop searching the neighboring blocks after identifying a first disparity motion vector or IDV. In the second step, the video coder may apply one or more mathematical functions to the multiple disparity vector candidates in order to determine a final disparity vector for the current block. In some instances, the video coder may apply the one or more mathematical functions to all of the stored disparity vector candidates. By determining the final disparity vector based on a plurality of disparity vector candidates, the video coder may determine a more accurate final disparity vector. Determining a more accurate final disparity vector may decrease bitstream size.

As indicated above, the video coder may search neighboring blocks to generate disparity vector candidates. In one example, the video coder searches the neighboring blocks in a serial fashion. In this example, the video coder may check the disparity motion vectors in the neighboring blocks and the IDVs in the spatial neighboring blocks in series according to a pre-defined order. The pre-defined order may be the same order used for checking neighboring blocks defined in 3D-HEVC Test Model 1. Furthermore, in this example, the video coder may store an available disparity motion vector or an IDV of a block as a disparity vector candidate.

In another example where the video coder searches neighboring blocks to generate disparity vector candidates, the video coder may search the neighboring blocks in a parallel fashion. In this example, the video coder may check disparity motion vectors in neighboring blocks and the IDVs in spatial neighboring blocks in parallel. For instance, the video coder may check the neighboring blocks based on the category of the disparity motion vectors or IDVs. The categories of disparity motion vectors may include a category for disparity motion vectors of spatial neighboring blocks and a category for disparity motion vectors of temporal neighboring blocks. By performing the parallel searching process, the video coder may determine zero or more disparity vector candidates in each category. Each of the disparity vector candidates may be based on a disparity motion vector or an IDV of a neighboring block. The video coder may store the disparity vector candidates for use in determining the final disparity vector for the current block. For instance, the parallel searching process may provide one or multiple disparity vector candidates (converted from disparity motion vectors or IDVs) for each category and the video coder may store the disparity vector candidates.

Furthermore, in some examples where the video coder searches neighboring blocks to generate a set of disparity vector candidates, the video coder may prune the set of disparity vector candidates. For instance, during the process of searching for disparity vector candidates, when the video coder generates a disparity vector candidate, the video coder may not store the disparity vector candidate if the disparity vector candidate is sufficiently close to one of the existing stored disparity vector candidates. For instance, if a neighboring block has two disparity motion vectors, the video coder may include only one of the disparity motion vectors in the set of disparity vector candidates.

In some examples, the video coder applies an early termination process when the video coder searches neighboring blocks to generate a set of disparity vector candidates. In one example, the video coder may apply an early termination process such that, when the number of disparity vector candidates is more than a particular value, the video coder terminates the process of searching neighboring blocks for disparity vector candidates. In another example, the video coder may apply an early termination process such that, when the number of disparity vector candidates is more than a particular value, the video coder terminates the process of searching neighboring blocks for a particular category (e.g., spatial neighboring blocks or temporal neighboring blocks) for disparity vector candidates.

In at least some of the techniques of this disclosure, a disparity vector candidate can be associated with a reference view index as the output of the disparity derivation process. The reference view index associated with a disparity motion vector may be the view order index (layer_id) of the reference view to which the disparity motion vector points. A view order index may be a value (i.e., an index) that indicates the decoding order of view components in an access unit.

Furthermore, the video coder may apply the mathematical functions to the disparity vector candidates together with the reference view index. In one example, when the video coder applies a median operation to determine the final disparity vector for the current block from among the disparity vector candidates, the video coder applies the median operation only when all the candidates have the same reference view index, otherwise, the video coder may choose any (e.g., the first) disparity vector candidate associated with the reference view index to be the final disparity vector for the current block. For example, when determining the final disparity vector for the current block, the video coder may, in response to determining that all of the disparity vector candidates have the same reference view index, apply a mathematical function to the plurality of disparity vector candidates to determine that the final disparity vector for the current block. For instance, if all of the disparity vector candidates have the same reference view indexes, the video coder may determine that the final disparity vector is a median of the plurality of disparity vector candidates. Furthermore, in this example, in response to determining that not all of the disparity vector candidates have the same reference view index, the video coder may determine that the final disparity vector for the current block is one of the disparity vector candidates.

In another example, when the video coder applies a median operation to determine the final disparity vector for the current block based on the disparity vector candidates, the video coder may always apply the median to the disparity vector candidates. That is, the video coder may determine that the final disparity vector is equal to the median of the disparity vector candidates, regardless of whether the disparity vector candidates are associated with the same reference view index.

Furthermore, in some examples where the mathematical operations to determine the final disparity vector include a maximum operation, the video coder chooses, during the operation, the disparity vector candidate that has the maximum horizontal disparity vector, and the corresponding reference view index is the final reference view index. In other words, the video coder may determine that the final disparity vector for the current block is equal to the disparity vector candidate that has the greatest horizontal component of the disparity vector candidates. In this example, the reference view index of the final disparity vector (i.e., the final reference view index) may be equal to the reference view index of the disparity vector candidate that has the greatest horizontal component of the disparity vector candidates.

Figure 5:
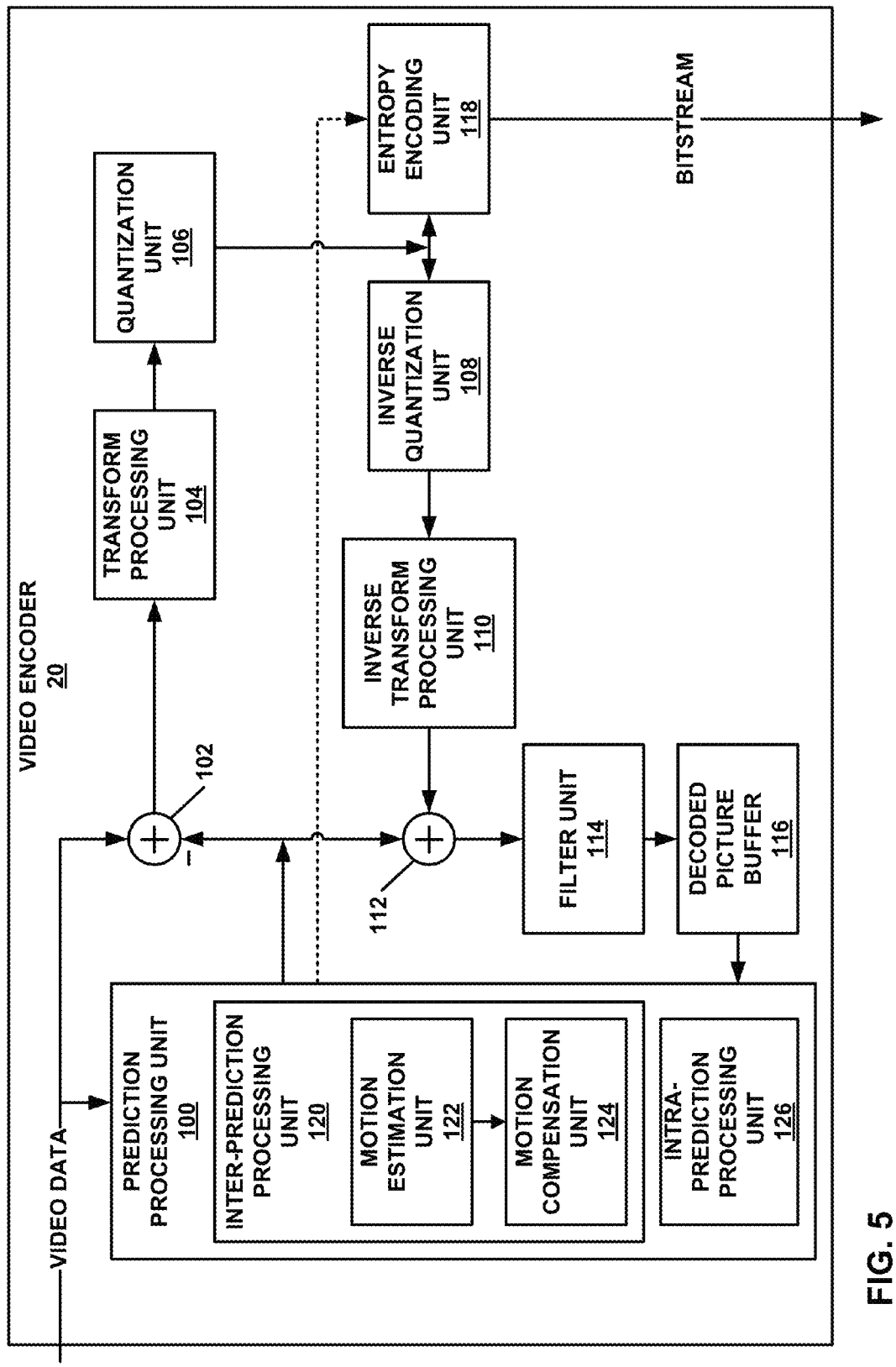
FIG. 5 is a block diagram illustrating an example video encoder that may implement the techniques of this disclosure.

FIG. 5 is a block diagram illustrating an example video encoder 20 that may implement the techniques of this disclosure. FIG. 5 is provided for purposes of explanation and should not be considered limiting of the techniques as broadly exemplified and described in this disclosure. For purposes of explanation, this disclosure describes video encoder 20 in the context of HEVC coding. However, the techniques of this disclosure may be applicable to other coding standards or methods.

In the example of FIG. 5, video encoder 20 includes a prediction processing unit 100, a residual generation unit 102, a transform processing unit 104, a quantization unit 106, an inverse quantization unit 108, an inverse transform processing unit 110, a reconstruction unit 112, a filter unit 114, a decoded picture buffer 116, and an entropy encoding unit 118. Prediction processing unit 100 includes an inter-prediction processing unit 120 and an intra-prediction processing unit 126. Inter-prediction processing unit 120 includes a motion estimation unit 122 and a motion compensation unit 124. In other examples, video encoder 20 may include more, fewer, or different functional components.

Video encoder 20 may receive video data. Video encoder 20 may encode each CTU in a slice of a picture of the video data. Each of the CTUs may be associated with equally-sized luma coding tree blocks (CTBs) and corresponding CTBs of the picture. As part of encoding a CTU, prediction processing unit 100 may perform quad-tree partitioning to divide the CTBs of the CTU into progressively-smaller blocks. The smaller blocks may be coding blocks of CUs. For example, prediction processing unit 100 may partition a CTB associated with a CTU into four equally-sized sub-blocks, partition one or more of the sub-blocks into four equally-sized sub-sub-blocks, and so on.

Video encoder 20 may encode CUs of a CTU to generate encoded representations of the CUs (i.e., coded CUs). As part of encoding a CU, prediction processing unit 100 may partition the coding blocks associated with the CU among one or more PUs of the CU. Thus, each PU may be associated with a luma prediction block and corresponding chroma prediction blocks. Video encoder 20 and video decoder 30 may support PUs having various sizes. As indicated above, the size of a CU may refer to the size of the luma coding block of the CU and the size of a PU may refer to the size of a luma prediction block of the PU. Assuming that the size of a particular CU is 2N×2N, video encoder 20 and video decoder 30 may support PU sizes of 2N×2N or N×N for intra prediction, and symmetric PU sizes of 2N×2N, 2N×N, N×2N, N×N, or similar for inter prediction. Video encoder 20 and video decoder 30 may also support asymmetric partitioning for PU sizes of 2N×nU, 2N×nD, nL×2N, and nR×2N for inter prediction.

Inter-prediction processing unit 120 may generate predictive data for a PU by performing inter prediction on each PU of a CU. The predictive data for the PU may include predictive blocks of the PU and motion information for the PU. Inter-prediction processing unit 120 may perform different operations for a PU of a CU depending on whether the PU is in an I slice, a P slice, or a B slice. In an I slice, all PUs are intra predicted. Hence, if the PU is in an I slice, inter-prediction processing unit 120 does not perform inter prediction on the PU.

If a PU is in a P slice, motion estimation unit 122 may search the reference pictures in a list of reference pictures (e.g., "RefPicList0") for a reference region for the PU. The reference region for the PU may be a region, within a reference picture, that contains samples that most closely correspond to the prediction blocks of the PU. Motion estimation unit 122 may generate a reference index that indicates a position in RefPicList0 of the reference picture containing the reference region for the PU. In addition, motion estimation unit 122 may generate a motion vector that indicates a spatial displacement between a prediction block of the PU and a reference location associated with the reference region. For instance, the motion vector may be a two-dimensional vector that provides an offset from the coordinates in the current picture to coordinates in a reference picture. Motion estimation unit 122 may output the reference index and the motion vector as the motion information of the PU. Motion compensation unit 124 may generate the predictive blocks of the PU based on actual or interpolated samples at the reference location indicated by the motion vector of the PU.

If a PU is in a B slice, motion estimation unit 122 may perform uni-prediction or bi-prediction for the PU. To perform uni-prediction for the PU, motion estimation unit 122 may search the reference pictures of RefPicList0 or a second reference picture list ("RefPicList1") for a reference region for the PU. Motion estimation unit 122 may output, as the motion information of the PU, a reference index that indicates a position in RefPicList0 or RefPicList1 of the reference picture that contains the reference region, a motion vector that indicates a spatial displacement between a prediction block of the PU and a reference location associated with the reference region, and one or more prediction direction indicators that indicate whether the reference picture is in RefPicList0 or RefPicList1. Motion compensation unit 124 may generate the predictive blocks of the PU based at least in part on actual or interpolated samples at the reference location indicated by the motion vector of the PU.

To perform bi-directional inter prediction for a PU, motion estimation unit 122 may search the reference pictures in RefPicList0 for a reference region for the PU and may also search the reference pictures in RefPicList1 for another reference region for the PU. Motion estimation unit 122 may generate reference indexes that indicate positions in RefPicList0 and RefPicList1 of the reference pictures that contain the reference regions. In addition, motion estimation unit 122 may generate motion vectors that indicate spatial displacements between the reference locations associated with the reference regions and a prediction block of the PU. The motion information of the PU may include the reference indexes and the motion vectors of the PU. Motion compensation unit 124 may generate the predictive blocks of the PU based at least in part on actual or interpolated samples at the reference locations indicated by the motion vectors of the PU.

In accordance with one or more techniques of this disclosure, inter-prediction processing unit 120 may determine a disparity vector for a block (e.g., a PU, a CU, etc.). When inter-prediction processing unit determines the disparity vector for the block, inter-prediction processing unit may search a set of neighbor blocks to generate a plurality of disparity vector candidates. Each of the neighbor blocks may be a spatial or temporal neighbor of the current block. Furthermore, inter-prediction processing unit 120 may determine, based at least in part on the plurality of disparity vector candidates, a final disparity vector for the current block. Motion estimation unit 122 may use the disparity vector for the current block to perform inter-view motion prediction. Motion compensation unit 124 may use the disparity vector for the current block to perform inter-view residual prediction.

Intra-prediction processing unit 126 may generate predictive data for a PU by performing intra prediction on the PU. The predictive data for the PU may include predictive blocks for the PU and various syntax elements. Intra-prediction processing unit 126 may perform intra prediction on PUs in I slices, P slices, and B slices.

To perform intra prediction on a PU, intra-prediction processing unit 126 may use multiple intra prediction modes to generate multiple sets of predictive blocks for the PU. When performing intra prediction using a particular intra prediction mode, intra-prediction processing unit 126 may generate predictive blocks for the PU using a particular set of samples from neighboring blocks. The neighboring blocks may be above, above and to the right, above and to the left, or to the left of the prediction blocks of the PU, assuming a left-to-right, top-to-bottom encoding order for PUs, CUs, and CTUs. Intra-prediction processing unit 126 may use various numbers of intra prediction modes, e.g., 33 directional intra prediction modes. In some examples, the number of intra prediction modes may depend on the size of the prediction blocks of the PU.

Prediction processing unit 100 may select the predictive data for PUs of a CU from among the predictive data generated by inter-prediction processing unit 120 for the PUs or the predictive data generated by intra-prediction processing unit 126 for the PUs. In some examples, prediction processing unit 100 selects the predictive data for the PUs of the CU based on rate/distortion metrics of the sets of predictive data. The predictive blocks of the selected predictive data may be referred to herein as the selected predictive blocks.

Residual generation unit 102 may generate, based on the luma, Cb and Cr coding blocks of a CU and the selected predictive luma, Cb and Cr blocks of the PUs of the CU, luma, Cb and Cr residual blocks of the CU. For instance, residual generation unit 102 may generate the residual blocks of the CU such that each sample in the residual blocks has a value equal to a difference between a sample in a coding block of the CU and a corresponding sample in a corresponding selected predictive block of a PU of the CU.

Transform processing unit 104 may perform quad-tree partitioning to partition the residual blocks of a CU into transform blocks associated with TUs of the CU. Thus, a TU may be associated with a luma transform block and two corresponding chroma transform blocks. The sizes and positions of the luma and chroma transform blocks of TUs of a CU may or may not be based on the sizes and positions of prediction blocks of the PUs of the CU.

Transform processing unit 104 may generate transform coefficient blocks for each TU of a CU by applying one or more transforms to the transform blocks of the TU. Transform processing unit 104 may apply various transforms to a transform block associated with a TU. For example, transform processing unit 104 may apply a discrete cosine transform (DCT), a directional transform, or a conceptually-similar transform to a transform block. In some examples, transform processing unit 104 does not apply transforms to a transform block. In such examples, the transform block may be treated as a transform coefficient block.

Quantization unit 106 may quantize the transform coefficients in a coefficient block. The quantization process may reduce the bit depth associated with some or all of the transform coefficients. For example, an n-bit transform coefficient may be rounded down to an m-bit transform coefficient during quantization, where n is greater than m. Quantization may introduce loss of information, thus quantized transform coefficients may have lower precision than the original ones.

Inverse quantization unit 108 and inverse transform processing unit 110 may apply inverse quantization and inverse transforms to a coefficient block, respectively, to reconstruct a residual block from the coefficient block. Reconstruction unit 112 may add the reconstructed residual block to corresponding samples from one or more predictive blocks generated by prediction processing unit 100 to produce a reconstructed transform block associated with a TU. By reconstructing transform blocks for each TU of a CU in this way, video encoder 20 may reconstruct the coding blocks of the CU.

Filter unit 114 may perform one or more deblocking operations to reduce blocking artifacts in the coding blocks associated with a CU. Decoded picture buffer 116 may store the reconstructed coding blocks after filter unit 114 performs the one or more deblocking operations on the reconstructed coding blocks. Inter-prediction processing unit 120 may use a reference picture that contains the reconstructed coding blocks to perform inter prediction on PUs of other pictures. In addition, intra-prediction processing unit 126 may use reconstructed coding blocks in decoded picture buffer 116 to perform intra prediction on other PUs in the same picture as the CU.

Entropy encoding unit 118 may receive data from other functional components of video encoder 20. For example, entropy encoding unit 118 may receive coefficient blocks from quantization unit 106 and may receive syntax elements from prediction processing unit 100. Entropy encoding unit 118 may perform one or more entropy encoding operations on the data to generate entropy-encoded data. For example, entropy encoding unit 118 may perform a context-adaptive variable length coding (CAVLC) operation, a CABAC operation, a variable-to-variable (V2V) length coding operation, a syntax-based context-adaptive binary arithmetic coding (SBAC) operation, a Probability Interval Partitioning Entropy (PIPE) coding operation, an Exponential-Golomb encoding operation, or another type of entropy encoding operation on the data. Video encoder 20 may output a bitstream that includes entropy-encoded data generated by entropy encoding unit 118.

Figure 6:
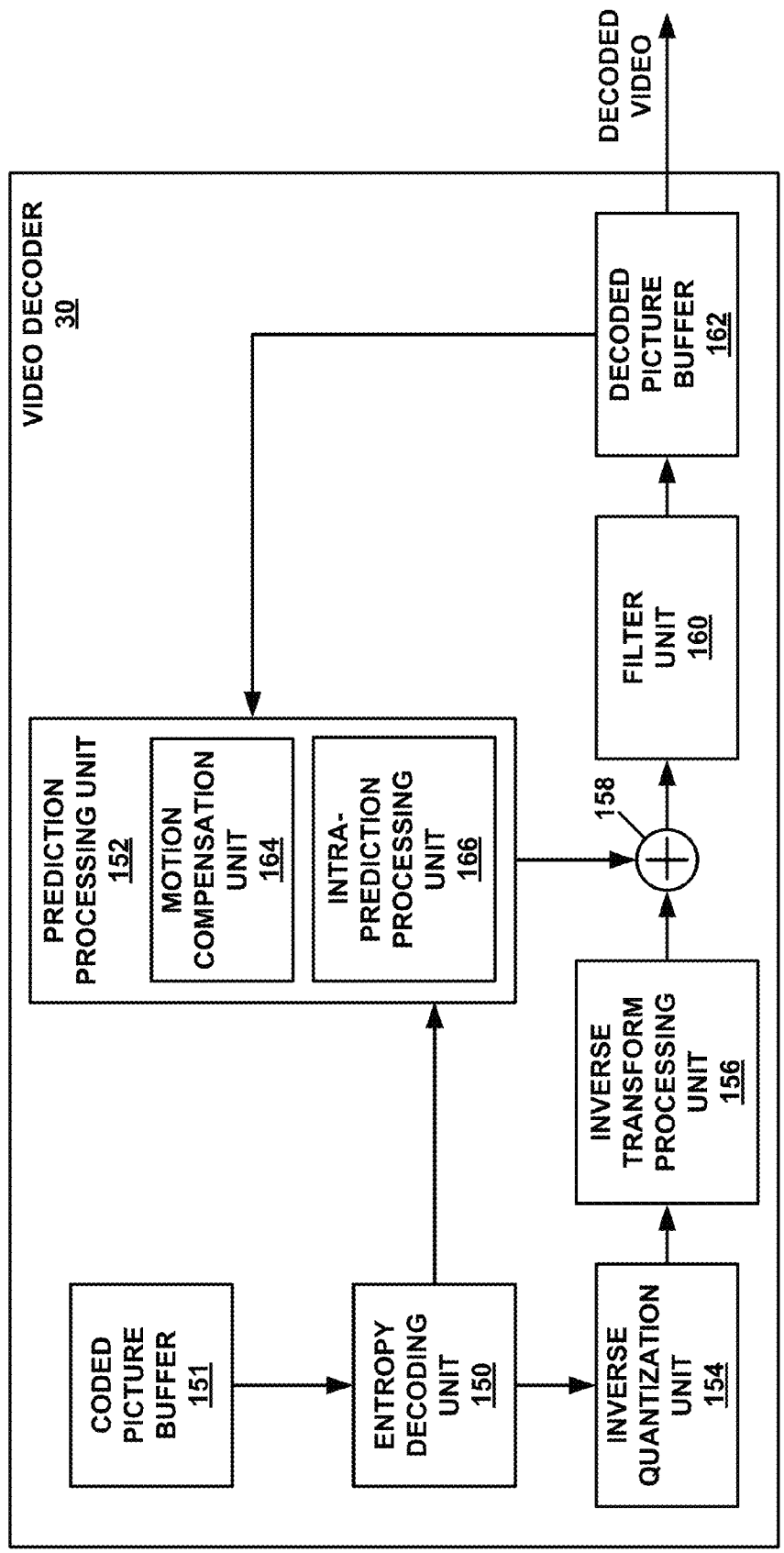
FIG. 6 is a block diagram illustrating an example video decoder that may implement the techniques of this disclosure.

FIG. 6 is a block diagram illustrating an example video decoder 30 that is configured to implement the techniques of this disclosure. FIG. 6 is provided for purposes of explanation and is not limiting on the techniques as broadly exemplified and described in this disclosure. For purposes of explanation, this disclosure describes video decoder 30 in the context of HEVC coding. However, the techniques of this disclosure may be applicable to other coding standards or methods.

In the example of FIG. 6, video decoder 30 includes an entropy decoding unit 150, a prediction processing unit 152, an inverse quantization unit 154, an inverse transform processing unit 156, a reconstruction unit 158, a filter unit 160, and a decoded picture buffer 162. Prediction processing unit 152 includes a motion compensation unit 164 and an intra-prediction processing unit 166. In other examples, video decoder 30 may include more, fewer, or different functional components.

A coded picture buffer (CPB) 151 may receive and store encoded video data (e.g., NAL units) of a bitstream. Entropy decoding unit 150 may receive NAL units from CPB 151 and parse the NAL units to obtain syntax elements from the bitstream. Entropy decoding unit 150 may entropy decode entropy-encoded syntax elements in the NAL units. Prediction processing unit 152, inverse quantization unit 154, inverse transform processing unit 156, reconstruction unit 158, and filter unit 160 may generate decoded video data based on the syntax elements extracted from the bitstream.

The NAL units of the bitstream may include coded slice NAL units. As part of decoding the bitstream, entropy decoding unit 150 may extract and entropy decode syntax elements from the coded slice NAL units. Each of the coded slices may include a slice header and slice data. The slice header may contain syntax elements pertaining to a slice.

In addition to obtaining syntax elements from the bitstream, video decoder 30 may perform a decoding operation on a CU. By performing the decoding operation on a CU, video decoder 30 may reconstruct coding blocks of the CU.

As part of performing a decoding operation on a CU, inverse quantization unit 154 may inverse quantize, i.e., de-quantize, coefficient blocks associated with TUs of the CU. Inverse quantization unit 154 may use a QP value associated with the CU of the TU to determine a degree of quantization and, likewise, a degree of inverse quantization for inverse quantization unit 154 to apply. That is, the compression ratio, i.e., the ratio of the number of bits used to represent original sequence and the compressed one, may be controlled by adjusting the value of the QP used when quantizing transform coefficients. The compression ratio may also depend on the method of entropy coding employed.

After inverse quantization unit 154 inverse quantizes a coefficient block, inverse transform processing unit 156 may apply one or more inverse transforms to the coefficient block in order to generate a residual block associated with the TU. For example, inverse transform processing unit 156 may apply an inverse DCT, an inverse integer transform, an inverse Karhunen-Loeve transform (KLT), an inverse rotational transform, an inverse directional transform, or another inverse transform to the coefficient block.

If a PU is encoded using intra prediction, intra-prediction processing unit 166 may perform intra prediction to generate predictive blocks for the PU. Intra-prediction processing unit 166 may use an intra prediction mode to generate the predictive luma, Cb, and Cr blocks for the PU based on the prediction blocks of spatially-neighboring PUs. Intra-prediction processing unit 166 may determine the intra prediction mode for the PU based on one or more syntax elements decoded from the bitstream.

Prediction processing unit 152 may construct a first reference picture list (RefPicList0) and a second reference picture list (RefPicList1) based on syntax elements extracted from the bitstream. Furthermore, if a PU is encoded using inter prediction, entropy decoding unit 150 may obtain motion information for the PU. Motion compensation unit 164 may determine, based on the motion information of the PU, one or more reference regions for the PU. Motion compensation unit 164 may generate, based on samples at the one or more reference blocks for the PU, predictive luma, Cb, and Cr blocks for the PU.

In accordance with one or more techniques of this disclosure, prediction processing unit 152 may determine a disparity vector for a block (e.g., a PU, a CU, etc.). When prediction processing unit 152 determines the disparity vector for the block, prediction processing unit 152 may search a set of neighbor blocks to generate a plurality of disparity vector candidates. Each of the neighbor blocks may be a spatial or temporal neighbor of the current block. Furthermore, prediction processing unit 152 may determine, based at least in part on the plurality of disparity vector candidates, a final disparity vector for the current block. Motion compensation unit 164 may use the disparity vector for the current block to perform inter-view motion prediction. In addition, motion compensation unit 164 may use the disparity vector for the current block to perform inter-view residual prediction.

Reconstruction unit 158 may use the residual values from the luma, Cb, and Cr transform blocks associated with TUs of a CU and the predictive luma, Cb, and Cr blocks of the PUs of the CU, i.e., either intra-prediction data or inter-prediction data, as applicable, to reconstruct the luma, Cb, and Cr coding blocks of the CU. For example, reconstruction unit 158 may add samples of the luma, Cb, and Cr transform blocks to corresponding samples of the predictive luma, Cb, and Cr blocks to reconstruct the luma, Cb, and Cr coding blocks of the CU.

Filter unit 160 may perform a deblocking operation to reduce blocking artifacts associated with the luma, Cb, and Cr coding blocks of the CU. Video decoder 30 may store the luma, Cb, and Cr coding blocks of the CU in decoded picture buffer 162. Decoded picture buffer 162 may provide reference pictures for subsequent motion compensation, intra prediction, and presentation on a display device, such as display device 32 of FIG. 1. For instance, video decoder 30 may perform, based on the luma, Cb, and Cr blocks in decoded picture buffer 162, intra prediction or inter prediction operations on PUs of other CUs. In this way, video decoder 30 may extract, from the bitstream, transform coefficient levels of the significant luma coefficient block, inverse quantize the transform coefficient levels, apply a transform to the transform coefficient levels to generate a transform block, generate, based at least in part on the transform block, a coding block, and output the coding block for display.

The following techniques are proposed, and any of the proposed technical aspects can be combined in a complete solution for disparity vector derivation. As described above, a video coder (e.g., video encoder 20 or video decoder 30) may check spatial neighboring 4×4 blocks N (N being replaced by $A_0, A_1, B_0, B_1$ or $B_2$) in a given order, followed by temporal neighboring blocks. The temporal neighboring blocks may include a bottom-right block and a center block in temporal candidate pictures (i.e., pictures in a DdvCandPicList). This aspect of checking block positions in spatial and temporal can be the same as in the design of the NBDV derivation process in 3D-HEVC Test Model 1. However, in accordance with one or more examples of this disclosure, the video coder does not terminate the process of searching for a disparity motion vector or an IDV when the video coder finds a disparity motion vector or an IDV. Instead, as described elsewhere in this disclosure, the video coder may store and categorize the disparity vectors, if needed. The video coder may apply a pruning process to the set of identified disparity vector candidates and use the resulting subset of the disparity vector candidates to determine a final disparity vector for the current block. In some examples, the video coder may apply a mathematical function to decide the final disparity vector based on the number of the remaining candidates. Aspects of some of the following examples can be combined into one complete solution.

As indicated above, a video coder (e.g., video encoder 20 or video decoder 30) may perform a two-step process to derive a disparity vector for a current block. In the first step, the video coder searches neighboring blocks to generate multiple disparity vector candidates. In the second step, the video coder may apply mathematical functions to the multiple disparity vector candidates to determine a final disparity vector for the current block.

In accordance with a first example technique of this disclosure, the video coder searches the neighboring blocks in a parallel fashion. For instance, in this example, the video coder may search spatial and temporal neighboring blocks in parallel. In this example, if the video coder finds disparity motion vectors from the spatial neighboring blocks, the video coder categorizes the disparity vectors from the spatial neighboring blocks as spatial disparity candidates (SDCs) and stores the SDCs to a spatial disparity vector candidate list sdc as disparity vector candidates. If the video coder finds temporal disparity motion vectors, the video coder categorizes the temporal disparity motion vectors as temporal disparity candidates (TDCs) and stores the TDCs to a temporal disparity vector candidate list tdc as disparity vector candidates. In this way, the parallel search fashion can be embodied with the multiple disparity vector candidate lists, i.e., sdc and tdc, to store the candidates searched in the different categories.

In some examples where the video coder searches the neighboring blocks in a parallel fashion, the video coder may search for SDCs and TDCs in parallel. In other words, the video coder may perform a search for SDCs while concurrently performing a search for TDCs. Thus, disparity motion vectors may be searched separately in a category and in parallel. For each category (i.e., SDCs and TDCs), the video coder may check all neighboring blocks. When the video coder checks a neighboring block and determines that the neighboring block has a non-zero disparity motion vector, the video coder may insert the non-zero disparity motion vector into the corresponding disparity vector candidate list. For example, if the video coder is checking a spatial neighboring block and the spatial neighboring block has a non-zero disparity motion vector, the video coder may insert the non-zero disparity motion vector into sdc as a disparity vector candidate. In a similar example, if the video coder is checking a temporal neighboring block and the temporal neighboring block has a non-zero disparity motion vector, the video coder may insert the non-zero disparity motion vector into tdc as a disparity vector candidate. In other examples, if the video coder determines that a neighboring block has a zero disparity vector, the video coder may also consider the zero disparity motion vector to be a disparity vector candidate. Thus, in such examples, if the video coder is checking a neighboring block and the neighboring block has a zero disparity motion vector, the video coder may insert the zero disparity motion vector into sdc or tdc as a disparity vector candidate.

In one example, the video coder may use the following pseudo code to check spatial neighboring blocks for disparity motion vectors. In the following pseudo code, the number of the spatial neighboring blocks is denoted by Num_SBlocks and the spatial neighboring blocks are denoted as SBlock[i], where i ranges from 0 to (Num_SBlocks) minus 1.

```
kt = 0;
for(i=0; i< Num_Sblocks; i++){
  if ( SBlock[ i ] contains a disparity motion vector dmv)
    dmv is inserted to sdc[kt], kt++.
}
```

As an output of the parallel searching process, the disparity vector candidate lists sdc[i], i=0 . . . ks−1, and tdc[i], i=0 . . .

kt−1, contain the disparity vector candidates, respectively categorized as SDCs or TDCs, wherein ks and kt refer to the number of candidates in sdc and the number of candidates in tdc, respectively. Furthermore, in some examples, as an output of the parallel searching process, SrefViewIdxList[i], i=0 . . . ks−1, and TrefViewIdxList[i], i=0 . . . kt−1, contain reference view order indices corresponding to the entries in sdc and tdc.

In other examples where the video coder searches for disparity vector candidates in a parallel fashion, the checking order of spatial neighboring blocks can be different from the checking order of the NBDV in 3D-HEVC Test Model 1 during the collection of sdc. Furthermore, in some examples where the video coder searches for disparity vector candidates in a parallel fashion, the checking order of blocks and candidate pictures for the TDV can be different from the checking order of the NBDV in 3D-HEVC Test Model 1 during the collection of tdc.

In some examples where the video coder searches for disparity vector candidates in a parallel fashion, the video coder may apply an early termination process such that the video coder stops searching for disparity vector candidates when the number of stored disparity vector candidates is more than a particular value. In other words, the video coder may stop searching for disparity vector candidates when the number of identified disparity vector candidates exceeds a particular threshold. Hence, there are thresholds for truncations of disparity vector candidates. If the number of disparity vector candidates exceeds to the threshold, the other disparity motion vectors are truncated.

In the example above where the video coder stores SDCs and TDCs in lists sdc and tdc, respectively, the video coder may truncate the search for disparity motion vectors separately for SDCs and TDCs. For instance, the video coder may stop searching for SDCs when the number of identified SDCs exceeds a threshold and may continue searching for TDCs, or vice versa. In some examples, the thresholds for the SDC and the TDC can be differently set. For instance, the video coder may terminate a search for SDCs when the video coder has identified x SDCs and may terminate a search for TDCs when the video coder has identified y TDCs, where x and y are different numbers. In other examples, the thresholds of the categories (i.e., SDC and TDC) can be the same.

When the early termination process is applied when the video coder is searching for disparity vector candidates, the disparity vector candidate lists sdc and tdc may be characterized as sdc[i], i=0 . . . Min(ks, THs)−1, and tdc[i], i=0 . . . Min(kt, THt)−1, where THs and THt are the maximum numbers of candidates that the video coder can include in the spatial disparity vector candidate list (i.e., sdc) and the temporal disparity vector candidate list (i.e., tdc), respectively. In some examples, the thresholds THs and THt are both set to three. In other examples, THs and THt may each be set to any number that is smaller than three and larger than zero. In still other examples, THs and THt may each be set to any positive integer number.

Furthermore, in some examples, the video coder may perform the early termination process with regard to only one category. For example, the video coder may terminate a search for SDCs when the number of identified SDCs exceeds a particular threshold, but the video coder does not terminate a search for TDCs regardless of the number of identified TDCs. In another example, the video coder may terminate a search for TDCs when the number of identified TDCs exceeds a particular threshold, but the video coder does not terminate a search for SDCs regardless of the number of identified SDCs.

During a search process (i.e., the process of searching for disparity motion vectors) performed in a parallel fashion, when the video coder generates a particular disparity vector candidate, the video coder may not store the particular disparity vector candidate for further processing if the particular disparity vector candidate is sufficiently close to at least one of the existing stored disparity vector candidates. In this way, the video coder may prune disparity vector candidates that are too similar to previously identified disparity vector candidates.

In some examples where the video coder prunes disparity vector candidates that are too similar to previously identified disparity vector candidates and a block has two disparity motion vectors, the video coder may prune one of the disparity motion vectors of the block. That is, in bi-directionally predictive coding, there can be up to two reference picture lists (i.e., RefPicList0 and RefPicList1), and a block contains two motion vectors if the block is bi-directionally predicted. When both motion vectors (corresponding to RefPicList0 and RefPicList1, respectively) of the block are disparity motion vectors, the disparity motion vector corresponding to RefPicList1 may be redundant. Accordingly, the video coder may perform a pruning process. In this pruning process, if a motion vector corresponding to RefPicList0 (i.e., the RefPicList0 motion vector) for a block covering a particular block position (e.g., $A_0$, $A_1$, $B_0$, $B_1$, and $B_2$) is found to be a disparity motion vector, the video coder may store the disparity motion vector as a disparity vector candidate and the video coder may check the next block position. Otherwise, if the RefPicList0 motion vector for the block is not a disparity motion vector, the video coder may check whether the motion vector corresponding to RefPicList1 of the same block (i.e., the RefPicList1 motion vector of the block) is a disparity motion vector. In another example, the video coder only checks motion vectors corresponding to RefPicList0 in all blocks, regardless of the number of reference picture lists.

In some examples, the video coder performs the pruning process in the both categories (i.e., SDC and TDC). In other examples, the video coder may perform the pruning process only for motion vectors of one category (e.g. either in the SDC or in the TDC). For example, the video coder may apply the pruning process with regard to SDCs and not TDCs, or vice versa.

Furthermore, in some examples where the video coder searches for disparity vector candidates in a parallel fashion, the video coder applies mathematical functions to the multiple disparity vector candidates to determine a final disparity vector for the current block. In other words, a mathematical function may be used to derive the final disparity vector from the multiple disparity motion vector candidates found in the block. The following example can be considered to derive the final disparity vector (DV) with given disparity vector candidate lists of SDCs and TDCs (i.e. sdc[i], i=0 . . . Min(ks, THs)−1 and tdc[i], i=0 . . . Min(kt, THt)−1). In this example, if the total number of the disparity vector candidates in sdc and tdc is more than four, the video coder may determine that the horizontal component of the final disparity vector (i.e., DV[0]) is equal to a median of the horizontal components of the first disparity vector candidate in sdc, the first disparity vector candidate in tdc, and the second disparity vector candidate in sdc. Thus, in this example, the three disparity vector candidates can be decided to derive the horizontal component of the final disparity vector as follows:

DV[0]=Median (sdc[0][0], tdc[0][0], sdc[1][0]).

Otherwise, in this example, if the total number of the disparity vector candidates in sdc and tdc is equal to 4, the following may apply. If the second disparity vector candidate in sdc (i.e., sdc[1]) is unavailable, the video coder may substitute, in the previous equation, the second disparity vector candidate in sdc with the second disparity vector candidate in tdc (i.e., tdc[1]). Thus, if the second disparity vector candidate in sdc (i.e., sdc[1]) is unavailable, the video coder may derive the horizontal component of the final disparity vector as follows:

DV[0]=Median (sdc[0][0], tdc[0][0], tdc[1][0]).

Otherwise, in this example, if the total number of the disparity vector candidates in sdc and tdc is equal to three, the video coder may determine that the horizontal component of the final disparity vector (i.e., DV[0]) is equal to a median of the horizontal components of the three disparity vector candidates. Thus, if the total number of disparity vector candidates in sdc and tdc is equal to three, the video coder may determine that the horizontal component of the final disparity vector by determining:

DV[0]=Median (DisCand[0][0], DisCand[1][0], DisCand[2][0]), where the current disparity vector candidates are denoted as DisCand[i] and i ranges from 0 to 2.

Otherwise, in this example, if the total number of disparity vector candidates from all the categories (i.e., SDCs and TDCs) is equal to two, the video coder may determine that the horizontal component of the final disparity vector is equal to the horizontal component of the disparity vector candidate that has the largest horizontal component. In other words, the video coder may apply the Max( ) function to the horizontal component. Thus, if the total number of disparity vector candidates in sdc and tdc is equal to two, the video coder may determine the horizontal component of the final disparity vector by determining:

DV[0]=Max (DisCand[0][0], DisCand [1][0]), where the current disparity vector candidates are DisCand[i] and i ranges from 0 to 1. Thus, in this example, the video coder may determine a final disparity vector for the current block at least in part by determining that a horizontal component of the final disparity vector for the current block (i.e., DV[0]) is equal to a maximum horizontal component of a disparity vector candidate (i.e., DisCand[0][0] or DisCand [1][0]) in the plurality of disparity vector candidates.

After the video coder chooses the horizontal component of the final disparity vector (i.e., DV[0]), the video coder may identify the disparity vector candidate that has a horizontal component equal to DV[0]. In addition, after the video coder chooses the horizontal component of the final disparity vector, the video coder may determine that the view index associated with the final disparity vector as the view index of the identified disparity vector candidate. In the same matter, the video coder may determine the reference index of the final disparity vector as the reference view index of the identified disparity vector. In addition, the video coder may set the vertical component of the final disparity vector (i.e., DV[1]) to the corresponding y-component associated with the identified disparity vector candidate (i.e., the derived DV[0]).

In some examples, when a disparity vector candidate is not available in one category, the video coder may consider an alternate disparity vector candidate in the other category. For example, if an SDC is not available, the video coder may consider a TDC instead, or vice versa. Furthermore, in some examples, the video coder can individually derive the vertical component of the final disparity vector (i.e., DV[1]) with the same mathematical functions that the video coder used to derive the horizontal component of the final disparity vector (i.e., DV[0]). When the sum of the disparity vector candidates from all the categories (i.e., SDCs and TDCs) is equal to one, there is only one disparity vector candidate. Hence, when there is only one disparity vector candidate, the video coder may return the only disparity vector candidate as the final disparity vector.

In another example, the mathematical functions used to determine the final disparity vector are not limited to either Median ( ) or Max ( ), but can be other functions, such as Abs Max (i.e., selecting a component having the largest absolute value among the disparity vector candidates), Min, and Abs Min (i.e., selecting a component having the smallest absolute value among the disparity vector candidates). Furthermore, in some examples, the functions used to determine the final disparity vector can be cascaded. In other examples, the video coder may adaptively change the functions depending on a current view index (view id) or a current view order index (view_order_idx) when determining the final disparity vector. In some examples, the video coder may further apply outlier rejection or filtering for the disparity vector candidates before and/or after applying the functions to determine the final disparity vector.

In some examples, the functions used for determining the final disparity vector can be different on a component-wise basis. In other words, the video coder may use different functions for horizontal and vertical components of disparity vector candidates. In some examples, the video coder may apply a Median ( ) function in a component-wise fashion by giving any of the three disparity vector candidates in sdc and tdc (with regardless of the category). The video coder may apply different functions with a number of available disparity vector candidates and a number of categories. Furthermore, in some examples, the video coder may apply early termination and/or pruning before the derivation of the final disparity vector.

While the NBDV design in 3D-HEVC Test Model 1 searches for a disparity vector candidate through SDVs, TDVs, and IDVs, the examples of this disclosure described above may only search for disparity motion vectors in spatial and temporal neighboring blocks (i.e., the example techniques of this disclosure only manage SDVs and TDVs). However, in additional examples of this disclosure, the video coder may consider IDVs if the video coder does not identify a disparity vector candidate using the examples of this disclosure described above. That is, if the processes cannot find any disparity vector candidate, the video coder does not terminate the NBDV derivation process described in the examples of this disclosure described above, but can continue checking the remaining candidates for IDVs. If the video coder finds an IDV, the video coder may stop the process of searching for an IDV and may return the IDV as the disparity vector for the current block in the same manner as the design of the NBDV derivation process in 3D-HEVC Test Model 1.

In other examples, the examples of this disclosure described above for finding disparity vector candidates may be extended to finding IDVs. In other words, the example techniques may be applied such that the techniques are not only for TDVs and SDVs. Such examples are described elsewhere in this disclosure.

In accordance with a second example technique of this disclosure, the video coder may search for disparity motion vectors in a serial fashion. For example, the video coder may store disparity vector candidates in series, so that the disparity vector candidates are prioritized according to the order of the collection for the decision process (i.e., the process of determining whether a neighboring block has a disparity motion vector). In some examples, the checking order is the same as the NBDV derivation process of 3D-HEVC Test Model 1. In other examples, the checking order is changed, permuted, or skipped relative to the NBDV derivation process of 3D-HEVC Test Model 1.

In some examples where the video coder searches for disparity motion vectors in a serial fashion, the video coder may, unlike parallel searching, only use one disparity vector candidate list (i.e., dc) to store the disparity vector candidates. Furthermore, in some such examples where the video coder searches for disparity motion vectors in a serial fashion, the video coder does not use categories of disparity vector candidates. Typically, disparity motion vectors found earlier have smaller indices in the array (i.e., dc) than disparity motion vectors found later. Hence, dc[0] contains the earliest sample disparity vector candidate in the checking order. As an output of the serial searching, dc[i], i=0 . . . k−1, contains the disparity vector candidates, wherein k refers to the number of disparity vector candidates in dc searched from the spatial and temporal neighboring block positions.

In other examples, however, the checking order of all the block positions in SDV and TDV can be changed relative to the checking order used in the NBDV derivation process in 3D-HEVC Test Model 1. In such examples, when the video coder searches for disparity vector candidates, the video coder may consider only non-zero disparity motion vectors. That is, when the video coder searches for disparity vector candidates, the video coder may only include non-zero disparity motion vectors in the set (e.g., plurality) of disparity vector candidates. Furthermore, in some examples, the video coder may also consider zero disparity vectors as disparity vector candidates.

In some examples where the video coder searches for disparity vector candidates in a serial fashion, there can be one threshold for all the disparity vector candidates in the early termination. If the number of disparity vector candidates exceeds to the threshold, the video coder does not search the others. In some examples, the threshold is equal to three. In other examples, the threshold may be a value other than three. The output of the process of searching for disparity vector candidates may be the disparity vector candidate list applied with the early termination, i.e., dc[i], i=0 . . . Min(k, TH)−1, wherein TH is the threshold used for the early termination process. In other examples, the threshold for the truncation can be equal to any integer number.

In some examples where the video coder searches for disparity vector candidates in a serial fashion, the video coder may prune disparity vector candidates from the disparity vector candidate list (i.e., dc) in a manner similar to that described above with respect to examples where the video coder searches for disparity vector candidates in a parallel fashion. However, in contrast to the pruning processes described above with respect to examples where the video coder searches for disparity vector candidates in a parallel fashion, when the video coder searches for disparity vector candidates in a serial fashion, the video coder may perform the pruning process on only one list (i.e., dc).

In examples where the video coder searches for disparity vector candidates in a serial fashion, the video coder may apply one or more mathematical functions to the identified disparity vector candidates in order to determine a final disparity vector for a current block. In other words, there can be multiple mathematical functions applied to the candidates to generate the final disparity vector. For example, the video coder may search for disparity vector candidates in a serial fashion to generate a disparity vector candidate list dc, as described above. In this example, the video coder may use a Median( ) function, a Max( ) function, or another function for the disparity vector candidate list dc, based on the number of disparity vector candidates. In other words, the video coder may use different mathematical functions (e.g., Median, Max, etc.), depending on the number of disparity vector candidates. Furthermore, the video coder may apply an early termination process and/or a pruning process to dc[i] (i.e., dc[i], i=0 . . . Min(k, TH)) before the derivation of the final disparity vector for the current block.

In accordance with one or more examples where the video coder searches for disparity vector candidates in a serial fashion, the video coder may derive the final disparity vector for the current block as follows. First, the video coder may determine whether the total number of the disparity vector candidates in dc is greater than or equal to three. If the total number of disparity vector candidates in dc is greater than or equal to three, the video coder may determine a horizontal component of the final disparity vector as the median of the horizontal components of the first, second, and third disparity vector candidates in dc. In other words, if the total number of disparity vector candidates in dc is greater than or equal to three, the video coder may determine the horizontal component of the final disparity vector as: DV[0]=Median (dc[0][0], dc[1][0], dc[2][0]).

Otherwise, if the total number of disparity vector candidates in dc is not greater than or equal to three and if the total number of the disparity vector candidates in dc is equal to 2, the video coder may determine that the horizontal component of the final disparity vector is equal to whichever of the horizontal components of the disparity vector candidates in dc is greater. In other words, if the total number of disparity vector candidates in dc is equal to 2, the video coder may determine the horizontal component of the final disparity vector by applying the Max( ) function to the horizontal components of the disparity vector candidates in dc. Otherwise stated, if the total number of disparity vector candidates in dc is equal to 2, the video coder may determine the horizontal component of the final disparity vector as: DV[0]=Max (dc[0][0], dc[1][0]).

Furthermore, after the video coder chooses the horizontal component of the final disparity vector (i.e., DV[0]), the video coder may identify which of the disparity vector candidates in dc has a horizontal component equal to the horizontal component of the final disparity vector (i.e., DV[0]). In addition, after the video coder chooses the horizontal component of the final disparity vector, the video coder may determine that the associated view index (or reference index) is equal to the view index of the identified disparity vector candidate. Furthermore, the video coder may determine that the vertical component of the final disparity vector (i.e., DV[1]) is equal to the vertical component of the identified disparity vector candidate. In other words, after DV[0] is chosen, the disparity vector candidate with the horizontal value equal to DV[0], together with the associated view index (or reference index), are derived to be the final disparity vector and view index (reference index). DV[1] may be set to the corresponding y-component associated with the derived DV[0] and view index. In other examples, the video coder may individually derive the vertical component of the final disparity vector (i.e., DV[1]) with the same mathematical functions that the video coder used to determine the horizontal component of the final disparity vector (i.e., DV[0]).

In some examples, if the disparity vector candidate list dc includes only a single disparity vector candidate, the video coder may set the final disparity vector equal to the single disparity vector candidate. In other words, if the sum of the disparity vector candidates from all the categories (i.e., SDCs and TDCs) is equal to 1, the video coder returns the only one disparity vector candidate.

In other examples, the video coder may use the functions described above with regard to examples where the video coder searches for disparity vector candidates in a parallel fashion to determine the final disparity vector. For instance, the video coder may determine the final disparity vector using functions, such as Abs Max (i.e., selecting a component having the largest absolute value among the disparity vector candidates), Min, and Abs Min (i.e., selecting a component having the smallest absolute value among the disparity vector candidates). Thus, in examples where the video coder searches for disparity vector candidates in parallel and examples where the video coder searches for disparity vector candidates in series, the video coder may determine a particular disparity vector candidate by applying a mathematical function to horizontal components of the plurality of disparity vector candidates. The mathematical function may be one of a median function, an abs max function, a minimum function, and an abs min function. Furthermore, the video coder may set a horizontal component of the final disparity vector to a horizontal component of the particular final disparity vector candidate. In addition, the video coder may determine a view index of the final disparity vector as a view index of the particular disparity vector candidate. The video coder may determine a reference index of the final disparity vector as a reference index of the particular disparity vector candidate. In addition, the video coder may set a vertical component of the final disparity vector to a vertical component of the particular disparity vector candidate.

Furthermore, in some examples where the video coder searches for disparity vector candidates in a serial fashion, the functions used for determining the final disparity vector can be cascaded. In some examples, the video coder may adaptively change the functions depending on a current view index (viewId) or a current view order index (view_order_idx) when determining the final disparity vector. Furthermore, in some examples, the video coder may further apply outlier rejection or filtering for the disparity vector candidates before or after applying the functions to determine the final disparity vector. Alternatively, the zero vector can be inserted in the candidate list. In other words, '0' can be filled in the candidate list.

In some examples where the video coder searches for disparity vector candidates in a serial fashion, the video coder may use IDVs in the manner described above with regard to examples where the video coder searches for disparity vector candidates in a parallel fashion. For instance, the video coder may consider IDVs when the video coder searches for disparity vector candidates in a serial fashion as described in the examples above and the video coder is unable to derive any disparity vector candidates. Hence, in such examples, though the disparity vector candidate searching processes cannot find any disparity vector candidate, the video coder does not terminate the NBDV derivation process but rather continues checking the remaining disparity vector candidates, including disparity vector candidates that indicate IDVs. If the video coder finds an IDV, the video coder may return the IDV as the final disparity vector without searching additional candidates in the same manner as the NBDV design in 3D-HEVC Test Model 1. In other examples, the processes for identifying candidate disparity vectors in the serial fashion and parallel fashion described above may be extended to IDVs (not only for TDVs and SDVs). Details of such examples are presented elsewhere in this disclosure.

In accordance with a third example technique of this disclosure, the video coder may consider, at every step, whether to include IDVs in a disparity vector candidate list. For example, the video coder may search for disparity vector candidates in a parallel fashion. In this example, the video coder may generate a disparity vector candidate list for SDCs (i.e., sdc) and a disparity vector candidate list for TDCs (i.e., tdc). Furthermore, in this example, the video coder may generate a third disparity vector candidate list that includes disparity vector candidates that specify IDVs. Thus, in this example, in addition to sdc and tdc, there may be one more candidate list (i.e., idc) for storing the disparity vector candidates from IDVs. In this example, if the video coder finds an IDV, the video coder may store the IDV to idc and may categorize the IDV as an "IDC." Furthermore, in this example, the video coder may apply a pruning process to idc in accordance with one or more of the example processes described above for pruning sdc and tdc.

Furthermore, in some examples where the video coder considers at every step whether to include IDVs in a disparity vector candidate list and the video coder searches for disparity vector candidates in a parallel fashion, the video coder may derive a final disparity vector for a current block in manners similar to those described with regard to examples whether the video coder searches for disparity vector candidates in a parallel fashion.

For example, in a manner similar to one or more examples provided above, the video coder may apply mathematical functions to determine the final disparity vector by considering the candidates in sdc[i], i=0 . . . Min(ks, THs)−1, tdc[i], i=0 . . . Min(kt, THt)−1, and idc[i], i=0 . . . Min(ki, THi)−1), where THs, THt, and THi are the maximum numbers of candidates that the video coder can include in the spatial disparity vector candidate list (i.e., sdc), the temporal disparity vector candidate list (i.e., tdc), and the IDV candidate list (i.e., idc), respectively In some examples, if the total number of disparity vector candidates in sdc, tdc, and idc is more than three, the video coder may determine three of the disparity vector candidates. The video coder may then derive the final disparity vector based on the determined three disparity vector candidates. For example, the video coder may determine that a horizontal component of the final disparity vector is equal to a median of the horizontal components of the first disparity vector candidates in sdc, tdc, and idc. In other words, the video coder may derive the horizontal component of the final disparity vector as: DV[0]=Median (sdc[0][0], tdc[0][0], idc[0][0]). Furthermore, in some examples, when one of the categories does not include a disparity vector candidate, the video coder may fill in any candidates from the other categories within the function DV[0]=Median (sdc[0][0], tdc[0][0], idc[0][0]). In one example, when the number of disparity vector candidates in sdc, tdc, and idc is greater than or equal to three, the video coder may determine the final disparity vector based on the first disparity vector in idc only when there is no disparity vector candidate in sdc, or when there is no disparity vector candidate in tdc. In other words, in this example, idc[0] may be considered only if sdc[0] (or tdc[0]) is not available.

Otherwise, if the number of disparity vector candidates in sdc, tdc, and idc is less than three or equal to three, the video coder may determine the final disparity vector in accordance with one or more of the examples provided elsewhere in this disclosure. For instance, if the total number of the disparity vector candidates in sdc and tdc is equal to three, the video coder may determine that the horizontal component of the final disparity vector (i.e., DV[0]) is equal to a median of the horizontal components of the three disparity vector candidates. Otherwise, in this example, if the total number of disparity vector candidates from all the categories (i.e., SDCs and TDCs) is equal to two, the video coder may determine that the horizontal component of the final disparity vector is equal to the horizontal component of the disparity vector candidate that has the largest horizontal component.

In some examples where the video coder considers at every step whether to include IDVs in a disparity vector candidate list, the video coder may search for disparity vector candidates in a serial fashion. In some such examples, the block checking extends to IDVs after SDVs and TDVs. Furthermore, in some such examples, the pruning and early termination processes may be the same as those described above with regard to examples where the video coder searches for disparity vector candidates in a serial fashion, but extended to the disparity vector candidates obtained from IDVs. In some examples where the video coder considers at every step whether to include IDVs in a disparity vector candidate list and the video coder searches for disparity vector candidates in a serial fashion, the video coder may apply the same mathematical functions to derive a final disparity vector in the same manner as described above with regard to examples where the video coder searches for disparity vector candidates in a serial fashion. In other examples, the checking order of SDV, TDV, and IDV can be permuted, changed, and/or skipped.

Similar to examples described above, some of the pruned disparity motion vectors in the TDV, SDV, or IDV disparity vector candidate lists can be considered for the searching, pruning, and/or mathematical functions, if there was no disparity vector candidate searched out through the entire processes. For example, the video coder may prune particular disparity vector candidates when searching for disparity vector candidates. However, in this example, at the end of the searching for disparity vector candidates, there may be no disparity vector candidates. In this example, the video coder may determine the final disparity vector based on one or more of the pruned disparity vector candidates.

Furthermore, in accordance with one or more example techniques of this disclosure, the video coder may provide implementations based on 3D-HEVC specification, Tech et al., "Draft of 3D-HEVC Test Model Description," Joint Collaborative Team on 3D Video Coding Extension Development of ITU-T SG 16 WP 3 and ISO/IEC JTC 1/SC 29/WG 11, 2$^{nd}$ meeting, Shanghai, CN, 13-19 Oct. 2012, document no. JCT3V-B1005 (hereinafter, "3D-HEVC Test Model 2"), which is available as of Dec. 11, 2013 from http://phenix.it-sudparis.eu/jct2/doc_end_user/documents/2_Shanghai/wg11/JCT3V-B1005-v1.zip. In this example implementation, up to three SDV candidates and up to three TDV candidates are generated and up to three are chosen for a mathematical operation to derive the final disparity vector. The disparity vector is associated with a reference view index.

The techniques of this example implementation may be exemplified by changes to the text of 3D-HEVC Test Model 2. The text changes are listed below, relative to 3D-HEVC Test Model 2, with modifications underlined and removed text is italicized and enclosed in double square brackets (e.g., [[removed text]]).

G.8.5.2.1.13 Derivation Process for a Disparity Vector

Inputs to this process are:
 a luma location (xC, yC) of the top-left sample of the current luma coding block relative to the top-left luma sample of the current picture,
 a luma location (xP, yP) of the top-left luma sample of the current prediction unit relative to the top-left luma sample of the current picture,
 a variable nCS specifying the size of the current luma coding block,
 variables nPSW and nPSH specifying the width and the height, respectively, of the current prediction unit,
 a variable partIdx specifying the index of the current prediction unit within the current coding unit.

Outputs of this process are:
 a view order index refViewIdx specifying a reference view.
 a flag availableDV specifying whether the disparity vector is available,
 a disparity vector mvDisp.

The flag availableDV is set equal to 0, and both components of the disparity vector mvDisp are set equal to 0.
The variable checkParallelMergeFlag is derived as follows.
 If one or more of the following conditions are true, checkParallelMergeFlag is set equal to 1.
  PredMode[xC][yC] is equal to MODE_SKIP
  PredMode[xC][yC] is equal to MODE_INTER and merge_flag[xP][yP] is equal to 1.
 Otherwise, checkParallelMergeFlag is set equal to 0.

The motion vector mvDisp and the availability flag availableDV are derived in the following ordered steps and the whole decoding process of this sub-clause terminates once availableDV is set equal to 1.

The list SmvDispList and SrefViewIdxList specifying the spatial disparity vector candidate list and the corresponding reference view order index list are derived as follows. The variable numSDC specifying the number of elements in SmvDisp is set equal to 0.

1. For each N being $A_1$, $B_1$, $B_0$, $A_0$, or $B_2$, and (xN, yN) being (xP−1, yP+nPSH−1), (xP+nPSW−1, yP−1), (xP+nPSW, yP−1), (xP−1, yP+nPSH), or (xP−1, yP−1), the following applies.
 a. When yP−1 is less than ((yC>>Log 2CtbSizeY)<< Log 2CtbSizeY), the following applies.

$$xB_0 = ((xB_0 >> 3) << 3) + ((xB_0 >> 3) \& 1) * 7 \quad \text{(G-115)}$$

$$xB_1 = ((xB_1 >> 3) << 3) + ((xB_1 >> 3) \& 1) * 7 \quad \text{(G-116)}$$

$$xB_2 = ((xB_2 >> 3) << 3) + ((xB_2 >> 3) \& 1) * 7 \quad \text{(G-117)}$$

b. The availability derivation process for a prediction block as specified in subclause 6.4.2 is invoked with the luma location (xC, yC), the current luma coding block size nCbS set equal to nCS, the luma location (xP, yP), the width and the height of the luma prediction block nPbW and nPbH, the partition index partIdx, and the luma location (xN, yN) as inputs and the output is assigned to the prediction block availability flag availableN.
 c. When all of the following conditions are true, availableA$_1$ is set equal to 0.
  N is equal to A$_1$
  Part Mode of the current prediction unit is PART_N× 2N or PART_nL×2N or PART_nR×2N
  partIdx is equal to 1
 d. When all of the following conditions are true, availableB$_1$ is set equal to 0.
  N is equal to B1
  Part Mode of the current prediction unit is PART_2N×N or PART_2N×nU or PART_2N×nD
  partIdx is equal to 1
 e. When all of the following conditions are true, availableN is set equal to 0.
  checkParallelMergeFlag is equal to 1
  (xP>>(log 2_parallel_merge_level_minus2+2)) is equal to
  (xN>>(log 2_parallel_merge_level_minus2+2))
  (yP>>(log 2_parallel_merge_level_minus2+2)) is equal to
  (yN>>(log 2_parallel_merge_level_minus2+2)).

f. The flag availableIvpMvSearchFlagN is set equal to availableN.

g. When one of the following conditions is true, availableIvpMvSearchFlagN is set equal to 0.

N is equal to B0 and ((yN>>Log 2CtbSizeY)<<Log 2CtbSizeY) is less than ((yC>>Log 2CtbSizeY)<< Log 2CtbSizeY)

N is equal to B1 and ((yN>>Log 2CtbSizeY)<<Log 2CtbSizeY) is less than ((yC>>Log 2CtbSizeY)<< Log 2CtbSizeY)

N is equal to B2 and ((yN>>Log 2CtbSizeY)<<Log 2CtbSizeY) is less than ((yC>>Log 2CtbSizeY)<< Log 2CtbSizeY)

h. The flags availableFlagIvpMvN0 and availableFlagIvpMvN1 are set equal to 0.

i. For each X from 0 to 1, the following applies, when availableN is equal to 1 and PredFlagLX[xN][yN] is equal to 1

If RefPicListX[RefIdxLX[xN][yN]] is an inter-view reference picture, the following applies:

If numSDC is less than 3, and MvLXN[xN][yN][0] is not equal to 0, the following applies:

SrefViewIdxList[numSDC][[refViewIdx]]=ViewIdx (RefPicListX[RefIdxLX[xN][yN]])  (G-118)

SmvDispList[numSDC][[mvDisp]]= MvLXN[xN][yN]  (G-119)

[[availableDV=1]]numSDC+=1  (G-120)

Otherwise (RefPicListX[RefIdxLX[xN][yN]] is not an inter-view reference picture), the following applies.

When availableIvpMvSearchFlagN is equal to 1 and

PredMode[xN][yN] is equal to MODE_SKIP and IvpMvFlagLX[xN][yN] is equal to 1, the following applies:

ivpMvDispLXN=IvpMvDispLX[xN][yN]  (G-121)

availableFlagIvpMvLXN=1  (G-122)

2. The derivation process for a disparity vector from temporal neighbour block as specified in G.8.5.2.1.16 is invoked with a luma location (xP, yP), variables nPSW and nPSH as inputs, and [[flag availableDV, and disparity vector mvDisp outputs.]] TmvDispList and TrefViewIdxList specifying the temporal disparity vector candidate list and the corresponding reference view order index list, and numTDC specifying the number of elements in TmvDispList as outputs.

If numSDC+numTDC is greater than 0, the following applies to derive a disparity vector candidate list DispList and the corresponding RefViweIdxList both with up to three entries.

Set i and j to be both 0.

maxNumS is set to Min((numTDC ? 2:3), numSDC).

If numSDC is larger than 0, for i from 0 to maxNumS−1, inclusive, the following applies:

1. DispList[i]=SmvDispList[i],
2. RefViewIdxList[i]=SrefViewIdxList[i];
3. i+=1;

If numTDC is larger than 0, the following applies:

4. while i is less than 3 and j is smaller than numTDC, the following apply:
DispList[i]=TmvDispList[j],
RefViewIdxList[i]=TrefViewIdxList[j];
i+=1;
j+=1;

Alternatively the following apply to construct the DispList and RefViweIdxList.

If numSDC+numTDC is greater than 0, the following applies to derive a disparity vector candidate list DispList and the corresponding RefViweIdxList both with up to three entries.

Set i and j to be both 0.

maxNumT is set to Min((numSDC ? 2:3), numTDC).

If numTDC is larger than 0, for i from 0 to maxNumT−1, inclusive, the following applies:

1. DispList[i]=TmvDispList[i],
2. RefViweIdxList[i]=TrefViewIdxList[i];
3. i+=1;

If numSDC is larger than 0, the following applies:

4. while i is less than 3 and j is smaller than numSDC, the following apply:
DispList[i]=SmvDispList[j],
RefViweIdxList[i]=SrefViewIdxList[j];
i+=1;
j+=1;

If numSDC+numTDC is greater than 0, availableDV is set to 1 and mvDisp and refViewIdx are derived as follows.

refViewIdx=RefViweIdxList[0].

If DispList contains only one entry, mvDisp=DispList[0].

Otherwise, if DispList contains two entries, the following applies

Set i to be the first one in DispList that has DispList[i][0] equal to Max (DispList[0][0] DispList[1][0]), mvDisp=DispList[i].
refViewIdx=RefViweIdxList[i].

Otherwise (DispList contains three entries), the following applies

If RefViewIdxList[i] values are all the same, the following applies

5. Set i to be the first one in DispList that has DispList[i][0] equal to Median(DispList[0][0], DispList[1][0]), DispList[2][0])
6. mvDisp=DispList[i].

Otherwise, mvDisp=DispList[0].

For each N being $A_1$, $B_1$, $B_0$, $A_0$, and $B_2$, the following applies.

For each X from 0 to 1, the following applies.

When availableFlagIvpMvLXN is equal to 1, the following applies:

mvDisp=ivpMvDispLXN  (G-123)

availableDV=1  (G-124)

G.8.5.2.1.16 Derivation Process for a Disparity Vector from Temporal Neighbour Blocks Inputs to this process are a luma location (xP, yP) specifying the top-left sample of the current luma prediction block relative to the top-left luma sample of the current picture, variables specifying the width and the height of the luma prediction block, nPbW and nPbH Outputs of this process are

[[the disparity vector mvDisp]]

the disparity vector list mvDispList,

[[the availability flag availableFlag.]]

numTDC specifying the number of elements in mvDispList the reference view order index list refViewOrderIdxList The luma location (xPRb, yPRb) specifying the position of the right bottom luma prediction block of the current luma prediction block and the flag availableRb specifying the availability of the right bottom luma prediction block are derived by the following ordered steps:
  3. The vertical component of the position of the right bottom luma prediction block is derived as follows.

$$yPRb=yP+nPbH \qquad (G\text{-}132)$$

2. The horizontal component of the position of the right bottom luma prediction block is derived as follows.

$$xPRb=xP+nPbW \qquad (G\text{-}133)$$

3. When xPRb is less than pic_width_in_luma_samples and yPRb is less than pic_height_in_luma_samples, availableRb is set equal to 1. Otherwise, availableRb is set equal to 0.

The luma location (xCtr, yCtr) specifying the centre position of the current luma prediction block is derived by $$xPCtr=xP+(nPbW>>1) \qquad (G\text{-}134)$$

$$yPCtr=yP+(nPbH>>1) \qquad (G\text{-}135)$$

[[The flag availableFlag is set equal to 0, and]] Both components of mvDisp are set equal to 0. numTDC is set equal to 0. For i from 0 to NumDdvCandPics, the following ordered steps apply and the whole decoding process of this sub-clause terminates once numTDC is set equal to 3 or complete all the following steps. [[availableFlag is set to 1.]]
  2. When ViewIdx of the current picture is greater than 1 and availableRb is equal to 1, the derivation process for a disparity vector in a block of a candidate picture as specified in subclause G.8.5.2.1.14 is invoked with candidate picture DdvCandPicsList[i], luma location (xPRb, yPRb) as inputs, and the flag [[availableFlag and the disparity vector mvDisp as outputs.]] availableFlagT and the disparity vector mvDispT and refViewIdxT as outputs.
  When availableFlag is 1, mvDispT [0] is not zero and numTDC is less than 3
    mvDispList[numTDC]=mvDispT
    refViewOrderIdxList[numTDC]=refViewIdxT
    numTDC+=1
    availableFlagT=0;
  3. The derivation process for a disparity vector in a block of a candidate picture as specified in subclause G.8.5.2.1.14 is invoked with candidate picture DdvCandPicsList[i], luma location (xPCtr, yPCtr) as inputs the flag [[availableFlag and the disparity vector mvDisp as outputs.]] availableFlagT and the disparity vector mvDispT and refViewIdxT as outputs.
  When availableFlag is 1, mvDispT [0] is not zero and numTDC is less than 3
    mvDispList[numTDC]=mvDispT
    refViewOrderIdxList[numTDC]=refViewIdxT
    numTDC+=1
    availableFlagT=0;
  3. When ViewIdx of the current picture is equal to 1 and availableRb is equal to 1, the derivation process for a disparity vector in a block of a candidate picture as specified in subclause G.8.5.2.1.14 is invoked with candidate picture DdvCandPicsList[i], luma location (xPRb, yPRb) as inputs, the flag [[availableFlag and the disparity vector mvDisp as outputs.]] availableFlagT and the disparity vector mvDispT and refViewIdxT as outputs.
  When availableFlag is 1, mvDispT[0] is not zero and numTDC is less than 3
    mvDispList[numTDC]=mvDispT
    refViewOrderIdxList[numTDC]=refViewIdxT
    numTDC+=1
    availableFlagT=0;

Alternatively, in subclause G.8.5.2.1.13, TmvDispList, SmvDispList as well as the associated TrefViewIdxList and SrefViewIdxList are jointly maintained in one set of list: mvDispList and refViewIdxList. The way of getting the disparity vector candidates may be the same as described above; however, once mvDispList has three candidates, checking of SDV and TDV candidates can stop. This way, the procedures that merge TmvDispList, SmvDispList and TrefViewIdxList and SrefViewIdxList to DispList and RefViweIdxList are not needed, instead DispList is set to mvDispList and RefViewIdxList is set to refViewIdxList.

Figure 7A:
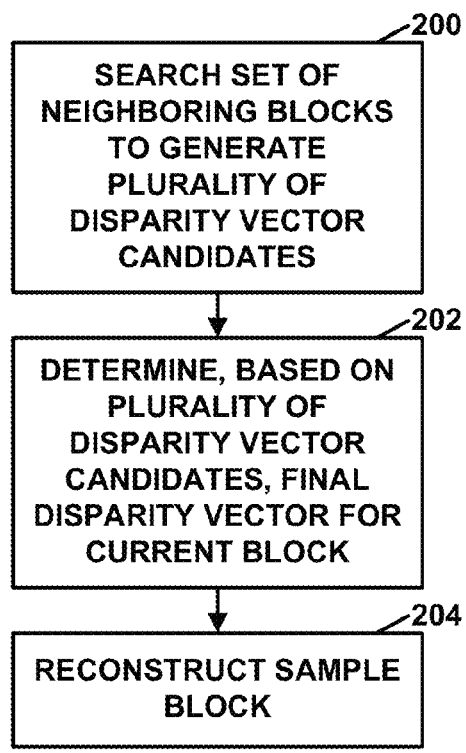
FIG. 7A is a flowchart illustrating an example operation of a video decoder, in accordance with one or more techniques of this disclosure.

FIG. 7A is a flowchart illustrating an example operation of video decoder 30, in accordance with one or more techniques of this disclosure. In the example of FIG. 7A, video decoder 30 may search a set of neighbor blocks of video data to generate a plurality of disparity vector candidates (200). Each of the neighbor blocks is a neighbor of a current block of the video data. In some examples, video decoder 30 may terminate searching the set of neighboring blocks when the number of generated disparity vector candidates exceeds a threshold. For instance, the plurality of disparity vector candidates may include up to three spatial disparity vectors and up to three temporal disparity vectors.

As indicated elsewhere in this disclosure, video decoder 30 may search the set of neighboring blocks in a parallel fashion. In such examples, video decoder 30 may concurrently search spatial and temporal neighboring blocks for disparity motion vectors and may include the disparity motion vectors in the plurality of disparity vector candidates. In other examples, video decoder 30 may search the set of neighboring blocks in a serial fashion. For instance, in one example, video decoder 30 may search spatial neighboring blocks for disparity motion vectors. In this example, video decoder 30 may search temporal neighboring blocks for additional disparity motion vectors. Furthermore, in this example, the searching of the temporal neighboring blocks is not concurrent with the searching of the spatial neighboring blocks. Video decoder 30 may include the disparity motion vectors and the additional disparity motion vectors in the plurality of disparity vector candidates.

In addition, video decoder 30 may determine, based at least in part on the plurality of disparity vector candidates, a final disparity vector for the current block (202). Video decoder 30 may use one or more of the mathematical functions described above to determine the final disparity vector for the current block. For example, video decoder 30 may apply a median function to the plurality of disparity vector candidates to determine the final disparity vector for the current block. In other examples, video decoder 30 may determine the final disparity vector for the current block as a maximum horizontal disparity vector in the plurality of disparity vector candidates. In some examples, the plurality of disparity vector candidates includes up to three spatial disparity vectors and up to three temporal disparity vectors and video decoder 30 may apply a mathematical operation (e.g., a median operation, etc.) on up to three of the plurality of disparity vector candidates to derive the final disparity vector for the current block.

Furthermore, video decoder 30 may reconstruct a sample block for the current block in part by performing, based on the final disparity vector for the current block, inter-view motion prediction or inter-view residual prediction for the current block (204).

Figure 7B:
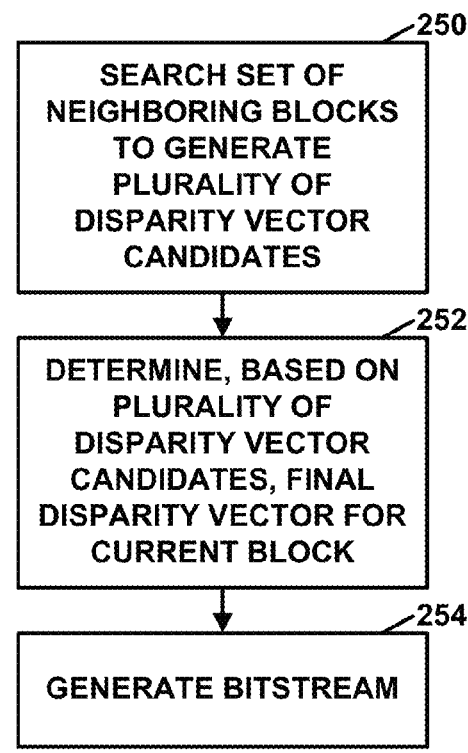
FIG. 7B is a flowchart illustrating an example operation of a video encoder, in accordance with one or more techniques of this disclosure.

FIG. 7B is a flowchart illustrating an example operation of video encoder 20, in accordance with one or more techniques of this disclosure. In the example of FIG. 7B, video encoder 20 may search a set of neighbor blocks of video data to generate a plurality of disparity vector candidates, wherein each of the neighbor blocks is a neighbor of a current block of the video data (250). In some examples, video encoder 20 may terminate searching the set of neighboring blocks when the number of generated disparity vector candidates exceeds a threshold. For instance, the plurality of disparity vector candidates may include up to three spatial disparity vectors and up to three temporal disparity vectors.

As indicated elsewhere in this disclosure, video encoder 20 may search the set of neighboring blocks in a parallel fashion. In such examples, video encoder 20 may concurrently search spatial and temporal neighboring blocks for disparity motion vectors and may include the disparity motion vectors in the plurality of disparity vector candidates. In other examples, video encoder 20 may search the set of neighboring blocks in a serial fashion. For instance, video encoder 20 may search spatial neighboring blocks for disparity motion vectors. After searching the spatial neighboring blocks, video encoder 20 may search temporal neighboring blocks for additional disparity motion vectors. Video encoder 20 may include the disparity motion vectors and the additional disparity motion vectors in the plurality of disparity vector candidates.

Video encoder 20 may determine, based at least in part on the plurality of disparity vector candidates, a final disparity vector for the current block (252). For example, video encoder 20 may apply a median function to the plurality of disparity vector candidates to determine the final disparity vector for the current block. In other examples, video encoder 20 may determine the final disparity vector for the current block as a maximum horizontal disparity vector in the plurality of disparity vector candidates. In some examples, the plurality of disparity vector candidates includes up to three spatial disparity vectors and up to three temporal disparity vectors and video encoder 20 may apply a mathematical operation (e.g., a median operation, etc.) on up to three of the plurality of disparity vector candidates to derive the final disparity vector for the current block.

In addition, video encoder 20 may generate a bitstream that includes a coded representation of the video data in part by performing, based on the final disparity vector for the current block, inter-view motion prediction or inter-view residual prediction for the current block (254).

Figure 8A:
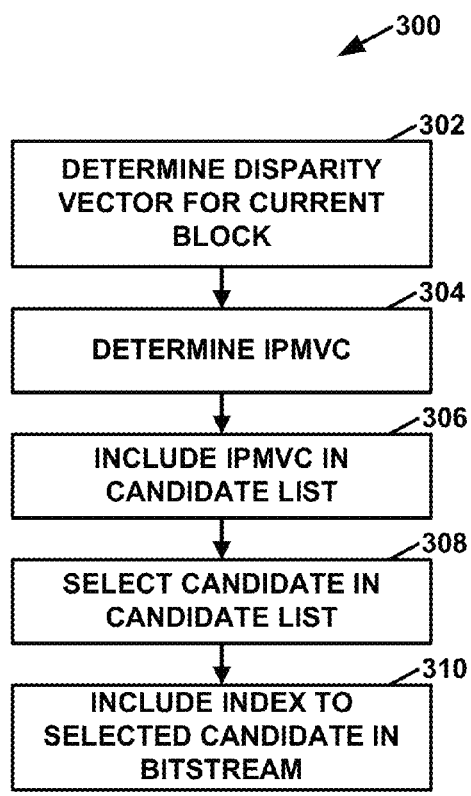
FIG. 8A is a flowchart illustrating an example operation of a video encoder for performing inter-view motion prediction, in accordance with one or more techniques of this disclosure.

FIG. 8A is a flowchart illustrating an example operation 300 of video encoder 20 for performing inter-view motion prediction, in accordance with one or more techniques of this disclosure. As illustrated in the example of FIG. 8A, video encoder 20 may perform a disparity vector derivation process to determine a disparity vector for a current block (302). In accordance with the techniques of this disclosure, video encoder 20 may determine the disparity vector for the current block by searching a set of neighbor blocks to generate a plurality of disparity vector candidates. Video encoder 20 determine, based at least in part on the plurality of disparity vector candidates, the final disparity vector for the current block.

Next, video encoder 20 may determine an inter-view prediction motion vector candidate (IPMVC) for the current block (304). An IPMVC is a motion vector candidate that indicates a motion vector of an inter-view reference block (e.g., an inter-view reference PU). Video encoder 20 may use the disparity vector for the current block to determine a location within an inter-view reference picture of the inter-view reference block. Video encoder 20 may then include the IPMVC in a candidate list (e.g., a merge candidate list or an AMVP candidate list) for the current block (306). In some examples, video encoder 20 may also include an inter-view disparity motion vector candidate (IDMVC) in the candidate list. The IDMVC may indicate the disparity vector for the current block.

Subsequently, video encoder 20 may select a candidate from the candidate list (308). In some instances, the selected candidate is the IPMVC or the IDMVC. Video encoder 20 may then include, in a bitstream, data indicating an index of the selected candidate (310). For example, if the candidate list is a merge candidate list, video encoder 20 may include, in the bitstream, data indicating a merge_idx syntax element that indicates the selected candidate. In another example, if the candidate list is an AMVP candidate list, video encoder 20 may include, in the bitstream, data indicating an mvp_10_flag syntax element or an mvp_11_flag syntax element that indicates the selected candidate. In this example, video encoder 20 may also include data indicating a reference index (e.g., a ref_idx10 syntax element or a ref_idx11 syntax element) for the current block and data indicating a motion vector difference (e.g., an mvd_coding syntax structure) for the current block.

Figure 8B:
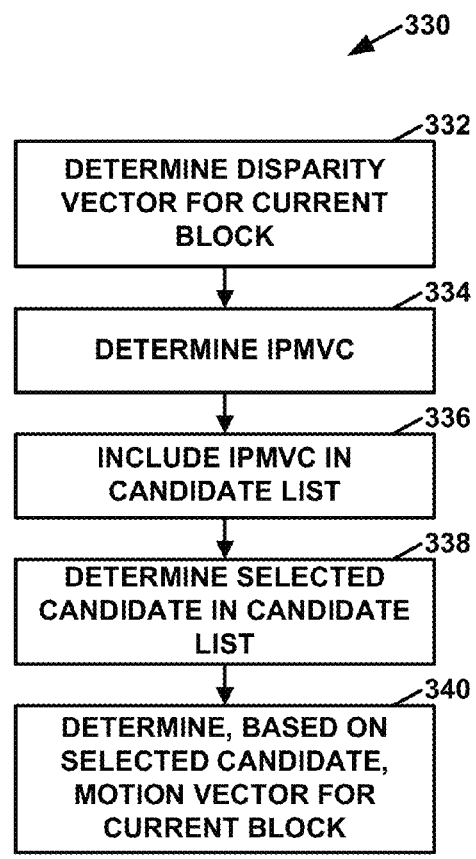
FIG. 8B is a flowchart illustrating an example operation of a video decoder for performing inter-view motion prediction, in accordance with one or more techniques of this disclosure.

FIG. 8B is a flowchart illustrating an example operation 330 of video decoder 30 for performing inter-view motion prediction, in accordance with one or more techniques of this disclosure. As illustrated in the example of FIG. 8B, video decoder 30 may perform a disparity vector derivation process to determine a disparity vector for a current block (332). In accordance with the techniques of this disclosure, video decoder 30 may determine the disparity vector for the current block by searching a set of neighbor blocks to generate a plurality of disparity vector candidates, each of which may be a disparity motion vector (or in some examples, an IDV). Video decoder 30 determine, based at least in part on the plurality of disparity vector candidates, a final disparity vector for the current block.

Next, video decoder 30 may determine, based on the disparity vector for the current block, an IPMVC (334). For instance, video decoder 30 may use the disparity vector for the current block to determine an inter-view reference block. The IPMVC may specify a motion vector of the determined inter-view reference block. Video decoder 30 may include the IPMVC in a candidate list (e.g., a merge candidate list or an AMVP candidate list) for the current block (336). In some examples, video decoder 30 may include an IDMVC in the candidate list. The IDMVC may specify the disparity vector for the current block.

Subsequently, video decoder 30 may determine, based on data in a bitstream, a selected candidate in the candidate list (338). For example, if the candidate list is a merge candidate list, video decoder 30 may determine the selected candidate based on a merge_idx syntax element obtained from the bitstream. In another example, if the candidate list is an AMVP candidate list, video decoder 30 may determine the selected candidate based on an mvp_10_flag syntax element or an mvp_11_flag syntax element obtained from the bitstream. In some instances, the selected candidate is the IPMVC. Video decoder 30 may then determine, based on the selected candidate, a motion vector for the current block (340).

Figures 9A, 9B:
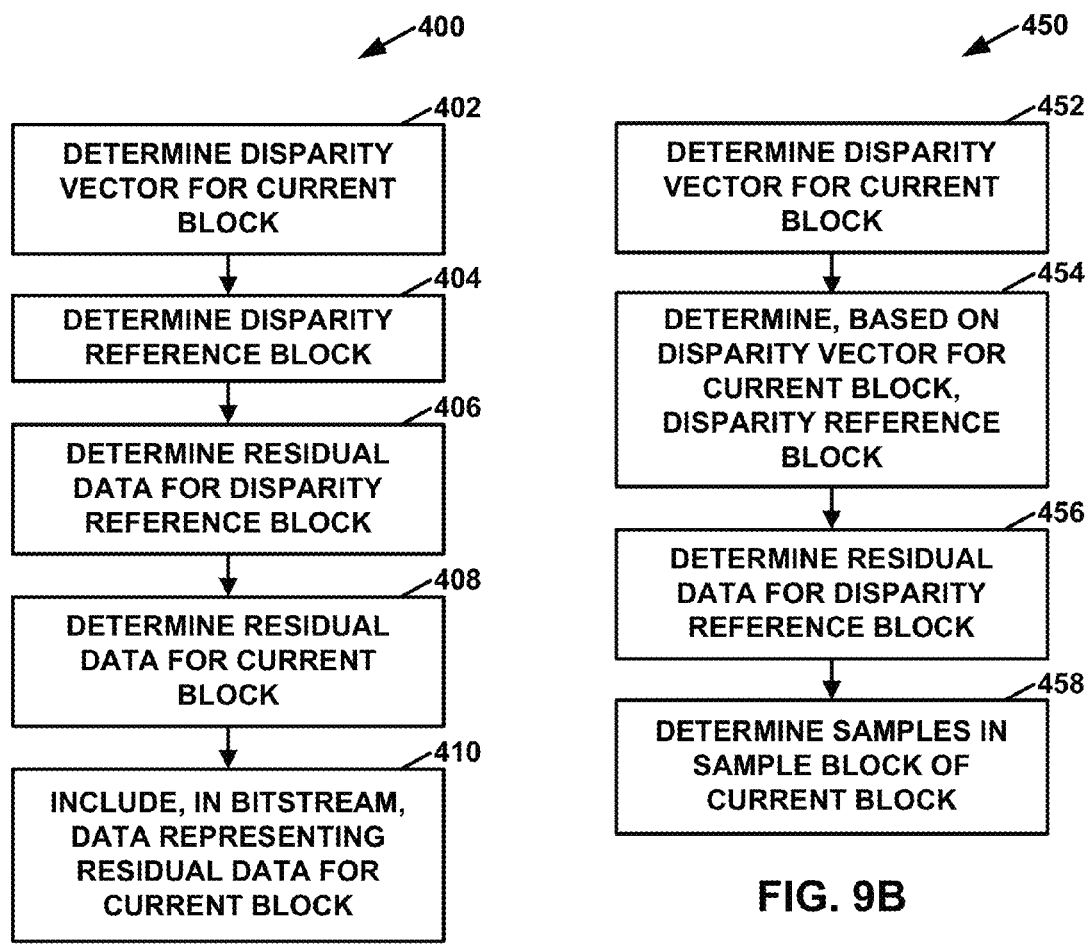
FIG. 9A is a flowchart illustrating an example operation of a video encoder for performing inter-view residual prediction, in accordance with one or more techniques of this disclosure.
FIG. 9B is a flowchart illustrating an example operation of a video decoder for performing inter-view residual prediction, in accordance with one or more techniques of this disclosure.

FIG. 9A is a flowchart illustrating an example operation 400 of video encoder 20 for performing inter-view residual prediction, in accordance with one or more techniques of this disclosure. As illustrated in the example of FIG. 9A, video encoder 20 may determine a disparity vector for a current block (402). In accordance with the techniques of this disclosure, video encoder 20 may determine the disparity vector for the current block by searching a set of neighbor blocks to generate a plurality of disparity vector candidates. Video encoder 20 may determine, based at least in part on the plurality of disparity vector candidates, the final disparity vector for the current block.

Furthermore, in the example of FIG. 9A, video encoder 20 may determine, based on the disparity vector for the current block, a disparity reference block for the current block (404). In some examples, the disparity reference block for the current block may comprise a block of samples based on samples in a disparity reference picture. For instance, the disparity reference block may include actual or interpolated samples of the disparity reference picture. The disparity reference picture is associated with the same time instance as the current block, but is associated with a different view than the current block.

Video encoder 20 may determine residual data for the disparity reference block (406). In some examples, the residual data for the disparity reference block may include samples indicating differences between samples of the disparity reference block and corresponding samples of one or more predictive blocks for the disparity reference block. Video encoder 20 may then determine residual data for the current block (408). The residual data for the current block may include samples that indicate differences between corresponding samples in an original sample block for the current block, the residual data for the disparity reference block for the current block, and one or more predictive blocks. Subsequently, video encoder 20 may include, in a bitstream, data representing residual data for the current block (410).

FIG. 9B is a flowchart illustrating an example operation 450 of video decoder 30 for performing inter-view residual prediction, in accordance with one or more techniques of this disclosure. As illustrated in the example of FIG. 9B, video decoder 30 may determine a disparity vector for the current block (452). In accordance with the techniques of this disclosure, video decoder 30 may determine the disparity vector for the current block by searching a set of neighbor blocks to generate a plurality of disparity vector candidates. Video decoder 30 may determine, based at least in part on the plurality of disparity vector candidates, the final disparity vector for the current block.

Furthermore, in the example of FIG. 9B, video decoder 30 may determine, based on the disparity vector for the current block, a disparity reference block for the current block (454). The disparity reference block for the current block may comprise a block of samples based on samples in a disparity reference picture. For instance, the disparity reference block may include samples of the disparity reference picture. The disparity reference picture is associated with the same time instance as the current block, but is associated with a different view than the current block.

Video decoder 30 may determine residual data for the disparity reference block (456). The residual data for the disparity reference block may include samples indicating differences between samples of the disparity reference block and corresponding samples of one or more predictive blocks for the disparity reference block. Subsequently, video decoder 30 may determine samples in a sample block for the current block (458). The sample block for the current block may include samples that are the sum of corresponding samples in the residual data for the disparity reference blocks for the one or more sub-blocks of the parent block, one or more predictive blocks, and residual data signaled in a bitstream.

Figure 10:
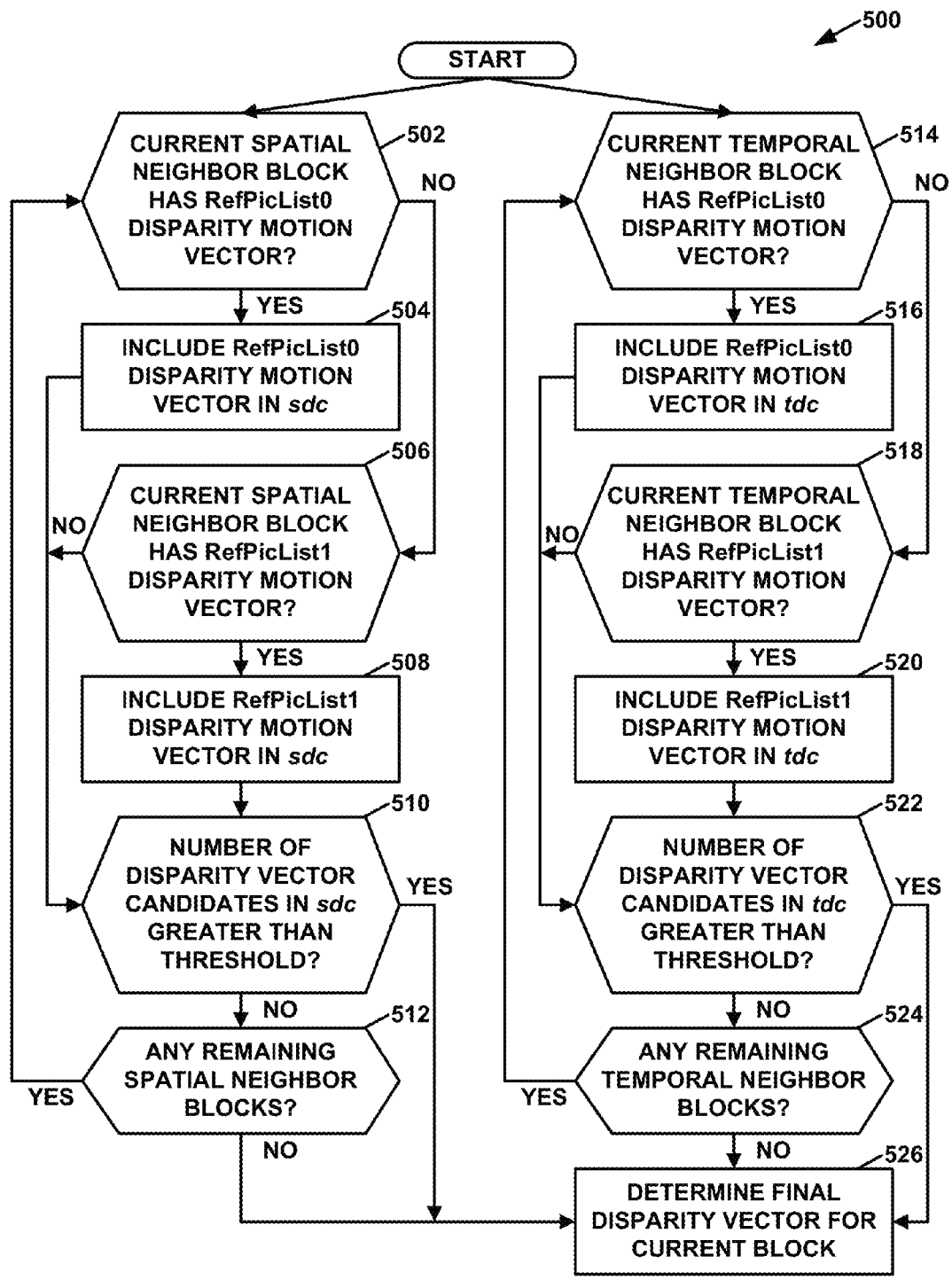
FIG. 10 is a flowchart illustrating an example operation in which a video coder searches neighboring blocks in a parallel fashion, in accordance with one or more techniques of this disclosure.

FIG. 10 is a flowchart illustrating an example operation 500 in which a video coder searches neighboring blocks in a parallel fashion, in accordance with one or more techniques of this disclosure. In the example of FIG. 10, the video coder determines whether a current spatial neighbor block has a RefPicList0 disparity motion vector (502). The current spatial neighbor block may be one of the spatial neighboring blocks of a current block. A RefPicList0 disparity motion vector of a block is a motion vector that indicates a location in an inter-view reference picture in the block's RefPicList0. In response to determining that the current spatial neighbor block has a RefPicList0 disparity motion vector ("YES" of 502), the video coder may include the RefPicList0 disparity motion vector of the current spatial neighbor block in a spatial disparity candidate list (i.e., sdc) (504).

On the other hand, in response to determining that the current spatial neighboring block does not have a RefPicList0 disparity motion vector ("NO" of 502), the video coder may determine whether the current spatial neighbor block has a RefPicList1 disparity motion vector (506). A RefPicList1 disparity motion vector of a block is a motion vector that indicates a location in an inter-view reference picture in the block's RefPicList1. In response to determining that the current spatial neighbor block has a RefPicList1 disparity motion vector ("YES" of 506), the video coder may include the RefPicList1 disparity motion vector for the current spatial neighbor block in sdc (508).

After including the RefPicList0 disparity motion vector of the current spatial neighbor block in sdc (504), or the RefPicList1 disparity motion vector of the current spatial neighbor block in sdc (508), or in response to determining that the current spatial neighbor block does not have a RefPicList1 disparity motion vector ("NO" of 506), the video coder may determine whether the number of disparity vector candidates in sdc is greater than a threshold (510). In response to determining that the number of disparity vector candidates in sdc is not greater than the threshold ("NO" of 510), the video coder may determine whether there are any remaining spatial neighboring blocks to check (512). In response to determining that there are one or more remaining spatial neighboring blocks to check ("YES" of 512), the video coder may repeat actions 502-512 with one of the remaining spatial neighboring blocks as the current spatial neighboring block. In this way, the video coder may repeat actions 502-512 until the video coder has checked all of the spatial neighboring blocks or the number of disparity vector candidates in sdc is greater than the threshold.

Furthermore, in the example of FIG. 10, the video coder may perform actions 514-524 concurrently with performing actions 502-512. Thus, in the example of FIG. 10, the video coder determines whether a current temporal neighbor block has a RefPicList0 disparity motion vector (514). The current temporal neighbor block may be one of the temporal neighboring blocks of the current block. In response to determining that the current temporal neighbor block has a RefPicList0 disparity motion vector ("YES" of 514), the video coder may include the RefPicList0 disparity motion vector of the current temporal neighbor block in a temporal disparity candidate list (i.e., tdc) (516).

On the other hand, in response to determining that the current temporal neighboring block does not have a RefPicList0 disparity motion vector ("NO" of 514), the video coder may determine whether the current temporal neighbor block has a RefPicList1 disparity motion vector (518). In response to determining that the current temporal neighbor block has a RefPicList1 disparity motion vector ("YES" of 518), the video coder may include the RefPicList1 disparity motion vector for the current temporal neighbor block in tdc (520).

After including the RefPicList0 disparity motion vector of the current temporal neighbor block in tdc (516), or after including the RefPicList1 disparity motion vector of the current temporal neighbor block in tdc (520), or in response to determining that the current temporal neighbor block does not have a RefPicList1 disparity motion vector ("NO" of 518), the video coder may determine whether the number of disparity vector candidates in tdc is greater than a threshold (522). In response to determining that the number of disparity vector candidates in tdc is not greater than the threshold ("NO" of 522), the video coder may determine whether there are any remaining temporal neighboring blocks to check (524). In response to determining that there are one or more remaining temporal neighboring blocks to check ("YES" of 524), the video coder may repeat actions 514-524 with one of the remaining temporal neighboring blocks as the current temporal neighboring block. In this way, the video coder may repeat actions 514-524 until the video coder has checked all of the temporal neighboring blocks or the number of disparity vector candidates in tdc is greater than the threshold.

After determining that the number of disparity vector candidates in sdc is greater than the threshold ("YES" of 510) or after determining that there are no remaining spatial neighboring blocks to check ("NO" of 512) and after determining that the number of disparity vector candidates in tdc is greater than the threshold ("YES" of 522) or after determining that there are no remaining temporal neighboring blocks to check ("NO" of 524), the video coder may determine, based on the disparity vector candidates in sdc and tdc, the final disparity vector for the current block (526). The video coder may determine the final disparity vector for the current block in accordance with the examples described elsewhere in this disclosure. The example of FIG. 10 may be modified such that the video coder generates a list of disparity vector candidates (i.e., idc) in a manner similar to that shown in FIG. 10 for generating sdc and tdc.

Figure 11:
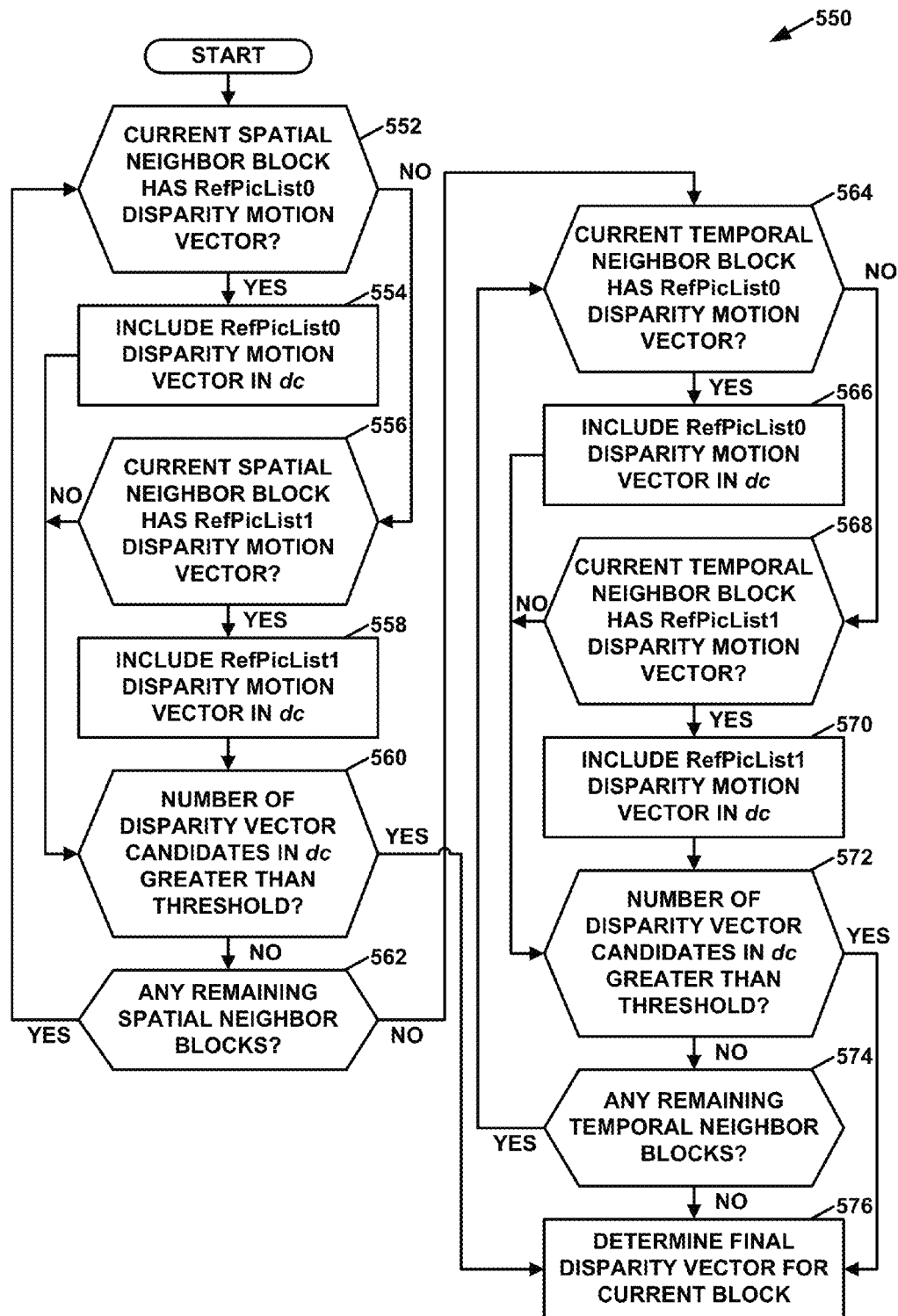
FIG. 11 is a flowchart illustrating an example operation in which a video coder searches neighboring blocks in a serial fashion, in accordance with one or more techniques of this disclosure.

FIG. 11 is a flowchart illustrating an example operation 550 in which a video coder searches neighboring blocks in a serial fashion, in accordance with one or more techniques of this disclosure. In the example of FIG. 11, the video coder determines whether a current spatial neighbor block has a RefPicList0 disparity motion vector (552). The current spatial neighbor block may be one of the spatial neighboring blocks of a current block. In response to determining that the current spatial neighbor block has a RefPicList0 disparity motion vector ("YES" of 552), the video coder may include the RefPicList0 disparity motion vector of the current spatial neighbor block in a disparity candidate list (i.e., dc) (554).

On the other hand, in response to determining that the current spatial neighbor block does not have a RefPicList0 disparity motion vector ("NO" of 552), the video coder may determine whether the current spatial neighbor block has a RefPicList1 disparity motion vector (556). In response to determining that the current spatial neighbor block has a RefPicList1 disparity motion vector ("YES" of 556), the video coder may include the RefPicList1 disparity motion vector for the current spatial neighbor block in dc (558).

After including the RefPicList0 disparity motion vector of the current spatial neighbor block in dc (554), or the RefPicList1 disparity motion vector of the current spatial neighbor block in dc (558), or in response to determining that the current spatial neighbor block does not have a RefPicList1 disparity motion vector ("NO" of 556), the video coder may determine whether the number of disparity vector candidates in dc is greater than a threshold (560). In response to determining that the number of disparity vector candidates in dc is not greater than the threshold ("NO" of 560), the video coder may determine whether there are any remaining spatial neighboring blocks to check (562). In response to determining that there are one or more remaining spatial neighboring blocks to check ("YES" of 562), the video coder may repeat actions 552-562 with one of the remaining spatial neighboring blocks as the current spatial neighboring block. In this way, the video coder may repeat actions 552-562 until the video coder has checked all of the spatial neighboring blocks or the number of disparity vector candidates in dc is greater than the threshold.

Furthermore, in response to determining that there are no remaining spatial neighboring blocks ("NO" of 562), the video coder may determine whether a current temporal neighbor block has a RefPicList0 disparity motion vector (564). The current temporal neighbor block may be one of the temporal neighboring blocks of the current block. In response to determining that the current temporal neighbor block has a RefPicList0 disparity motion vector ("YES" of 564), the video coder may include the RefPicList0 disparity motion vector of the current temporal neighbor block in dc (566).

On the other hand, in response to determining that the current temporal neighbor block does not have a RefPicList0 disparity motion vector ("NO" of 564), the video coder may determine whether the current temporal neighbor block has a RefPicList1 disparity motion vector (568). In response to determining that the current temporal neighbor block has a RefPicList1 disparity motion vector ("YES" of 568), the video coder may include the RefPicList1 disparity motion vector for the current temporal neighbor block in dc (570).

After including the RefPicList0 disparity motion vector of the current temporal neighbor block in dc (566), or the RefPicList1 disparity motion vector of the current temporal neighbor block in dc (570), or in response to determining that the current temporal neighbor block does not have a RefPicList1 disparity motion vector ("NO" of 568), the video coder may determine whether the number of disparity vector candidates in dc is greater than a threshold (572). In response to determining that the number of disparity vector candidates in dc is not greater than the threshold ("NO" of 572), the video coder may determine whether there are any remaining temporal neighbor blocks to check (574). In response to determining that there are one or more remaining temporal neighbor blocks to check ("YES" of 574), the video coder may repeat actions 564-574 with one of the remaining temporal neighbor blocks as the current temporal neighbor block. In this way, the video coder may repeat actions 564-574 until the video coder has checked all of the temporal neighbor blocks or the number of disparity vector candidates in dc is greater than the threshold.

After determining that the number of disparity vector candidates in dc is greater than the threshold ("YES" of 560) or after determining that the number of disparity vector candidates in dc is greater than the threshold ("YES" of 572) or after determining that there are no remaining temporal neighbor blocks to check ("NO" of 574), the video coder may determine, based on the disparity vector candidates in dc, the final disparity vector for the current block (576). The video coder may determine the final disparity vector for the current block in accordance with the examples described elsewhere in this disclosure. The example of FIG. 11 may be modified such that the video coder generates includes IDVs in dc in a manner similar to that shown in FIG. 11 for spatial disparity vector candidates and temporal disparity vector candidates.

The following are additional examples in accordance with one or more techniques of this disclosure.

Example 1A

A method of coding video data, the method comprising: searching a set of neighbor blocks to generate a plurality of disparity vector candidates, wherein each of the neighbor blocks is a neighbor of a current block; and determining, based at least in part on the plurality of disparity vector candidates, a final disparity vector of the current block.

Example 2A

The method of example 1A, wherein searching the set of neighbor blocks comprises: checking, in a series, the neighbor blocks for available disparity motion vectors and implicit disparity vectors; and including the available disparity motion vectors and the implicit disparity vectors in the plurality of disparity vector candidates.

Example 3A

The method of example 2A, wherein: the set of neighbor blocks includes a set of spatial neighbor blocks that spatially neighbor the current block and a set of temporal neighbor blocks that are in different pictures than the current block, and checking the neighbor blocks comprises checking the spatial neighbor blocks and then checking the temporal neighbor blocks.

Example 4A

The method of example 1A, wherein searching the set of neighbor blocks comprises: checking, in parallel, two or more of the neighbor blocks for available disparity motion vectors and implicit disparity vectors; and including the available disparity motion vectors and implicit disparity vectors in the plurality of disparity vector candidates.

Example 5A

The method of example 4A, wherein: the set of neighbor blocks includes a set of spatial neighbor blocks that spatially neighbor the current block and a set of temporal neighbor blocks that are in different pictures than the current block; and checking the two or more neighbor blocks comprises: checking, in parallel, the spatial neighbor blocks; and checking, in parallel, the temporal neighbor blocks.

Example 6A

The method of any of examples 1A-5A, further comprising pruning a particular disparity vector candidate from the plurality of disparity vector candidates based at least in part on a closeness of the particular disparity vector candidate to another disparity vector candidate in the plurality of disparity vector candidates.

Example 7A

The method of any of examples 1A-6A, wherein searching the set of neighbor blocks comprises: determining that a particular neighbor block has a first set of motion parameters and a second set of motion parameters; and including the first set of motion parameters, and not the second set of motion parameters, in the plurality of disparity vector candidates.

Example 8A

The method of any of examples 1A-7A, wherein searching the set of neighbor blocks comprises terminating the search in response to determining that the number of disparity vector candidates in the plurality of disparity vector candidates is greater than a threshold.

Example 9A

The method of any of examples 1A-8A, wherein: the set of neighbor blocks includes a set of spatial neighbor blocks that spatially neighbor the current block and a set of temporal neighbor blocks that are in different pictures than the current block, and searching the set of neighbor blocks comprises: terminating the search among the spatial neighbor blocks in response to determining that the number of disparity vector candidates from the set of spatial neighbor blocks is greater than a first threshold; and terminating the search among the temporal neighbor blocks in response to determining that the number of disparity vector candidates from the set of temporal neighbor blocks is greater than a second threshold.

Example 10A

The method of example 9A, wherein searching the set of neighbor blocks terminating the search in response to determining that the number of implicit disparity vectors in the plurality of disparity vector candidates exceeds a third threshold.

Example 11A

The method of any of examples 1A-10A, wherein: each of the disparity vector candidates has a horizontal component and vertical component, and determining the final disparity vector of the current block comprises: in response to determining that the number of disparity vector candidates in the plurality of disparity vector candidates is greater than or equal to three, determining that an applicable horizontal component value is equal to a median of the horizontal components of a subset of the plurality of disparity vector candidates; in response to determining that the number of disparity vector candidates in the plurality of disparity vector candidates is equal to two, determining that the applicable horizontal component value is equal to a largest of the horizontal components of the disparity vector candidates; and determining that the final disparity vector is a disparity vector candidate in the plurality of disparity vector candidates whose horizontal component is equal to the applicable horizontal component.

Example 12A

The method of any of examples 1A-10A, wherein: the set of neighbor blocks includes a set of spatial neighbor blocks that spatially neighbor the current block and a set of temporal neighbor blocks that are in different pictures than the current block, each of the disparity vector candidates has a horizontal component and vertical component, and determining the final disparity vector of the current block comprises: in response to determining that the number of disparity vector candidates in the plurality of disparity vector candidates is greater than or equal to three, determining that an applicable horizontal component value is equal to a median of the horizontal components of a spatial disparity candidate, a temporal disparity candidate and an implicit disparity candidate in the plurality of disparity vector candidates, the spatial disparity candidate being from one of the spatial neighbor blocks, the temporal disparity candidate being from one of the temporal neighbor blocks; and determining that the final disparity vector is a disparity vector candidate in the plurality of disparity vector candidates whose horizontal component is equal to the applicable horizontal component.

Example 13A

The method of any of examples 1A-12A, further comprising: decoding the current block based in part on the final disparity vector of the current block.

Example 14A

The method of any of examples 1A-12A, further comprising: encoding the current block based in part on the final disparity vector of the current block.

Example 15A

A method of coding video data that includes the methods of any of examples 1A-14A.

Example 16A

A video coding device that comprises one or more processors configured to: search a set of neighbor blocks to generate a plurality of disparity vector candidates, wherein each of the neighbor blocks is a neighbor of a current block; and determine, based at least in part on the plurality of disparity vector candidates, a final disparity vector of the current block.

Example 17A

The video coding device of example 16A, wherein the one or more processors are configured to search the set of neighbor blocks at least in part by: checking, in a series, the neighbor blocks for available disparity motion vectors and implicit disparity vectors; and including the available disparity motion vectors and the implicit disparity vectors in the plurality of disparity vector candidates.

Example 18A

The video coding device of example 17A, wherein: the set of neighbor blocks includes a set of spatial neighbor blocks that spatially neighbor the current block and a set of temporal neighbor blocks that are in different pictures than the current block, and the one or more processors are configured to check the spatial neighbor blocks and then check the temporal neighbor blocks.

Example 19A

The video coding device of example 16A, wherein the one or more processors are configured to search the set of neighbor blocks at least in part by: checking, in parallel, two or more of the neighbor blocks for available disparity motion vectors and implicit disparity vectors; and including the available disparity motion vectors and implicit disparity vectors in the plurality of disparity vector candidates.

Example 20A

The video coding device of example 19A, wherein: the set of neighbor blocks includes a set of spatial neighbor blocks that spatially neighbor the current block and a set of temporal neighbor blocks that are in different pictures than the current block; and the one or more processors are configured to: check, in parallel, the spatial neighbor blocks; and check, in parallel, the temporal neighbor blocks.

Example 21A

The video coding device of any of examples 16A-20A, wherein the one or more processors are configured to prune a particular disparity vector candidate from the plurality of disparity vector candidates based at least in part on a closeness of the particular disparity vector candidate to another disparity vector candidate in the plurality of disparity vector candidates.

Example 22A

The video coding device of any of examples 16A-21A, wherein the one or more processors are configured to: determine that a particular neighbor block has a first set of motion parameters and a second set of motion parameters; and include the first set of motion parameters, and not the second set of motion parameters, in the plurality of disparity vector candidates.

Example 23A

The video coding device of any of examples 16A-22A, wherein the one or more processors are configured to terminate the search in response to determining that the number of disparity vector candidates in the plurality of disparity vector candidates is greater than a threshold.

Example 24A

The video coding device of any of examples 16A-23A, wherein: the set of neighbor blocks includes a set of spatial neighbor blocks that spatially neighbor the current block and a set of temporal neighbor blocks that are in different pictures than the current block, and the one or more processors are configured to: terminate the search among the spatial neighbor blocks in response to determining that the number of disparity vector candidates from the set of spatial neighbor blocks is greater than a first threshold; and terminate the search among the temporal neighbor blocks in response to determining that the number of disparity vector candidates from the set of temporal neighbor blocks is greater than a second threshold.

Example 25A

The video coding device of example 24A, wherein the one or more processors are configured to terminate the search in response to determining that the number of implicit disparity vectors in the plurality of disparity vector candidates exceeds a third threshold.

Example 26A

The video coding device of any of examples 16A-25A, wherein: each of the disparity vector candidates has a horizontal component and vertical component, and the one or more processors are configured to determine the final disparity vector of the current block at least in part by: determining, in response to determining that the number of disparity vector candidates in the plurality of disparity vector candidates is greater than or equal to three, that an applicable horizontal component value is equal to a median of the horizontal components of a subset of the plurality of disparity vector candidates; determining, in response to determining that the number of disparity vector candidates in the plurality of disparity vector candidates is equal to two, that the applicable horizontal component value is equal to a largest of the horizontal components of the disparity vector candidates; and determining that the final disparity vector is a disparity vector candidate in the plurality of disparity vector candidates whose horizontal component is equal to the applicable horizontal component.

Example 27A

The video coding device of any of examples 16A-25A, wherein: the set of neighbor blocks includes a set of spatial neighbor blocks that spatially neighbor the current block and a set of temporal neighbor blocks that are in different pictures than the current block, each of the disparity vector candidates has a horizontal component and vertical component, and the one or more processors are configured to determine the final disparity vector of the current block at least in part by: determining, in response to determining that the number of disparity vector candidates in the plurality of disparity vector candidates is greater than or equal to three, that an applicable horizontal component value is equal to a median of the horizontal components of a spatial disparity candidate, a temporal disparity candidate and an implicit disparity candidate in the plurality of disparity vector candidates, the spatial disparity candidate being from one of the spatial neighbor blocks, the temporal disparity candidate being from one of the temporal neighbor blocks; and determining that the final disparity vector is a disparity vector candidate in the plurality of disparity vector candidates whose horizontal component is equal to the applicable horizontal component.

Example 28A

The video coding device of any of examples 16A-27A, wherein the one or more processors are further configured to decode the current block based in part on the final disparity vector of the current block.

Example 29A

The video coding device of any of examples 16A-27A, wherein the one or more processors are further configured to encode the current block based in part on the final disparity vector of the current block.

Example 30A

A video coding device comprising means for performing any of the methods of examples 1A-14A.

Example 31A

A computer-readable storage medium that comprises computer-executable instructions that, when executed by one or more processors of a video coding device, configure the video coding device to perform any of the methods of examples 1A-14A.

Example 1B

A method of coding video data, the method comprising: searching a set of neighbor blocks to generate a plurality of disparity vector candidates, wherein each of the neighbor blocks is a neighbor of a current block; and determining, based at least in part on the plurality of disparity vector candidates, a final disparity vector of the current block.

Example 2B

The method of example 1B, wherein determining the final disparity vector comprises: in response to determining that all of the disparity vector candidates have the same reference view index, determining that the final disparity vector of the current block is a median of the plurality of disparity vector candidates; and in response to determining that not all of the disparity vector candidates have the same reference view index, determining that the final disparity vector of the current block is one of the disparity vector candidates that has a reference view index.

Example 3B

The method of example 1B, wherein determining the final disparity vector comprises determining that the final disparity vector of the current block is a median of the plurality of disparity vector candidates.

Example 4B

The method of example 1B, wherein determining the final disparity vector comprises determining the final disparity vector of the current block as a maximum horizontal disparity vector in the plurality of disparity vector candidates.

Example 5B

The method of example 1B, wherein the plurality of disparity vector candidates includes up to three spatial disparity vectors and up to three temporal disparity vectors; and wherein determining the final disparity vector comprises applying a mathematical operation on up to three of the plurality of disparity vector candidates to derive the final disparity vector.

Example 6B

The method of example 1B, wherein the method encodes the video data.

Example 7B

The method of example 1B, wherein the method decodes the video data.

Example 8B

A method of coding video data that includes the methods of any of examples 1B-7B.

Example 9B

A video coding device that comprises one or more processors configured to: search a set of neighbor blocks to generate a plurality of disparity vector candidates, wherein each of the neighbor blocks is a neighbor of a current block; and determine, based at least in part on the plurality of disparity vector candidates, a final disparity vector of the current block.

Example 10B

The video coding device of example 9B, wherein the one or more processors are configured to determine the final disparity vector at least in part by: determining, in response to determining that all of the disparity vector candidates have the same reference view index, that the final disparity vector of the current block is a median of the plurality of disparity vector candidates; and determining, in response to determining that not all of the disparity vector candidates have the same reference view index, that the final disparity vector of the current block is one of the disparity vector candidates that has a reference view index.

Example 11B

The video coding device of example 9B, wherein the one or more processors are configured to determine that the final disparity vector of the current block is a median of the plurality of disparity vector candidates.

Example 12B

The video coding device of example 9B, wherein the one or more processors are configured to determine the final disparity vector of the current block as a maximum horizontal disparity vector in the plurality of disparity vector candidates.

Example 13B

The video coding device of example 9B, wherein the plurality of disparity vector candidates includes up to three spatial disparity vectors and up to three temporal disparity vectors; and wherein the one or more processors are configured to apply a mathematical operation on up to three of the plurality of disparity vector candidates to derive the final disparity vector.

Example 14B

The video coding device of example 9B, wherein the one or more processors are configured to encode the video data.

Example 15B

The video coding device of example 9B, wherein the one or more processors are configured to decode the video data.

Example 16B

A video coding device comprising means for performing any of the methods of examples 1B-8B.

Example 17B

A computer-readable storage medium that comprises computer-executable instructions that, when executed by one or more processors of a video coding device, configure the video coding device to perform any of the methods of examples 1B-8B.

Any details of any of the examples above may be combined with other examples, consistent with this disclosure. In one or more examples, the functions described may be implemented in hardware, software, firmware, or any combination thereof. If implemented in software, the functions may be stored on or transmitted over, as one or more instructions or code, a computer-readable medium and executed by a hardware-based processing unit. Computer-readable media may include computer-readable storage media, which corresponds to a tangible medium such as data storage media, or communication media including any medium that facilitates transfer of a computer program from one place to another, e.g., according to a communication protocol. In this manner, computer-readable media generally may correspond to (1) tangible computer-readable storage media which is non-transitory or (2) a communication medium such as a signal or carrier wave. Data storage media may be any available media that can be accessed by one or more computers or one or more processors to retrieve instructions, code and/or data structures for implementation of the techniques described in this disclosure. A computer program product may include a computer-readable medium.

By way of example, and not limitation, such computer-readable storage media can comprise RAM, ROM, EEPROM, CD-ROM or other optical disk storage, magnetic disk storage, or other magnetic storage devices, flash memory, or any other medium that can be used to store desired program code in the form of instructions or data structures and that can be accessed by a computer. Also, any connection is properly termed a computer-readable medium. For example, if instructions are transmitted from a website, server, or other remote source using a coaxial cable, fiber optic cable, twisted pair, digital subscriber line (DSL), or wireless technologies such as infrared, radio, and microwave, then the coaxial cable, fiber optic cable, twisted pair, DSL, or wireless technologies such as infrared, radio, and microwave are included in the definition of medium. It should be understood, however, that computer-readable storage media and data storage media do not include connections, carrier waves, signals, or other transient media, but are instead directed to non-transient, tangible storage media. Disk and disc, as used herein, includes compact disc (CD), laser disc, optical disc, digital versatile disc (DVD), floppy disk and Blu-ray disc, where disks usually reproduce data magnetically, while discs reproduce data optically with lasers. Combinations of the above should also be included within the scope of computer-readable media.

Instructions may be executed by one or more processors, such as one or more digital signal processors (DSPs), general purpose microprocessors, application specific integrated circuits (ASICs), field programmable logic arrays (FPGAs), or other equivalent integrated or discrete logic circuitry. Accordingly, the term "processor," as used herein may refer to any of the foregoing structure or any other structure suitable for implementation of the techniques described herein. In addition, in some aspects, the functionality described herein may be provided within dedicated hardware and/or software modules configured for encoding and decoding, or incorporated in a combined codec. Also, the techniques could be fully implemented in one or more circuits or logic elements.

The techniques of this disclosure may be implemented in a wide variety of devices or apparatuses, including a wireless handset, an integrated circuit (IC) or a set of ICs (e.g., a chip set). Various components, modules, or units are described in this disclosure to emphasize functional aspects of devices configured to perform the disclosed techniques, but do not necessarily require realization by different hardware units. Rather, as described above, various units may be combined in a codec hardware unit or provided by a collection of interoperative hardware units, including one or more processors as described above, in conjunction with suitable software and/or firmware.

Various examples have been described. These and other examples are within the scope of the following claims.

What is claimed is:

1. A method of decoding video data, the method comprising:
 searching a set of neighbor blocks of the video data to generate a plurality of disparity vector candidates, wherein each of the neighbor blocks is a neighbor of a current block of the video data, wherein generating the plurality of disparity vector candidates comprises storing disparity motion vectors or implicit disparity vectors (IDVs) of the neighbor blocks as the plurality of disparity vector candidates;

in response to determining that all of the disparity vector candidates have the same reference view index, applying a mathematical function to the plurality of disparity vector candidates to determine a final disparity vector for the current block, wherein the mathematical function is one selected from a group consisting of a median operation, a minimum function, and a maximum function;

in response to determining that not all of the disparity vector candidates have the same reference view index, determining that the final disparity vector for the current block is one of the disparity vector candidates; and reconstructing a sample block for the current block in part by performing, based on the final disparity vector for the current block, inter-view motion prediction or inter-view residual prediction for the current block.

2. The method of claim 1, wherein searching the set of neighbor blocks comprises:
concurrently searching spatial and temporal neighbor blocks for disparity motion vectors; and
including the disparity motion vectors in the plurality of disparity vector candidates.

3. The method of claim 1, wherein searching the set of neighbor blocks comprises:
searching spatial neighbor blocks for disparity motion vectors;
searching temporal neighbor blocks for additional disparity motion vectors; and
including the disparity motion vectors and the additional disparity motion vectors in the plurality of disparity vector candidates,
wherein the searching of the temporal neighbor blocks is not concurrent with the searching of the spatial neighbor blocks.

4. The method of claim 1, wherein searching the set of neighbor blocks comprises terminating searching the set of neighbor blocks when the number of generated disparity vector candidates exceeds a threshold greater than 1.

5. The method of claim 1, wherein applying the mathematical function to the plurality of disparity vector candidates to determine the final disparity vector comprises:
determining a particular disparity vector candidate by applying the mathematical function to horizontal components of the plurality of disparity vector candidates; and
setting a horizontal component of the final disparity vector to a horizontal component of the particular disparity vector candidate.

6. The method of claim 5, wherein applying the mathematical function to the plurality of disparity vector candidates to determine the final disparity vector further comprises:
determining a view index of the final disparity vector as a view index of the particular disparity vector candidate;
determining a reference index of the final disparity vector as a reference index of the particular disparity vector candidate; and
setting a vertical component of the final disparity vector to a vertical component of the particular disparity vector candidate.

7. The method of claim 1, wherein searching the set of neighbor blocks comprises only including non-zero disparity motion vectors in the plurality of disparity vector candidates.

8. A method of encoding video data, the method comprising:

searching a set of neighbor blocks of the video data to generate a plurality of disparity vector candidates, wherein each of the neighbor blocks is a neighbor of a current block of the video data, wherein generating the plurality of disparity vector candidates comprises storing disparity motion vectors or implicit disparity vectors (IDVs) of the neighbor blocks as the plurality of disparity vector candidates;

in response to determining that all of the disparity vector candidates have the same reference view index, applying a mathematical function to the plurality of disparity vector candidates to determine a final disparity vector for the current block, wherein the mathematical function is one selected from a group consisting of a median operation, a minimum function, and a maximum function;

in response to determining that not all of the disparity vector candidates have the same reference view index, determining that the final disparity vector for the current block is one of the disparity vector candidates; and generating a bitstream that includes a coded representation of the video data in part by performing, based on the final disparity vector for the current block, inter-view motion prediction or inter-view residual prediction for the current block.

9. The method of claim 8, wherein searching the set of neighbor blocks comprises:
concurrently searching spatial and temporal neighbor blocks for disparity motion vectors; and
including the disparity motion vectors in the plurality of disparity vector candidates.

10. The method of claim 8, wherein searching the set of neighbor blocks comprises:
searching spatial neighbor blocks for disparity motion vectors;
searching temporal neighbor blocks for additional disparity motion vectors; and
including the disparity motion vectors and the additional disparity motion vectors in the plurality of disparity vector candidates,
wherein the searching of the temporal neighbor blocks is not concurrent with the searching of the spatial neighbor blocks.

11. The method of claim 8, wherein searching the set of neighbor blocks comprises terminating searching the set of neighbor blocks when the number of generated disparity vector candidates exceeds a threshold greater than 1.

12. The method of claim 8, wherein applying the mathematical function to the plurality of disparity vector candidates to determine the final disparity vector comprises:
determining a particular disparity vector candidate by applying the mathematical function to horizontal components of the plurality of disparity vector candidates; and
setting a horizontal component of the final disparity vector to a horizontal component of the particular disparity vector candidate.

13. The method of claim 12, wherein applying the mathematical function to the plurality of disparity vector candidates to determine the final disparity vector further comprises:
determining a view index of the final disparity vector as a view index of the particular disparity vector candidate;
determining a reference index of the final disparity vector as a reference index of the particular disparity vector candidate; and setting a vertical component of the final disparity vector to a vertical component of the particular disparity vector candidate.

14. The method of claim 8, wherein searching the set of neighbor blocks comprises only including non-zero disparity motion vectors in the plurality of disparity vector candidates.

15. A video coding device that comprises:
a data storage medium configured to store video data, and one or more processors configured to:
search a set of neighbor blocks of the video data to generate a plurality of disparity vector candidates, wherein each of the neighbor blocks is a neighbor of a current block of the video data, wherein generating the plurality of disparity vector candidates comprises storing disparity motion vectors or implicit disparity vectors (IDVs) of the neighbor blocks as the plurality of disparity vector candidates;
apply, in response to determining that all of the disparity vector candidates have the same reference view index, a mathematical function to the plurality of disparity vector candidates to determine a final disparity vector for the current block, wherein the mathematical function is one selected from a group consisting of a median operation, a minimum function, and a maximum function; and
determine, in response to determining that not all of the disparity vector candidates have the same reference view index, that the final disparity vector for the current block is one of the disparity vector candidates.

16. The video coding device of claim 15, wherein the one or more processors are configured to:
concurrently search spatial and temporal neighbor blocks for disparity motion vectors; and
include the disparity motion vectors in the plurality of disparity vector candidates.

17. The video coding device of claim 15, wherein the one or more processors are configured to:
search spatial neighbor blocks for disparity motion vectors;
search temporal neighbor blocks for additional disparity motion vectors; and
include the disparity motion vectors and the additional disparity motion vectors in the plurality of disparity vector candidates,
wherein the search of the temporal neighbor blocks is not concurrent with the search of the spatial neighbor blocks.

18. The video coding device of claim 15, wherein the one or more processors are configured to terminate searching the set of neighbor blocks when the number of generated disparity vector candidates exceeds a threshold greater than 1.

19. The video coding device of claim 15, wherein the one or more processors are configured to:
determine a particular disparity vector candidate by applying the mathematical function to horizontal components of the plurality of disparity vector candidates; and
set a horizontal component of the final disparity vector to a horizontal component of the particular disparity vector candidate.

20. The video coding device of claim 19, wherein the one or more processors are further configured to:

determine a view index of the final disparity vector as a view index of the particular disparity vector candidate;
determine a reference index of the final disparity vector as a reference index of the particular disparity vector candidate; and
set a vertical component of the final disparity vector to a vertical component of the particular disparity vector candidate.

21. The video coding device of claim 15, wherein the one or more processors are configured such that when the one or more processors search the set of neighbor blocks, the one or more processor only include non-zero disparity motion vectors in the plurality of disparity vector candidates.

22. The video coding device of claim 15, wherein the one or more processors are configured to encode the video data.

23. The video coding device of claim 22, wherein the one or more processors are configured to generate a bitstream that includes a coded representation of the video data in part by performing, based on the final disparity vector for the current block, inter-view motion prediction or inter-view residual prediction for the current block.

24. The video coding device of claim 15, wherein the one or more processors are configured to decode the video data.

25. The video coding device of claim 24, wherein the one or more processors are configured to reconstruct a sample block for the current block in part by performing, based on the final disparity vector for the current block, inter-view motion prediction or inter-view residual prediction for the current block.

26. A video coding device comprising:
means for searching a set of neighbor blocks of video data to generate a plurality of disparity vector candidates, wherein each of the neighbor blocks is a neighbor of a current block of the video data, wherein generating the plurality of disparity vector candidates comprises storing disparity motion vectors or implicit disparity vectors (IDVs) of the neighbor blocks as the plurality of disparity vector candidates;
means for applying, in response to determining that all of the disparity vector candidates have the same reference view index, a mathematical function to the plurality of disparity vector candidates to determine a final disparity vector for the current block, wherein the mathematical function is one selected from a group consisting of a median operation, a minimum function, and a maximum function; and
means for determining, in response to determining that not all of the disparity vector candidates have the same reference view index, that the final disparity vector for the current block is one of the disparity vector candidates.

27. The video coding device of claim 15, wherein the video coding device comprises at least one of:
an integrated circuit;
a microprocessor; or
a wireless communication device.

28. The video coding device of claim 15, further comprising a display configured to display decoded video data.

29. The video coding device of claim 15, further comprising a camera configured to capture the video data.

* * * * *